(12) United States Patent
Manning et al.

(10) Patent No.: US 11,715,135 B2
(45) Date of Patent: Aug. 1, 2023

(54) SELF REGULATING TRANSACTION SYSTEM AND METHODS THEREFOR

(71) Applicant: KOCHAVA INC., Sandpoint, ID (US)

(72) Inventors: Charles Manning, Sandpoint, ID (US); Aubrey Falconer, Sandpoint, ID (US)

(73) Assignee: KOCHAVA INC., Sandpoint, ID (US)

( * ) Notice: Subject to any disclaimer, the term of this patent is extended or adjusted under 35 U.S.C. 154(b) by 148 days.

(21) Appl. No.: 16/865,938

(22) Filed: May 4, 2020

(65) Prior Publication Data

US 2020/0265479 A1  Aug. 20, 2020

Related U.S. Application Data

(63) Continuation of application No. 16/359,228, filed on Mar. 20, 2019, now Pat. No. 10,657,566, which is a
(Continued)

(51) Int. Cl.
*G06Q 30/00* (2023.01)
*G06Q 30/0241* (2023.01)
(Continued)

(52) U.S. Cl.
CPC ......... *G06Q 30/0277* (2013.01); *G06Q 30/02* (2013.01); *G06Q 30/0275* (2013.01); *G06Q 30/08* (2013.01); *H04L 63/0442* (2013.01)

(58) Field of Classification Search
None
See application file for complete search history.

(56) References Cited

U.S. PATENT DOCUMENTS 5,535,407 A * 7/1996 Yanagawa ............... G07F 7/08
705/39
6,226,649 B1 * 5/2001 Bodamer ........... G06F 16/2452
707/999.102
(Continued)

FOREIGN PATENT DOCUMENTS

CN  104303197 A  1/2015
CN  104320262 A  1/2015
(Continued)

OTHER PUBLICATIONS

Distributed Databases Heterogeneous and Homogeneous Databases Distributed Data. (Aug. 22, 2005). retrieved online Aug. 10, 2022. https://slidetodoc.com/distributed-databases-heterogeneous-and-homogeneous-databases-distributed-data/ (Year: 2005).*
(Continued)

*Primary Examiner* — James A Reagan
(74) *Attorney, Agent, or Firm* — Rossi, Kimms & McDowell LLP

(57) ABSTRACT

A first processor-accessible memory device system and a second processor-accessible memory device system of a self-regulating transaction system may each store a respective local copy of one or more transaction ledgers that record transactions. A first data processing device system may be configured to generate a transaction information block associated with a particular market channel, store it in the local copy of a transaction ledger associated with the particular market channel stored in the first processor-accessible memory device system, and transmit it to a second data processing device system over a communications network for storage in the local copy of the transaction ledger associated with the particular market channel stored in the second processor-accessible memory device system.

16 Claims, 21 Drawing Sheets

Related U.S. Application Data continuation of application No. 16/009,691, filed on Jun. 15, 2018, now Pat. No. 10,282,762, which is a continuation of application No. PCT/US2016/067768, filed on Dec. 20, 2016.

(60) Provisional application No. 62/270,155, filed on Dec. 21, 2015.

(51) Int. Cl.
  *G06Q 30/02* (2023.01)
  *G06Q 30/08* (2012.01)
  *G06Q 30/0273* (2023.01)
  *H04L 9/40* (2022.01)

(56) References Cited

U.S. PATENT DOCUMENTS

| | | | |
|---|---|---|---|
| 9,298,806 B1* | 3/2016 | Vessenes | G06Q 20/065 |
| 9,397,985 B1* | 7/2016 | Seger, II | H04L 63/0442 |
| 9,436,923 B1* | 9/2016 | Sriram | G06Q 10/0833 |
| 9,569,771 B2* | 2/2017 | Lesavich | G06Q 20/306 |
| 9,830,593 B2* | 11/2017 | Myers | G06Q 20/401 |
| 9,875,510 B1* | 1/2018 | Kasper | H04L 67/104 |
| 10,282,762 B2* | 5/2019 | Manning | G06Q 30/02 |
| 10,552,807 B2 | 2/2020 | Marcous | |
| 2002/0165724 A1* | 11/2002 | Blankesteijn | G06F 16/2308 705/1.1 |
| 2003/0182230 A1* | 9/2003 | Pessin | G06Q 40/025 705/39 |
| 2004/0139018 A1* | 7/2004 | Anderson | G06Q 20/105 705/41 |
| 2007/0061266 A1* | 3/2007 | Moore | G06Q 50/00 705/51 |
| 2007/0061487 A1* | 3/2007 | Moore | G06F 16/27 707/E17.032 |
| 2007/0143186 A1* | 6/2007 | Apple | G06Q 30/02 705/14.48 |
| 2010/0082671 A1* | 4/2010 | Li | G06F 16/2456 707/E17.01 |
| 2013/0104251 A1* | 4/2013 | Moore | G06F 21/602 726/30 |
| 2013/0132219 A1* | 5/2013 | Liberty | G06Q 20/202 705/21 |
| 2013/0325701 A1* | 12/2013 | Schwartz | G06Q 40/00 705/39 |
| 2014/0122510 A1* | 5/2014 | Namkoong | G06F 16/27 707/755 |
| 2014/0278981 A1* | 9/2014 | Mersov | G06Q 30/02 705/14.53 |
| 2015/0033301 A1* | 1/2015 | Pianese | H04L 63/10 726/5 |
| 2015/0227890 A1* | 8/2015 | Bednarek | G06Q 30/0635 705/26.81 |
| 2015/0269570 A1 | 9/2015 | Phan | |
| 2015/0278820 A1* | 10/2015 | Meadows | G06Q 20/40145 705/64 |
| 2015/0310424 A1* | 10/2015 | Myers | G06Q 20/3678 705/69 |
| 2015/0348169 A1* | 12/2015 | Harris | G06Q 30/0633 705/26.8 |
| 2015/0363820 A1* | 12/2015 | Leitersdorf | G06Q 10/04 705/14.41 |
| 2015/0371224 A1* | 12/2015 | Lingappa | G06Q 20/3825 705/71 |
| 2015/0379510 A1* | 12/2015 | Smith | G06Q 20/3829 705/71 |
| 2016/0012424 A1* | 1/2016 | Simon | G06Q 20/3674 705/67 |
| 2016/0162882 A1* | 6/2016 | McClung, III | G06Q 20/02 705/41 |
| 2016/0260169 A1* | 9/2016 | Arnold | G06Q 20/023 |
| 2016/0292672 A1* | 10/2016 | Fay | G06Q 20/363 |
| 2016/0321654 A1* | 11/2016 | Lesavich | H04L 67/104 |
| 2017/0126702 A1* | 5/2017 | Krishnamurthy | H04L 63/123 |
| 2017/0187535 A1 | 6/2017 | Middleton | |
| 2017/0236120 A1* | 8/2017 | Herlihy | G06F 21/57 705/67 |
| 2017/0337534 A1* | 11/2017 | Goeringer | G06Q 20/123 |
| 2017/0364698 A1* | 12/2017 | Goldfarb | H04L 9/3239 |
| 2018/0308134 A1* | 10/2018 | Manning | G06Q 30/02 |
| 2021/0182423 A1* | 6/2021 | Padmanabhan | G06F 21/6245 |

FOREIGN PATENT DOCUMENTS

| | | | | |
|---|---|---|---|---|
| JP | 2000082065 A | | 3/2000 | |
| JP | 2001290937 A | * | 10/2001 | G06Q 10/06 |
| JP | 2007179202 A | | 7/2007 | |
| JP | 2011257893 A | | 12/2011 | |
| JP | 2018116509 A | * | 7/2018 | G06F 21/64 |
| JP | 2018116509 A | | 7/2018 | |
| JP | 2018133080 A | * | 8/2018 | G16H 10/00 |
| JP | 2018133080 A | | 8/2018 | |
| JP | 2018136915 A | | 8/2018 | |
| JP | 2018136915 A | * | 8/2018 | G06Q 20/06 |
| WO | 2015171580 A1 | | 11/2015 | |

OTHER PUBLICATIONS

Jeeyoung Kim. "How Sharding Works." (Dec. 5, 2014). Retrieved online Oct. 25, 2022. https://medium.eom/@jeeyoungk/how-sharding-works-b4dec46b3f6.*

GeeksforGeeks.org. AVL Tree | Set 2 (Deletion). (Sep. 13, 2021). Retrieved online Jan. 1, 2022. https://www.geeksforgeeks.org/avl-tree-set-2-deletion/ (Year: 2021).*

Daniel Cawrey. How Consensus Algorithms Solve Issues with Bitcoin's Proof of Work. (Sep. 11, 2014). Retrieved online Jan. 1, 2022. https://www.coindesk.com/markets/2014/09/11/how-consensus-algorithms-solve-issues-with-bitcoins-proof-of-work/ (Year: 2014).*

Bitcoin Magazine. Three Startups Trying to Transform the Music Industry Using the Blockchain. (Nov. 13, 2015). Retrieved online Jan. 9, 2020. https://bitcoinmagazine.com/articles/three-startups-trying-to-transform-the-music-industry-using-the-blockchain-1447444594 (Year: 2015).*

Oracle9i Database Administrator's Guide. "28 - Distributed Database Concepts." (Nov. 12, 2011). Retrieved online Sep. 3, 2022. https://docs.oracle.com/cd/B10501_01/server.920/a96521/ds_concepts.htm (Year: 2011).*

Office Action response filed in Japanese Appln. No. 2018-551900 dated Mar. 26, 2021. English machine translation provided.

Office Action issued in Chinese Appln. No. 201680082249.9 dated Aug. 4, 2021. English statement of relevance provided.

Office Action issued in Japanese Appln. No. 2018-551900 dated May 10, 2021. English machine translation provided.

Office Action issued in Japanese Appln. No. 2018-551900 dated Jan. 5, 2021. English translation provided.

International Search Report issued in Intl. Appln. No. PCT/US2016/067768 dated Apr. 28, 2017.

Written Opinion issued in Intl. Appln. No. PCT/US2016/067768 dated Apr. 28, 2017.

Jimenez. "What is Blockchain and how can be applied in programmatic advertising." Sep. 6, 2018. Web Jan. 27, 2019. https://medium.com/@garabujo77/what-is-blockchain-and-how-can-be-applied-in-programmatic-advertising-44995f5b08f1.

IBM Corporation. "Blockchain for Business." Hyperledger Meetup. May 11, 2017. Frankfurt. https://hyperledger.org/wp-content/uploads/2017/05/HL_Meetup_Blockchain_IBM_Mai_v2a-1.pdf.

Brakeville et al. "Blockchain Basics: Introduction to distributed ledgers. Get to know this game-changing technology and how to start using it." Mar. 18, 2018. Web Sep. 13, 2018. https://www.ibm.com/developerworks/cloud/library/cl-blockchain-basics-intro-bluemix-trs/index.html.

Office Action issued in U.S. Appl. No. 16/009,691 dated Sep. 18, 2018.

Notice of Allowance issued in U.S. Appl. No. 16/009,691 dated Feb. 1, 2019.

(56) References Cited

OTHER PUBLICATIONS

Extended European Search Report issued in European Appln. No. 16879968.2 dated Jul. 11, 2019.
Communication pursuant to Rules 70(2) and 70a(2) EPC issued in European Appln. No. 16879968.2 dated Jul. 30, 2019.
Http://myceliaformusic.org/2015/11/13/three-startups-trying-to-transform-the-music-industry-using-the-blockchain/ (Year: 2013).
Office Action issued in U.S. Appl. No. 16/359,228 dated Sep. 11, 2019.
Office Action issued in U.S. Appl. No. 16/359,228 dated Dec. 10, 2019.
Notice of Allowance issued in U.S. Appl. No. 16/359,228 dated Jan. 15, 2020.
Bitcoin Magazine. Three Startups Trying to Transform the Music Industry Using the Blockchain. (Nov. 13, 2015). Retrieved online Jan. 9, 2020. https7/bitcoinmagazinecom/articles/three-startups-trying-to-transform-the-music-industry-using-the-blockchain-1447444594 (Year: 2015).
Office Action issued in U.S. Appl. No. 16/359,228 dated Apr. 25, 2019.
Office Action issued in European Appln. No. 16879968.2 dated Jan. 27, 2021.
Notice of Allowance issued in Japanese Appln. No. 2018-551900 dated Jun. 22, 2021. English translation provided.
Office Action issued in Chinese Appln. No. 201680082249.9 dated Mar. 3, 2022. English language statement of relevance is provided herewith.
Office Action issued in Japanese Appln. No. 2021-120801 dated Sep. 6, 2022. English translation provided.
Office Action issued in Japanese Appln. No. 2021-120801 dated Mar. 28, 2023. English machine translation provided.

\* cited by examiner

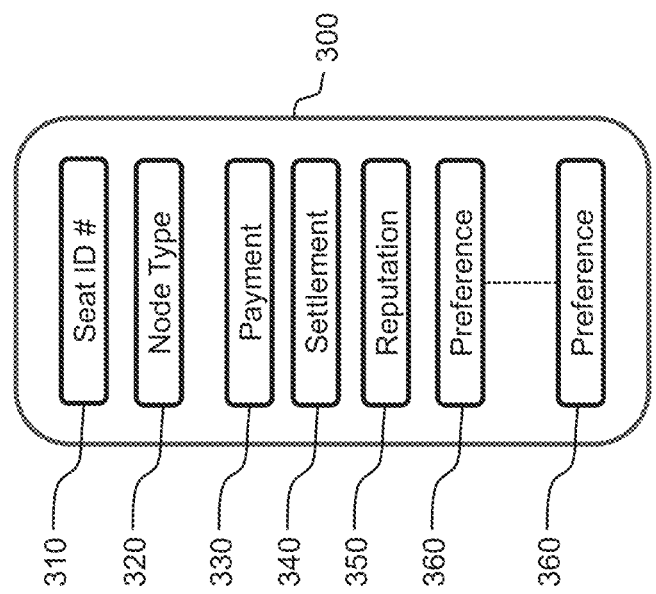

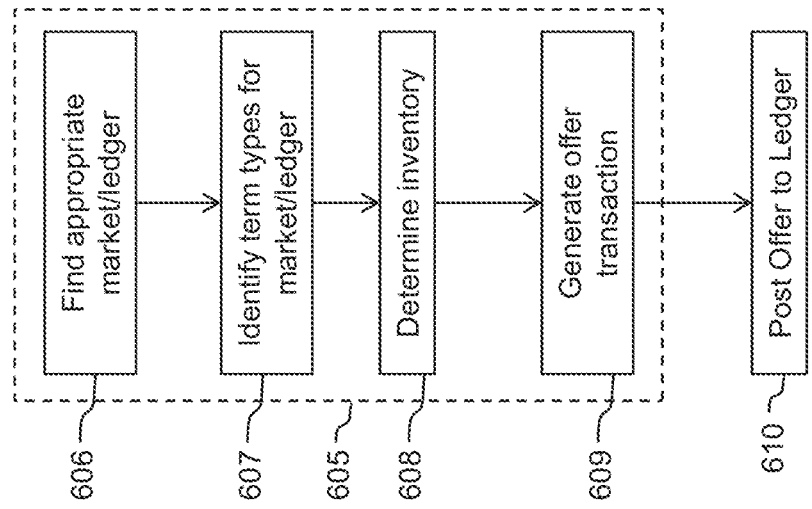

| Product/Service ID | User Account |
|---|---|
| Device-ID-1 | User Account A |
| Device-ID-2 | User Account B |
| Device-ID-3 | User Account C |
| Address-1 | User Account D |
| Address-2 | User Account E |

FIG. 19

SELF REGULATING TRANSACTION SYSTEM AND METHODS THEREFOR

CROSS-REFERENCE TO RELATED APPLICATIONS

This application is a continuation of U.S. application Ser. No. 16/359,228, filed Mar. 20, 2019, now U.S. Pat. No. 10,657,566, issued May 19, 2020, which is a continuation of U.S. application Ser. No. 16/009,691, filed Jun. 15, 2018, now U.S. Pat. No. 10,282,762, issued May 7, 2019, which is a continuation of International Application No. PCT/US2016/067768, filed Dec. 20, 2016, which claims the benefit of U.S. Provisional Application No. 62/270,155, filed Dec. 21, 2015, the entire disclosure of each of these applications which is hereby incorporated herein by reference.

TECHNICAL FIELD

Aspects of this disclosure generally are related to systems and methods for providing self-regulated computerized markets and transaction channels over a network of computing devices, with associated protocols to verify distributed transactional data and maintain integrity of the computerized markets.

BACKGROUND OF THE INVENTION

Digital advertising across the Internet, World Wide Web, or apps on mobile devices promote products, services, or applications by delivering marketing messages or other digital content in order to attract customers. In such a networked environment, digital advertising typically involves a formal relationship between various actors who work together in an ecosystem. Examples of actors include advertiser devices, publisher devices, and aggregator devices.

Publisher devices may be operated by publishers, which may be entities (companies or individuals) who have an app or a published website where they can show advertisements to their audience. These advertisements (also referred to herein as ads) typically are provided by the advertiser devices, which are operated by advertisers, which may be entities interested in promoting their products, services, or apps to the publisher's audience. A publisher provides ad-slots on their webpage or apps, which may be portions of the webpage or app where an ad can be displayed. A webpage or app may have one or more portions corresponding to ad-slots for displaying ads.

To support the scale required for typical promotion campaigns (also called ad buys), advertisers may engage with more than one publisher to achieve the objectives of the campaign. Advertisers may also engage with ad networks (also called supply side providers or SSPs) that aggregate ad-slots from more than one publisher to provide greater scale for advertisers to buy across a broader audience base. In a similar manner, a publisher with more than one ad-slot may engage with more than one advertiser to fill the ad-slots. Publishers may also engage with advertiser aggregators (also called demand side providers or DSPs) that aggregate advertisements from more than one advertiser to fill the available ad-slots. SSPs may also interact with DSPs to provide greater economies of scale.

The process of selling ad-slots or purchasing advertisements can involve signing contracts for each promotional campaign (also called a flight), determining payment details, and qualifying filtering and targeting criteria for the flight. In addition, the flight can include terms such as 'daily pacing' (the advertisement won't be shown in an ad-slot all at once—and will rather be paced over a period of time) and fill guarantees (advertisement contract will be fulfilled in terms of inventory volume). Working with various partners in the ecosystem can be time consuming and the administrative efforts required to negotiate and sign a contract to run the ad (called an insertion order, or IO) can be tedious and manual in nature—further multiplied by the number of partners that must be engaged with to ensure sufficient scale to achieve the objectives of the promotional campaign.

In addition to the administrative burden, publishers (or SSPs) and advertisers (or DSPs) are reliant on one-to-one negotiation between each other. Historically, a rate-sheet (or pricing sheet) of the value of the inventory is established on a per source basis, but heavy discounting may occur (or premiums be applied) depending on different targeting criteria. These targeting criteria can include (but are not limited to) time of day, run of network versus site specific targeting, geographic targeting, placement of ad-slot on webpage or app, supply of ad-slots, or demand for advertisements. Difficulty in understanding the 'market value' of inventory can adversely impact both advertisers (or DSPs) and publishers (or SSPs). Publishers may underprice their inventory, and advertisers may run the risk of overpaying for the inventory they require.

The advertiser typically pays a certain price for displaying their ad in an ad-slot. Each placement of an advertisement or other digital content or media in an ad slot is referred to as an impression. Typically, an advertiser pays the publisher a price for each ad impression based at least on an expected return on investment, for example, a viewer of the webpage or app purchasing a product featured in the ad. Impressions that result in some form of action by a viewer of the ad may be referred to as conversions. It should be noted that conversions are not limited to purchase of the product. A conversion can also include the viewer selecting a hyperlink within the ad to access more information about the product.

As discussed above, a digital advertising marketplace can include both a supply side economy, and a demand side economy. The demand side economy includes advertisers (or DSPs) that demand an inventory of impressions for placement of advertisements in the ad-slots. The supply side economy includes publishers (or SSPs) that provide an inventory of impressions for placement of advertisements in the ad-slots. As the volume of publishers SSPs continues to increase, there is a corresponding increase in the number of available impressions for advertisers or DSPs to purchase. In traditional markets, Real-Time Bidding (RTB) may be used to sell available impressions to advertisers. One example implementation of an RTB framework is OpenRTB, described in detail in the OpenRTB API Specification Version 2.3.1, Interactive Advertising Bureau [online]. However, all RTB implementations, whether OpenRTB or not, use the same basic framework of a client-server bidding approach. RTB enables SSPs to acquire impression inventory from publishers and sell it to DSPs using a market-driven bidding approach. In this scenario, SSPs (Supply Side Providers) aggregate supply of impressions and DSPs (Demand Side Providers) aggregate demand for impressions for placement of ads. Together, the SSPs and the DSPs enable an auction-oriented 'marketplace'. Typically, an RTB environment is made up of each impression being bid on by multiple buyers. The buyers are typically DSPs, although large advertisers may also be able to gain access to the RTB market. Often, the RTB marketplace is set up to award the winning bid to the highest bidder at or just above the offer price of the second-highest bidder's offer.

The RTB, and the roles that DSPs and SSPs play in the sale and purchase of impressions, could be considered as a means to overcome the challenges mentioned above. The problem, in this approach, is that there is still a centralized requirement whereby a particular DSP must be connected to available SSPs. Equally, for a publisher to take advantage of buyers, their integrated SSP must be connected to DSPs that buy inventory from them. In most cases, an advertiser must still consult and work with multiple DSPs—which is complex, inefficient, costly, and time consuming. There is also a concern that by working with multiple DSPs, the advertiser may, in fact, be competing with themselves if both DSPs from which the advertiser is buying are connected to the same SSPs. (In this case, the same advertiser is driving the cost up against themselves via two separate DSPs).

DSPs may also take an Insertion Order and then buy 'direct' with specific publishers. This may or may not be known by the advertiser. In the same way, the publisher receiving a sub-order may also turn around and buy from another 3rd party publisher to fulfill this insertion order. This circumstance creates a re-brokering situation that is neither tracked nor accounted for in a true market-driven environment.

As the volume of available impressions continues to increase, advertisers, publishers, and underlying supply chains face increasing levels of complexity in managing demand and supply for impressions, and ensuring that the available impressions are quickly and efficiently sold to advertisers for ad placement, and doing so in an open distributed fashion.

There is a need for an alternative technological approach that enables crypto verified transactions on a distributed ledger, supported by enabling protocols and open to any participating actor in the supply or demand chain.

SUMMARY OF THE INVENTION

At least the above-discussed need is addressed and technical solutions are achieved in the art by various embodiments of the present invention. In some embodiments, systems and methods are provided for recording crypto-verified transactions in distributed ledgers stored at each node of a communications network. Each node may be a data processing device system communicatively connected to the communications network. Each data processing device system may also include a communicatively connected input-output device system and processor-accessible memory device system. The processor-accessible memory device system of each data processing device system may store a respective ledger of the distributed ledgers. In this regard, the distributed ledgers may be synchronized with each other over the communications network. In this regard, each node may store a complete or a partial copy of another node's ledger. In some embodiments, some nodes store a respective partial copy of another node's stored ledger stored to reduce storage requirements and to provide efficient searching of the distributed ledger. Due to the transactions in the distributed ledger being synchronized, the risk of recording erroneous or fraudulent transactions is greatly reduced, thereby providing self-regulation of the transaction system.

In some embodiments, a self-regulating transaction system includes a communications network and a plurality of data processing device systems connected to the communications network, each of the plurality of data processing device systems communicatively connected to a respective processor-accessible memory device system and a respective input-output device system. In some embodiments, a first data processing device system of the plurality of data processing device systems is communicatively connected to a first processor-accessible memory device system and a first input-output device system, the first input-output device system communicatively connected to the communications network. In some embodiments, a second data processing device system of the plurality of data processing device systems is communicatively connected to a second processor-accessible memory device system and a second input-output device system, the second input-output device system communicatively connected to the communications network. The first processor-accessible memory device system associated with the first data processing device system and the second processor-accessible memory device system associated with the second data processing device system may each store a respective local copy of one or more transaction ledgers that record transactions. Each transaction ledger may be associated with a market channel. The first data processing device system may be configured to, via a first program stored in the first processor-accessible memory device system, generate a transaction information block associated with a particular market channel, store the generated transaction information block in the local copy of the transaction ledger associated with the particular market channel stored in the first processor-accessible memory device system, and transmit the generated information block to the second data processing device system over the communications network via the first input-output device system. The second data processing device system may be configured to, via a second program stored in the second processor-accessible memory device system, receive the generated transaction information block over the communications network via the second input-output device system, and store the received transaction information block in the local copy of the transaction ledger associated with the particular market channel stored in the second processor-accessible memory device system.

In some embodiments, a self-regulating transaction system includes a communications network and a plurality of data processing device systems connected to the communications network, each of the plurality of data processing device systems communicatively connected to a respective processor-accessible memory device system and an input-output device system. In some embodiments, a first data processing device system of the plurality of data processing device systems is communicatively connected to a first processor-accessible memory device system and a first input-output device system, the first input-output device system communicatively connected to the communications network. In some embodiments, a second data processing device system of the plurality of data processing device systems is communicatively connected to a second processor-accessible memory device system and a second input-output device system, the second input-output device system communicatively connected to the communications network. The first processor-accessible memory device system associated with the first data processing device system and the second processor-accessible memory device system associated with the second data processing device system may each store a respective local copy of one or more transaction ledgers that record transactions. Each transaction ledger may be associated with a market channel. The first data processing device system may be configured to, via a first program stored in the first processor-accessible memory device system, determine inventory available for transaction; identify a particular market channel associated with the inventory available for transaction; generate a transaction information block associated with the identified particular market channel, the generated transaction information block including the inventory available for transaction and one or more transaction terms; store the generated transaction information block in the local copy of the transaction ledger associated with the particular market channel stored in the first processor-accessible memory device system; and transmit the generated information block to the second data processing device system over the communications network via the first input-output device system. The second data processing device system may be configured to, via a second program stored in the second processor-accessible memory device system, receive the generated transaction information block over the communications network via the second input-output device system; and store the received transaction information block in the local copy of the transaction ledger associated with the particular market channel stored in the second processor-accessible memory device system.

According to some embodiments, a self-regulating transaction system includes a communications network and a plurality of data processing device systems connected to the communications network, each of the plurality of data processing device systems communicatively connected to a respective processor-accessible memory device system and an input-output device system. In some embodiments, a first data processing device system of the plurality of data processing device systems is communicatively connected to a first processor-accessible memory device system and a first input-output device system, the first input-output device system communicatively connected to the communications network. In some embodiments, a second data processing device system of the plurality of data processing device systems is communicatively connected to a second processor-accessible memory device system and a second input-output device system, the second input-output device system communicatively connected to the communications network. The first processor-accessible memory device system associated with the first data processing device system and the second processor-accessible memory device system associated with the second data processing device system may each store a respective local copy of one or more transaction ledgers that record transactions. Each transaction ledger may be associated with a market channel. The first data processing device system may be configured to, via a first program stored in the first processor-accessible memory device system, generate a transaction information block associated with a particular market channel at least by receiving, via the first input-output device system, a request for purchasing inventory available for transaction from one of the plurality of data processing device systems associated with a buyer node, searching the transaction ledger to identify at least one transaction information block in the transaction ledger matching the request for inventory available for transaction, determining a particular data processing device system that generated the identified transaction information block, determining a rating for the particular data processing device system, comparing the rating of the particular data processing device system to a minimum or threshold rating specified in the request for inventory, and if the rating for the particular data processing device system is above the minimum rating or meets the threshold rating, generating the transaction information block, the transaction information block including the inventory purchased in the transaction and one or more transaction terms; store the generated transaction information block in the local copy of the transaction ledger associated with the particular market channel stored in the first processor-accessible memory device system; and transmit the generated information block to the second data processing device system over the communications network via the first input-output device system. The second data processing device system may be configured to, via a second program stored in the second processor-accessible memory device system, receive the generated transaction information block over the communications network via the second input-output device system; and store the received transaction information block in the local copy of the transaction ledger associated with the particular market channel stored in the second processor-accessible memory device system.

In some embodiments, a self-regulating transaction system includes a communications network and a plurality of data processing device systems connected to the communications network, each of the plurality of data processing device systems communicatively connected to a respective processor-accessible memory device system and an input-output device system. In some embodiments, a first data processing device system of the plurality of data processing device systems is communicatively connected to a first processor-accessible memory device system and a first input-output device system, the first input-output device system communicatively connected to the communications network. In some embodiments, a second data processing device system of the plurality of data processing device systems is communicatively connected to a second processor-accessible memory device system and a second input-output device system, the second input-output device system communicatively connected to the communications network. The first processor-accessible memory device system associated with the first data processing device system and the second processor-accessible memory device system associated with the second data processing device system may each store a respective local copy of one or more transaction ledgers that record transactions. Each transaction ledger may be associated with a market channel. The first data processing device system may be configured to, via a first program stored in the first processor-accessible memory device system, generate a transaction information block associated with a particular market channel at least by searching the transaction ledger associated with the particular market channel for a particular transaction information block associated with a purchase of inventory, identifying a transaction type and at least one measurement indicator based on one or more transaction terms in the particular transaction information block, measuring the at least one measurement indicator to determine a status of the transaction, and generating the transaction information block, the transaction information block including the status of the transaction; store the generated transaction information block in the local copy of the transaction ledger associated with the particular market channel stored in the first processor-accessible memory device system; and transmit the generated information block to the second data processing device system over the communications network via the first input-output device system. The second data processing device system may be configured to, via a second program stored in the second processor-accessible memory device system, receive the generated transaction information block over the communications network via the second input-output device system, and store the received transaction information block in the local copy of the transaction ledger associated with the particular market channel stored in the second processor-accessible memory device system.

In some embodiments, a system includes a communications network and a plurality of data processing device systems communicatively connected to the communications network. Each of the plurality of data processing device systems may be communicatively connected to a respective processor-accessible memory device system and a respective input-output device system. A first data processing device system of the plurality of data processing device systems may be communicatively connected to a first processor-accessible memory device system and a first input-output device system. The first input-output device system may be communicatively connected to the communications network. A second data processing device system of the plurality of data processing device systems may be communicatively connected to a second processor-accessible memory device system and a second input-output device system. The second input-output device system may be communicatively connected to the communications network. In some embodiments, the first processor-accessible memory device system associated with the first data processing device system and the second processor-accessible memory device system associated with the second data processing device system each stores a respective local copy of at least a respective portion of each of one or more transaction ledgers that record transactions. Each transaction ledger may be associated with a market channel. In some embodiments, the first data processing device system is configured, via a first program stored in the first processor-accessible memory device system, to: determine inventory available for transaction, the determined inventory available for transaction including device identifiers, each of the device identifiers identifying a device to which text, an image, video, or audio is authorized to be transmitted, identify a particular market channel associated with the inventory available for transaction, encrypt the device identifiers according to a public encryption key to generate encrypted device identifiers, generate a transaction information block associated with the particular market channel including the encrypted device identifiers, characteristics of devices associated with the encrypted device identifiers, and one or more transaction terms, store the generated transaction information block in the first processor-accessible memory device system as an update to the respective local copy of the at least the respective portion of the transaction ledger associated with the particular market channel, and transmit the generated transaction information block to the second data processing device system over the communications network via the first input-output device system. In some embodiments, the second data processing device system is configured, via a second program stored in the second processor-accessible memory device system, to: receive the generated transaction information block over the communications network via the second input-output device system, store the received transaction information block in the second processor-accessible memory device system as an update to the respective local copy of the at least the respective portion of the transaction ledger associated with the particular market channel, decrypt the encrypted device identifiers according to a private encryption key corresponding to the public encryption key, verify that the decrypted device identifiers are associated with devices that agree with the characteristics, and add a digital signature to the respective local copy of the at least the respective portion of the transaction ledger associated with the particular market channel stored in the second processor-accessible memory device system, in response to verifying that the decrypted device identifiers are associated with devices that agree with the characteristics.

In some embodiments, a system includes a communications network and a plurality of data processing device systems communicatively connected to the communications network. Each of the plurality of data processing device systems may be communicatively connected to a respective processor-accessible memory device system and a respective input-output device system. A first data processing device system of the plurality of data processing device systems may be communicatively connected to a first processor-accessible memory device system and a first input-output device system. The first input-output device system may be communicatively connected to the communications network. A second data processing device system of the plurality of data processing device systems may be communicatively connected to a second processor-accessible memory device system and a second input-output device system. The second input-output device system may be communicatively connected to the communications network. In some embodiments, the first processor-accessible memory device system associated with the first data processing device system and the second processor-accessible memory device system associated with the second data processing device system each stores a respective local copy of at least a respective portion of each of one or more transaction ledgers that record transactions. Each transaction ledger may be associated with a market channel. In some embodiments, the first data processing device system is configured, via a first program stored in the first processor-accessible memory device system, to: generate a transaction information block associated with a particular market channel, store the generated transaction information block in the first processor-accessible memory device system as an update to the respective local copy of the at least the respective portion of the transaction ledger associated with the particular market channel, and transmit the generated transaction information block to the second data processing device system over the communications network via the first input-output device system. In some embodiments, the second data processing device system is configured, via a second program stored in the second processor-accessible memory device system, to: receive the generated transaction information block over the communications network via the second input-output device system, and store the received transaction information block in the second processor-accessible memory device system as an update to the respective local copy of the at least the respective portion of the transaction ledger associated with the particular market channel.

In some embodiments, the first data processing device system is configured, via the first program stored in the first processor-accessible memory device system, to: determine inventory available for transaction, and identify the particular market channel as associated with the inventory available for transaction. The generated transaction information block may include indications of the inventory available for transaction and one or more transaction terms.

The determined inventory available for transaction may include product or service identifiers. Each of the product or service identifiers may identify a product or service available for transaction.

In some embodiments, the first data processing device system is configured, via a program, to encrypt the product or service identifiers to generate encrypted product or service identifiers. The encrypted product or service identifiers may be included in the inventory available for transaction in the generated transaction information block.

The product or service identifiers may be device identifiers. Each of the device identifiers may identify a device to which an advertisement is authorized to be delivered. In this regard, in some embodiments, the encrypted product or service identifiers may be encrypted device identifiers. Each device may be a mobile electronic device, such as a cellular phone or smart phone or tablet computer to which an advertisement or other text, image, video, or audio, is authorized to be visually presented via an application executing on the mobile electronic device. The application may be associated with the first data processing device system.

In some embodiments, the first data processing device system is configured, via the first program, to encrypt the product or service identifiers to generate the encrypted product or service identifiers according to an encryption key. In some embodiments, the first data processing device system is configured, via the first program, to encrypt the product or service identifiers to generate the encrypted product or service identifiers according to a public encryption key.

In some embodiments, a third data processing device system of the plurality of data processing device systems is communicatively connected to a third processor-accessible memory device system and a third input-output device system. The third input-output device system is communicatively connected to the communications network. The third processor-accessible memory device system associated with the third data processing device system may store a respective local copy of at least a respective portion of the transaction ledger associated with the particular market channel. The at least the respective portion of the transaction ledger associated with the particular market channel may include a first transaction information block set associated with an operation set with respect to at least a subset of the inventory available for transaction. The first transaction information block set may include the encrypted product or service identifiers.

In some embodiments, the third data processing device system is configured, via a third program stored in the third processor-accessible memory device system, to: decrypt the encrypted product or service identifiers according to a private encryption key corresponding to the public encryption key.

The first transaction information block set may indicate characteristics of the products or services associated with the encrypted product or service identifiers. In some embodiments, the third data processing device system is configured, via the third program, to: verify that the decrypted product or service identifiers are associated with products or services that agree with the characteristics, and add a digital signature to the respective local copy of the at least the respective portion of the transaction ledger associated with the particular market channel stored in the third processor-accessible memory device system, in response to verifying that the decrypted product or service identifiers are associated with products or services that agree with the characteristics.

In some embodiments, a third data processing device system of the plurality of data processing device systems is communicatively connected to a third processor-accessible memory device system and a third input-output device system. The third input-output device system may be communicatively connected to the communications network. The third processor-accessible memory device system associated with the third data processing device system may store a respective local copy of at least a respective portion of the transaction ledger associated with the particular market channel. The at least the respective portion of the transaction ledger associated with the particular market channel may include a first transaction information block set associated with an operation set with respect to at least a subset of the inventory available for transaction. The first transaction information block set may include product or service identifiers encrypted according to a public encryption key associated with the third data processing system and including at least a subset of the one or more transaction terms. In some embodiments, a fourth data processing device system of the plurality of data processing device systems is communicatively connected to a fourth processor-accessible memory device system and a fourth input-output device system. The fourth input-output device system may be communicatively connected to the communications network. In some embodiments, the fourth processor-accessible memory device system associated with the fourth data processing device system stores a respective local copy of at least a portion of the transaction ledger associated with the particular market channel. The at least the respective portion of the respective local copy of the transaction ledger associated with the particular market channel may include the first transaction information block set. The first transaction information block set may further include a digital signature associated with the third data processing device system and a digital signature associated with the fourth data processing device system. In some embodiments, the third data processing device system is configured, via a third program, to: decrypt the encrypted product or service identifiers according to a private encryption key corresponding to the public encryption key associated with the third data processing device system, verify, utilizing the decrypted product or service identifiers, that the at least the subset of the one or more transaction terms have been fulfilled, transmit a failure indication to the fourth processor-accessible memory device system in response to a failure of the verification that the at least the subset of the one or more transaction terms have been fulfilled, and transmit a success indication to the fourth processor-accessible memory device system in response to success of the verification that the at least the subset of the one or more transaction terms have been fulfilled.

In some embodiments, wherein a third data processing device system of the plurality of data processing device systems is communicatively connected to a third processor-accessible memory device system and a third input-output device system. The third input-output device system may be communicatively connected to the communications network. The third processor-accessible memory device system associated with the third data processing device system may store a respective local copy of at least a portion of the transaction ledger associated with the particular market channel. The at least the portion of the transaction ledger associated with the particular market channel may include the generated transaction information block. In some embodiments, the third data processing device system is configured, via a third program stored in the third processor-accessible memory device system, to: generate an updated transaction information block based on the generated transaction information block with a modification of at least a particular term of the one or more transaction terms, and distribute, over the communications network via the third input-output device system, the generated updated transaction information block including the modification of at least the particular term.

In some embodiments, the first data processing device system is configured, via the first program stored in the first processor-accessible memory device system, to: form a first digitally signed transaction information block at least by digitally signing the updated transaction information block, and distribute, over the communications network via the first input-output device system, the first digitally signed transaction information block.

In some embodiments, the third data processing device system is configured, via the third program stored in the third processor-accessible memory device system, to: form a second digitally signed transaction information block at least by digitally signing the first digitally signed transaction information block, and distribute, over the communications network via the third input-output device system, the second digitally signed transaction information block.

In some embodiments, the first data processing device system is configured, via the first program stored in the first processor-accessible memory device system, to: cause a search of at least part of the transaction ledger associated with the particular market channel for a particular transaction information block associated with an inventory transaction, identify at least one measurement indicator based on one or more transaction terms in the particular transaction information block, and determine a status of the inventory transaction based at least on an analysis of the at least one measurement indicator. The generated transaction information block may include the status of the inventory transaction.

In some embodiments, the first data processing device system is configured, via the first program stored in the first processor-accessible memory device system, to: determine the status of the inventory transaction as successfully completed in a case where the one or more transaction terms have been fulfilled in accordance with the at least one measurement indicator, generate an updated transaction information block based on the particular transaction information block with a digital signature associated with the first data processing device system in response to determining that the status of the inventory transaction is successfully completed, and transmit the generated updated transaction information block to a third data processing device system of the plurality of data processing device systems over the communications network via the first input-output device system. The third data processing device system is or is a subset of the second data processing device system.

In some embodiments, a fourth data processing device system of the plurality of data processing device systems is communicatively connected to a fourth processor-accessible memory device system and a fourth input-output device system. The fourth input-output device system may be communicatively connected to the communications network. The fourth data processing device system may be other than the first data processing device system. The fourth processor-accessible memory device system associated with the fourth data processing device system may store a respective local copy of at least a respective portion of the transaction ledger associated with the particular market channel. The at least the respective portion of the transaction ledger associated with the particular market channel may include the digitally signed updated transaction information block. In some embodiments, the fourth data processing device system is configured, via a fourth program stored in the fourth processor-accessible memory device system, to identify, from the local copy of the at least the respective portion of the transaction ledger associated with the particular market channel, the digitally signed updated transaction information block, determine that the status of the inventory transaction is successfully completed based on an analysis of the identified digitally signed updated transaction information block, and transmit, in response to determining that the inventory transaction is successfully completed, an instruction set instructing release of assets associated with the inventory transaction.

In some embodiments, the first data processing device system is configured, via the first program stored in the first processor-accessible memory device system, to determine the status of the inventory transaction as partially completed in a case where the one or more transaction terms have been partially, but not completely, fulfilled in accordance with at least one of the at least one measurement indicator. In some embodiments, a fourth data processing device system of the plurality of data processing device systems is communicatively connected to a fourth processor-accessible memory device system and a fourth input-output device system. The fourth input-output device system may be communicatively connected to the communications network, and the fourth data processing device system may be other than the first data processing device system. In some embodiments, the fourth processor-accessible memory device system associated with the fourth data processing device system stores a respective local copy of at least a respective portion of the transaction ledger associated with the particular market channel. The at least the respective portion of the transaction ledger associated with the particular market channel may include the generated transaction information block including the partially completed status of the inventory transaction. According to some embodiments, the fourth data processing device system is configured, via a fourth program stored in the fourth processor-accessible memory device system, to: identify, from the local copy of the at least the respective portion of the transaction ledger associated with the particular market channel, the partially completed status of the inventory transaction based, and transmit, in response to identifying the partially completed status of the inventory transaction, an instruction set instructing release of some, but not all, of assets associated with the inventory transaction.

In some embodiments, the first data processing device system is configured, via the first program stored in the first processor-accessible memory device system, to determine the status of the inventory transaction as in a failure state in a case where the one or more transaction terms have not been met in accordance with at least one of the at least one measurement indicator. In some embodiments, a fourth data processing device system of the plurality of data processing device systems is communicatively connected to a fourth processor-accessible memory device system and a fourth input-output device system. The fourth input-output device system may be communicatively connected to the communications network, and the fourth data processing device system may be other than the first data processing device system. According to some embodiments, the fourth processor-accessible memory device system associated with the fourth data processing device system stores a respective local copy of at least a respective portion of the transaction ledger associated with the particular market channel. The at least the respective portion of the transaction ledger associated with the particular market channel may include the generated transaction information block including the failure state status of the inventory transaction and contingency arrangements associated with the inventory transaction. In some embodiments, the fourth data processing device system is configured, via a fourth program stored in the fourth processor-accessible memory device system, to: identify, from the local copy of the at least the respective portion of the transaction ledger associated with the particular market channel, the failure state status of the inventory transaction, identify, from the local copy of the at least the respective portion of the transaction ledger associated with the particular market channel and in response to identifying the failure state status, the contingency arrangements associated with the inventory transaction, and transmit an instruction set instructing processing of assets associated with the inventory transaction in accordance with the contingency arrangements.

According to some embodiments, the generated transaction information block includes a request for purchasing inventory available for transaction from one of the plurality of data processing device systems associated with a seller node, the first processor-accessible memory device system associated with a buyer node. In some embodiments, the second data processing device system is configured, via a second program stored in the second processor-accessible memory device system, to: identify at least one transaction information block in at least part of the transaction ledger associated with the particular market channel matching the request for inventory available for transaction at least by causing searching of the at least part of the transaction ledger associated with the particular market channel, determine a particular data processing device system that generated the identified at least one transaction information block, determine a rating for the particular data processing device system, compare the rating of the particular data processing device system to a threshold rating specified in the request for inventory, and if the rating for the particular data processing device system meets the threshold rating, update, with a newly generated transaction information block, the local copy of the at least the respective portion of the transaction ledger associated with the particular market channel stored in the second processor-accessible memory device system. In some embodiments, the first data processing device system is configured, via the first program stored in the first processor-accessible memory device system and as at least part of determining the rating for the particular data processing device system, to: transmit a query, via the communications network, to a third data processing device system of the plurality of data processing device systems, the third data processing device system communicatively connected to a third input-output device system that is communicatively connected to the communications network, and the query including a request for rating information; receive a response to the query, via the communications network, the response including the rating information; and identify the rating for the particular data processing device system from the rating information.

According to some embodiments, the respective local copy of the at least the respective portion of the transaction ledger associated with the particular market channel stored by the second processor-accessible memory device system includes a first transaction information block set associated with an operation set with respect to inventory. The first transaction information block set may include a first digital signature associated with the first data processing device system, a second digital signature associated with a third data processing device system of the plurality of data processing device systems, a third digital signature associated with a fourth data processing device system of the plurality of data processing device systems, and a fourth digital signature associated with a fifth data processing device system of the plurality of data processing device systems. The third data processing device system may be communicatively connected to a third processor-accessible memory device system and a third input-output device system. The third input-output device system may be communicatively connected to the communications network. The fourth data processing device system may be communicatively connected to a fourth processor-accessible memory device system and a fourth input-output device system. The fourth input-output device system may be communicatively connected to the communications network. The fifth data processing device system may be communicatively connected to a fifth processor-accessible memory device system and a fifth input-output device system. The fifth input-output device system may be communicatively connected to the communications network. According to some embodiments, the first transaction information block set may include a fifth digital signature associated with a sixth data processing device system of the plurality of data processing device systems. The sixth data processing device system may be communicatively connected to a sixth processor-accessible memory device system and a sixth input-output device system. The sixth input-output device system may be communicatively connected to the communications network. The first transaction information block set may include indications of one or more transaction terms associated with the operation set with respect to the inventory. The first data processing device system may be associated with a provider of the inventory, the third data processing device system may be associated with a recipient of the inventory, the fourth data processing device system may be associated with a validator of at least a subset of the one or more transaction terms, and the fifth data processing device system may be associated with an arbiter of a failure of at least a subset of the one or more transaction terms. The sixth data processing device system may be associated with a tracker of transaction information in the transaction ledger associated with the particular market channel.

In some embodiments, the first transaction information block set includes encrypted product or service identifiers of the inventory. According to some embodiments, the first data processing device system is configured, via the first program stored in the first processor-accessible memory device system, to generate and provide the encrypted product or service identifiers of the inventory to the first transaction information block set according to a public encryption key associated with a tracker data processing device system of the plurality of data processing device systems, the tracker data processing device system associated with a tracker of transaction information in the transaction ledger associated with the particular market channel. The tracker data processing device system may be communicatively connected to a respective processor-accessible memory device system and a respective input-output device system. The respective input-output device system may be communicatively connected to the communications network. The respective processor-accessible memory device system associated with the tracker data processing device system may store a respective local copy of at least a respective portion of the transaction ledger associated with the particular market channel. The at least the respective portion of the transaction ledger associated with the particular market channel may include the first transaction information block set. In some embodiments, the tracker data processing device system is configured, via a respective program stored in the respective processor-accessible memory device system, to: decrypt the encrypted product or service identifiers according to a private encryption key associated with the tracker data processing device system and corresponding to the public encryption key associated with the tracker data processing device system. In some embodiments, the first transaction information block set indicates characteristics of products or services associated with the encrypted product or service identifiers. According to some embodiments, the tracker data processing device system is configured, via the respective program, to: verify that the decrypted product or service identifiers are associated with products or services that agree with the characteristics, and add a digital signature to the respective local copy of the at least the respective portion of the transaction ledger associated with the particular market channel stored in the respective processor-accessible memory device system, in response to verifying that the decrypted product or service identifiers are associated with products or services that agree with the characteristics.

In some embodiments, the first transaction information block set includes hash-identifiers of product or service identifiers of the inventory. The hash-identifiers may be respectively associated with the product or service identifiers of the inventory. According to some embodiments, the first data processing device system is configured, via a program stored in the first processor-accessible memory device system, to generate and provide the hash-identifiers to the first transaction information block set at least by executing a hash process on the product or service identifiers of the inventory. A tracker data processing device system of the plurality of data processing device systems may be communicatively connected to a respective processor-accessible memory device system and a respective input-output device system. The respective input-output device system may be communicatively connected to the communications network. The respective processor-accessible memory device system associated with the tracker data processing device system may store a respective local copy of at least a respective portion of the transaction ledger associated with the particular market channel. The at least the respective portion of the transaction ledger associated with the particular market channel may include the first transaction information block set. In some embodiments, the tracker data processing device system is configured, via a respective program stored in the respective processor-accessible memory device system, to: generate metadata associated with at least a particular hash-identifier of the hash-identifiers and not present in the respective local copy of at least the respective portion of the transaction ledger associated with the particular market channel, and store the generated metadata in association with the particular hash-identifier in the respective processor-accessible memory device system associated with the tracker data processing device system.

According to some embodiments, the first transaction information block set includes indications of a plurality of transaction terms associated with the operation set with respect to the inventory. At least one of the transaction terms may be encrypted in the first transaction information block set.

According to some embodiments, the first transaction information block set includes indications of a plurality of transaction terms associated with the operation set with respect to the inventory. At least one of the transaction terms may be encrypted in the first transaction information block set. In some embodiments, each of the first processor-accessible memory device system, third processor-accessible memory device system, fourth processor-accessible memory device system, and fifth processor-accessible memory device system stores a decryption key configured to decrypt the encrypted at least one of the transaction terms.

In some embodiments, the first transaction information block set includes product or service identification codes of the inventory, an indication or indications of one or more characteristics of the inventory besides product or service identification codes, or both the product or service identification codes of the inventory and the indication or indications of the characteristics of the inventory.

According to some embodiments, a transaction processing system includes a plurality of data processing device systems communicatively connected to a communications network. Each of the plurality of data processing device systems may be communicatively connected to a respective processor-accessible memory device system included in the transaction processing system and a respective input-output device system included in the transaction processing system. A first data processing device system of the plurality of data processing device systems may be communicatively connected to a first processor-accessible memory device system and a first input-output device system. The first input-output device system may be communicatively connected to the communications network. A second data processing device system of the plurality of data processing device systems may be communicatively connected to a second processor-accessible memory device system and a second input-output device system. The second input-output device system may be communicatively connected to the communications network. The first processor-accessible memory device system associated with the first data processing device system and the second processor-accessible memory device system associated with the second data processing device system may each store a respective program and a respective local copy of at least a respective portion of each of one or more transaction ledgers that record transactions. Each transaction ledger may be associated with a market channel. In some embodiments, the respective program stored by the first processor-accessible memory device system includes: generation instructions configured to cause generation of a transaction information block associated with a particular market channel, first storage instructions configured to cause storage of the generated transaction information block in the first processor-accessible memory device system as an update to the respective local copy of the at least the respective portion of the transaction ledger associated with the particular market channel, and transmission instructions configured to cause transmission of the generated transaction information block to the second data processing device system over the communications network via the first input-output device system. In some embodiments, the respective program stored by the second processor-accessible memory device system includes reception instructions configured to cause reception of the generated transaction information block over the communications network via the second input-output device system, and second storage instructions configured to cause storage of the received transaction information block in the second processor-accessible memory device system as an update to the respective local copy of the at least the respective portion of the transaction ledger associated with the particular market channel.

In some embodiments, a transaction processing method is executed by a first data processing device system communicatively connected to a communications network. The first data processing device system may be communicatively connected to a first processor-accessible memory device system and a first input-output device system. In some embodiments, the method includes: storing, executed by the first data processing device system and via the first processor-accessible memory device system, a local copy of at least a respective portion of each of one or more transaction ledgers that record transactions, each transaction ledger associated with a market channel; generating, executed by the first data processing device system, a transaction information block associated with a particular market channel; storing, executed by the first data processing device system and via the first processor-accessible memory device system, the generated transaction information block in the first processor-accessible memory device system as an update to the local copy of the at least the respective portion of the transaction ledger associated with the particular market channel; and transmitting, executed by the first data processing device system and via the first input-output device system, the generated transaction information block to a second data processing device system over the communications network.

In some embodiments, a computer-readable storage medium system includes one or more computer-readable storage mediums storing a program executable by one or more data processing devices of a data processing device system communicatively connected to an input-output device system and a communications network. According to some embodiments, the program includes a first storage module configured to store, on a particular one or more computer-readable storage mediums, a copy of at least a respective portion of each of one or more transaction ledgers that record transactions, each transaction ledger associated with a market channel; a generation module configured to generate a transaction information block associated with a particular market channel; a second storage module configured to store, on the particular one or more computer-readable storage mediums, the generated transaction information block as an update to the copy of the at least the respective portion of the transaction ledger associated with the particular market channel; and a transmission module configured to transmit, via the input-output device system, the generated transaction information block to a second data processing device system over the communications network.

According to some embodiments, a system includes a communications network and a plurality of data processing device systems communicatively connected to the communications network. Each of the plurality of data processing device systems may be communicatively connected to a respective processor-accessible memory device system and a respective input-output device system. The first data processing device system of the plurality of data processing device systems may be communicatively connected to a first processor-accessible memory device system and a first input-output device system. The first input-output device system may be communicatively connected to the communications network. The first processor-accessible memory device system associated with the first data processing device system may store a respective local copy of at least a respective portion of a transaction ledger that records a plurality of transactions associated with a particular market channel. In some embodiments, the first data processing device system is configured, via a first program stored in the first processor-accessible memory device system, to: identify a particular transaction of the plurality of transactions at least by causing searching of the transaction ledger, the particular transaction identifying at least an inventory item associated with a particular user account and identifying a transaction term set defining at least disposition of the inventory item, and transmit an instruction set, via the communication network, to a second data processing device system, the instruction set instructing the disposition of the inventory item.

The inventory item may include an identifier identifying the second data processing device system. The instruction set instructing the disposition of the inventory item may include one or more instructions instructing display of an image, text, audio, or video via a second input output device system communicatively connected to the second data processing device system. The instruction set instructing the disposition of the inventory item may include one or more instructions instructing transportation of the inventory item to a destination identified in the transaction term set. The second data processing device system may be associated with the particular user account. In some embodiments, the identifier is encrypted, and the first data processing device system is configured, via the first program, to decrypt the encrypted identifier utilizing a corresponding private decryption key, as a prerequisite to transmitting the instruction set to the second data processing device system. According to some embodiments, the first data processing device system is configured, via the first program, to generate an updated transaction information block indicating completion of all or a portion of the disposition of the inventory item, and transmit the generated updated transaction information block to a third data processing device system of the plurality of data processing device systems over the communications network via the first input-output device system. In some embodiments, wherein the third data processing device system is communicatively connected to a third processor-accessible memory device system and a third input-output device system. The third input-output device system may be communicatively connected to the communications network. In some embodiments, the third data processing device system is configured, via a third program stored in the third processor-accessible memory device system, to: receive the generated updated transaction information block over the communications network via the third input-output device system, validate the completion of all or the portion of the disposition of the inventory item indicated in the generated updated transaction information block, generate a second updated transaction information block indicating a result of the validation, and transmit the generated second updated transaction information block to one or more data processing device systems of the plurality of data processing device systems over the communications network via the third input-output device system.

According to some embodiments, a transaction processing system includes a first processor-accessible memory device system storing a program and a local copy of at least a portion of a transaction ledger that records a plurality of transactions associated with a particular market channel; a first input-output device system communicatively connected to a communications network; and a first data processing device system communicatively connected to the first input-output device system and the first processor-accessible memory device system. In some embodiments, the program stored by the first processor-accessible memory device system includes: identification instructions configured to cause identification of a particular transaction of the plurality of transactions at least by causing searching of the transaction ledger, the particular transaction identifying at least an inventory item associated with a particular user account and identifying a transaction term set defining at least disposition of the inventory item, and transmission instructions configured to cause transmission of an instruction set, via the first input-output device system and the communication network, to a second data processing device system, the instruction set instructing the disposition of the inventory item.

According to some embodiments, a transaction processing method is executed by a first data processing device system communicatively connected to a communications network. The first data processing device system may be communicatively connected to a first processor-accessible memory device system and a first input-output device system. In some embodiments, the method includes: storing, executed by the first data processing device system and via the first processor-accessible memory device system, a local copy of at least a portion of a transaction ledger that records a plurality of transactions associated with a particular market channel; identifying, executed by the first data processing device system, a particular transaction of the plurality of transactions at least by causing searching of the transaction ledger, the particular transaction identifying at least an inventory item associated with a particular user account and identifying a transaction term set defining at least disposition of the inventory item; and transmitting, executed by the first data processing device system and via the first input-output device system and the communication network, to a second data processing device system, the instruction set instructing the disposition of the inventory item.

According to some embodiments, a computer-readable storage medium system includes one or more computer-readable storage mediums storing a program executable by one or more data processing devices of a data processing device system communicatively connected to an input-output device system and a communications network. In some embodiments, the program includes: a first storage module configured to store, on a particular one or more computer-readable storage mediums, a copy of at least a portion of a transaction ledger that records a plurality of transactions associated with a particular market channel; an identification module configured to identify a particular transaction of the plurality of transactions at least by causing searching of the transaction ledger, the particular transaction identifying at least an inventory item associated with a particular user account and identifying a transaction term set defining at least disposition of the inventory item; and a transmission module configured to transmit, via the input-output device system over the communications network to a second data processing device system, the instruction set instructing the disposition of the inventory item.

Each of any or all of the computer-readable storage medium systems described herein may be a non-transitory computer-readable storage medium system including or consisting of one or more non-transitory computer-readable storage mediums.

According to some embodiments, a computer program product includes program code portions for performing the steps of any or all of each of methods described herein, when the computer program product is executed by a computing device. Each of any or all of such computer program products may be stored on one or more computer readable storage mediums.

Various embodiments of the present invention may include systems, devices, or machines that are or include combinations or subsets of any or all of the systems, devices, or machines and associated features thereof described herein.

Further, all or part of any or all of the systems, devices, or machines discussed herein or combinations or subcombinations thereof may implement or execute all or part of any or all of the methods and processes discussed herein or combinations or subcombinations thereof.

Any of the features of all or part of any or all of the methods and processes discussed herein may be combined with any of the other features of all or part of any or all of the methods and processes discussed herein. In addition, a computer program product may be provided that comprises program code portions for performing some or all of any or all of the methods and processes and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any or all of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of one or more of the methods and processes described herein.

Further, any or all of the methods and associated features thereof discussed herein may be implemented or executed by all or part of a device system, apparatus, or machine, such as all or a part of any of the systems, apparatuses, or machines described herein or a combination or sub combination thereof.

BRIEF DESCRIPTION OF DRAWINGS

It is to be understood that the attached drawings are for purposes of illustrating aspects of various embodiments and may include elements that are not to scale.

FIG. 5 shows data associated with (e.g., stored by, processed by, or both) a computing device system of FIG. 1, 2, 3, or 4, according to some embodiments of the invention.

FIG. 8A is a flowchart showing example implementation details of Step 605 of the methods of FIG. 7, according to some embodiments of the invention.

FIG. 19 illustrates an example database, or portion thereof, linking product or service identifiers and user accounts, according to some embodiments of the invention.

DETAILED DESCRIPTION

Figure 1:
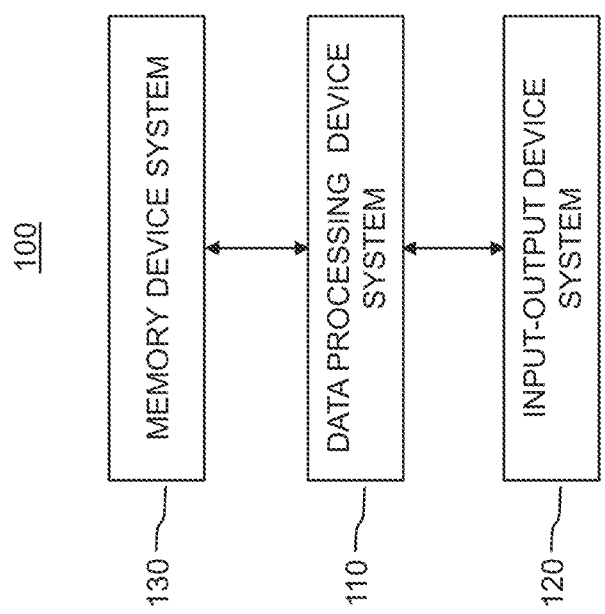
FIG. 1 shows a computing device system, according to some embodiments of the present invention.

As discussed above, conventional transaction systems that facilitate the provision of goods or services require a great deal of manual and independent interactions between the many entities involved in a transaction. Some conventional attempts to automate the manual aspects of such a transaction have resulted in centralized computer-based arrangements, where, e.g., a particular DSP (Demand Side Provider) must be connected to multiple available SSPs (Supply Side Providers). The inventors of the present invention realized that such a requirement of this conventional centralized transaction arrangement creates an architectural bottleneck on the number of DSPs that can interact with the SSPs. Further, the inventors of the present invention recognized that such a conventional centralized transaction system is relatively susceptible to system-wide failure due to its hub-and-spoke arrangement, should the hub (e.g., a website or other platform provided by the DSP) fail.

The inventors of the present invention have noted that it is not practical in the conventional centralized, hub-and-spoke transaction system to accommodate all of the entities necessary to execute a transaction, leaving many tasks in the process left to manual direct interaction outside the system. For at least this reason, the inventors of the present invention realized that the conventional centralized transaction system is inefficient, at least in that it requires too many tasks in the transaction process be manually performed.

Further, the inventors of the present invention recognized that, in the conventional centralized transaction system, in most cases, an advertiser must still consult and work with multiple DSPs—which is complex, inefficient, costly, and time consuming. The inventors of the present invention understood that there is also the concern that by working with multiple DSPs, the advertiser may, in fact, be competing with themselves if multiple DSPs from which the advertiser is buying are connected to the same SSPs. (In this case, the same advertiser is driving the cost up against themselves via two separate DSPs).

In light of at least these shortcomings of the conventional transaction systems, the inventors of the present invention have invented and describe herein (i.e., including the figures), among other notable features described herein, an improved architecture of a transaction system, according to at least some embodiments of the present invention. In some embodiments, the improved architecture includes an improved data structure and transaction system architecture (hardware and software configurations) including a storage of copies or at least partial copies of the improved data structure at a plurality of distributed nodes (respectively including data processing device systems) communicatively connected over a communications network. In some embodiments, the improved data structure includes blocks of information (or transaction information blocks) that record details describing transactions at various stages of the transaction execution process. In some embodiments, the transaction information blocks are added to or at least one of which is updated to record new events in the transaction process. In this manner, an entire history of each individual transaction is recorded in the improved data structure and made available to the distributed nodes, according to some embodiments. As a transaction information block is added or updated in the improved data structure, the improved transaction system architecture transmits the added or updated transaction information block to each of at least a plurality of nodes of the communication network, according to some embodiments, so that the respective local copies of the improved data structure are promptly updated and widely available throughout the system. With respective local copies of the improved data structure promptly updated and accessible throughout the communications network, according to some embodiments, the improved data structure and improved transaction system architecture provides each node in the network the ability to independently view and participate in a plurality of transactions without having to request or receive requests for transaction information from a central node, thereby eliminating the bottlenecks of the conventional centralized transaction systems that constrain the interactions between entities involved in the transactions.

In addition, with the removal of dependency on a central node by various embodiments of the improved data structure and improved transaction system architecture, resilience to failure is greatly improved over the conventional centralized transaction system, as the improved architecture includes multiple nodes containing the improved data structure recording the history of transactions, thereby requiring the failure of all or a great proportion of such nodes (an unlikely event) to cause failure of the whole system. In addition, with multiple nodes in the inventive improved architecture storing the improved data structure recording the history of transactions, it becomes quite difficult to introduce a fraudulent transaction into the system, as the fraudulent transaction will not be recorded in any of the remote copies of the improved data structure, and, consequently, the fraudulent transaction is relatively easily identifiable.

The inventors of the present invention have not found the conventional centralized transaction system to contemplate such features or benefits.

Further in this regard, in some embodiments, the improved data structure includes one or more indications of node types involved in each transaction, such as 'buyer', 'seller', 'validator', 'arbiter', 'tracker', 'ratings agency', etc. discussed below, thereby providing for many different types of entities to be associated with each transaction. Consequently, the transaction system architecture provides flexibility with the ability for many different types of entities to be involved in the respective transactions in an automated manner within the improved system, significantly reducing the need for manual actions outside the system to complete a transaction, as compared to the above-discussed conventional transaction system, which is quite constrained with respect to entity-type participation.

In addition, with the removal of dependency on a central node by various embodiments of the improved data structure and improved transaction system architecture, cost reduction may be achieved as compared to the conventional centralized transaction system. For example, the inventive improved data structure and improved transaction system architecture according to various embodiments of the present invention may provide a single network that includes all necessary entities to a transaction, whereas the conventional centralized transaction system would require multiple networks to engage multiple DSPs and SSPs, and would exclude various other types of entities that may be needed to complete a transaction.

Further, embodiments of the improved data structure is entity-type independent, meaning that a single data structure may be utilized for all of the different entity types, further facilitating wide ranging participation in the system; features and benefits not understood to be contemplated by the above-discussed conventional systems.

Further still, the storage of the improved data structure or portions thereof at multiple nodes due to the improved transaction system architecture, according to various embodiments of the present invention, allows all transactions to be publicly available, thereby providing easier access to various entities and potentially increased competition. However, the inventors of the present invention recognized that in such a public-distribution-system, privacy and security issues may arise that apparently are not contemplated in the above-discussed conventional transactional systems. For example, in an advertising context or market channel, a publisher may provide an application (e.g., an "app") that is loaded onto multiple customers' mobile devices, and that application may provide the ability to present advertisements to the customers when the customers are executing the app on their mobile devices. In this situation, the publisher may have a list of device identifiers (e.g., MAC addresses or other device identifiers known in the art) that uniquely identify each of its customers' mobile devices. In order to sell to buyers (e.g., content providers or brokers) the ability to present advertisements to the publisher's customers through the publisher's app, the publisher may need to identify the mobile devices that the publisher has on its list. However, the mobile device identifiers (e.g., "device IDs") may be considered private personal or business information and, it may not be desirable to disclose them to the buyer. Recognizing this potential issue, some embodiments of the inventive improved transaction system architecture utilize a public encryption key accessible to the publisher or other seller to encrypt the device IDs or other sensitive information present in the improved data structure. In some embodiments of the improved transaction system, should another entity, which is trusted by the publisher or other seller, need access to the encrypted device IDs or sensitive information, for example, to validate that the publisher or other seller is providing device IDs of devices that would be acceptable to the buyer, the other entity may utilize a private decryption key associated with the public encryption key, in order to privately decrypt the device IDs or other sensitive information to, e.g., perform its validation task. Accordingly, various embodiments of the improved data structure and improved transaction system architecture strike an efficient balance between maintaining information security and providing open, efficient, public access to the transaction information, issues which are not contemplated in the conventional transaction system.

Some embodiments of the improved data structure and improved transaction system architecture include a recordation of reputational ratings for entities involved in any particular transaction. Such ratings may be provided by a particular entity that specializes in doing so, such as a ratings agency, and multiple sets of ratings may be recorded from multiple different ratings entities, as each ratings entity may provide its own methodology in rating. With such ratings, a strong incentive is provided for entities in the improved transaction system to conduct themselves honorably. For example, if an entity performing validation services abuses its access to decrypted device IDs, such entity may be penalized in its rating, which would be publicly available due to various embodiments in the improved transaction system. Or, if a seller or buyer fail to meet obligations defined in terms identified in the improved data structure, such entity or entities would be penalized in the respective rating(s), according to some embodiments of the present invention. Accordingly, various embodiments of the improved data structure and improved transaction system architecture provide an incentive, not contemplated in the conventional transactional system, to conduct transactions properly that is promptly and easily discernible by all or at least multiple nodes due to the improved transaction system by including the various entities' ratings in a distributed data structure.

In addition, the storage of the improved data structure or portions thereof at multiple nodes due to the improved transaction system architecture according to various embodiments of the present invention allows multiple entities to perform searching and analysis of the transaction histories stored in the improved data structure, where each of the multiple entities may develop its own methodology for searching or analyzing the transaction histories. Accordingly, various embodiments of the improved transaction system architecture makes possible a competitive landscape of different searching or analysis providers (e.g., trackers, validators, arbiters, and ratings agencies described herein), where providers with the best methodologies may develop a competitive advantage, which is not understood to be provided for in the above-discussed conventional transaction systems.

In this regard, due to the publicly-distributed nature of transaction information and histories according to various embodiments of this improved architecture, the inventors of the present invention recognized that there may be instances where unknown or not-necessarily-trusted entities are performing searching and/or analysis on the transaction information and histories. Due to this type of architecture, the inventors of the present invention recognized that it may be desirable in some circumstances to retain privacy or confidentiality of certain information in the transaction information and histories, while not inhibiting the potentially valuable searching and analysis being performed by such entities. In this context, the inventors of the present invention recognized that, while the above-discussed encryption architectures may be beneficial in some circumstances, such encryption may lead to different values or representations of the same information at different times, depending on the encryption techniques used. Having different values or representations of the same information at different times could inhibit proper searching and analysis of the transaction information in some circumstances. For example, it may be difficult to perform trend analysis or to properly link supplemental information, such as metadata acquired by a search provider, to a confidential data object, such as a device ID, if the confidential data object (e.g., device ID) appears in the transaction histories of the inventive improved data structure as different encrypted representations over time. Accordingly, the inventors of the present invention construct various embodiments of the improved transaction system architecture to include hash values of such confidential data object(s) in the improved data structure, since the hash values essentially cannot be decrypted, but retain a persistent representation over time. According to these embodiments, a search or analysis provider may, e.g., use the hash value or hash ID of a device ID (or other confidential data object) to recognize the same device (or other confidential data object) throughout multiple transaction histories, without the search or analysis provider ever knowing the actual device ID (or other confidential data object). Hence, for example, the publisher or other seller is able to take advantage of third-party entities developing a rich set of analysis and metadata on its inventory of device IDs (or other confidential data object) to increase the opportunities for the publisher or other seller to sell its inventory of device IDs (or other confidential data object), without surrendering the confidentiality of the publisher's or other seller's inventory of device IDs (or other confidential data object). The conventional transaction system apparently does not contemplate these problems or these inventive solutions.

Due to the architecture of the improved transaction system and data structure, various entities do not need to explicitly notify each other of the completion of various steps in a transaction process, or of changes to previously completed steps. In some embodiments, the responsible entities simply digitally sign a transaction information block that is published in the improved data structure, which is propagated throughout the improved transaction system. Each individual entity has the ability to read the transactions recorded in the improved data structure and take appropriate action. Because various embodiments publicly distribute the improved data structure, and the corresponding transactions are visible to all entities in the improved transaction system, the improved transaction system is self-regulated or policed, without the requirement of a central control or policing entity present in the above-discussed conventional systems. As discussed above, this improved architecture also makes it difficult for an entity to insert false information into the improved data structure, at least because false information inserted into one copy of the improved data structure will not be present in the historical data of other copies of the improved data ledger. Accordingly, such false information is relatively easy to identify.

Various embodiments of the present invention include in the improved data structure transaction terms that facilitate completion of the respective transaction. With this architecture, the inventors of the present invention recognized that different market channels may need different types of transaction terms and, therefore, it may be cumbersome in some contexts to have the improved data structure contain transaction histories for multiple market channels. For example, transactions in a mobile-device-advertisement market channel may regularly include a transaction term identifying the number of times an advertisement is presented by a particular customer's mobile device. However, in a market channel for home-construction-and-repair, such a transaction term would be unnecessary, but other transaction terms would be regularly included. Accordingly, various embodiments of the improved transaction system architecture include an instance of the improved data structure for each market channel. By associating an instance of the improved data structure with a particular market channel, a set or sets of transaction terms that are specialized to the particular market channel may be efficiently provided, according to various embodiments of the invention. In addition, sets of entities, such as trackers (e.g., search providers), arbiters, validators, ratings agencies, etc., that are specialized to the particular market channel may efficiently develop as they continually work from the instance of the improved data structure specific to that market channel. The conventional transaction system does not contemplate these problems or these inventive solutions.

The improved data structure is referred to herein in shorthand as a transaction ledger or distributed ledger. Although the phrases "transaction ledger" and "distributed ledger" are used merely for ease of discussion, such phrases should not be used to ignore or simplify the underlying improvements and importance thereof described above and otherwise in this disclosure in the inventive improved data structure compared to those in conventional transaction systems, especially within the context of the inventive improved transaction system architecture as a whole, as such improved data structure and improved transaction system architecture make possible many significant and valuable features not believed to be previously contemplated or practically achievable. In this regard, while there are many other ways to implement a transaction system not covered by the present inventive improved transaction system architecture and data structure, the various embodiments of the present invention provide significant benefits, e.g., as discussed above and otherwise in this disclosure.

Some embodiments of the present invention pertain to self-regulating transaction systems and methods. One or more of the transaction systems and methods may include a plurality of computing devices (e.g., one or more of the systems 100, discussed below). The computing devices may be digital representations of various entities associated with one or more of the transaction systems and methods communicatively connected to each other via network systems such as the Internet. One or more of the self-regulating transaction systems and methods may include a distributed data store available, in whole or in part, to each computing device, or entity. In some embodiments, the data store may be a transaction ledger that maintains a complete or partial history of transactional activity in one or more of the transaction systems. In some embodiments, particular ones of the computing devices may have a complete copy of the transaction ledger associated therewith, and other ones of the computing devices may have a partial copy of the transaction ledger associated therewith. In some embodiments, the partial copy of the transaction ledger may include transactional activity for a specific time period, for example, twenty four hours or some other defined time period. The partial copy of the transaction ledger may be implemented as a rolling ledger where transactional activity older than 24 hours is deleted from the transaction ledger and new transactional activity is added to the transaction ledger.

One or more of the transaction systems and methods may include a plurality of computerized markets (also referred to as channels or market channels), such as Internet or other network-based markets, for transactions of goods (e.g., products), services, or both. Each computing device in one or more of the transaction systems may represent one or more entities associated with one or more of the market channels. For example, one or more of the transaction systems and methods may include buyers and sellers posting, negotiating, and executing transactions; trackers searching through posted transactions on behalf of buyers and sellers to identify offers of interest; validators verifying the progress and completion of negotiated transactions; arbiters adjudicating disputes in the event of incomplete transactions; and ratings agencies providing feedback on various entities participating in the transaction systems and methods. Each computing device may store one or more transaction ledgers, each transaction ledger associated with a particular market channel. In some embodiments, one or more of the computing devices may be configured to generate new market channels within one or more of the transaction systems and methods and others of the computing devices may be configured to participate in the existing or newly generated market channels.

In some embodiments, the computing devices may be configured to execute instructions provided by programs implementing one or more methods for conducting and verifying transactions in one or more of the transaction systems. In some embodiments, one or more of the computing devices may have access to one or more stored programs. In some embodiments, executing the instructions provided by the programs may include reading transactional activity recorded in the transaction ledger or writing new transactional activity to the transaction ledger. In some embodiments, each of one or more computing devices stores a local copy of at least a portion of the transaction ledger associated therewith. In some embodiments, each of one or more computing devices may be configured by the program(s) to distribute at least updates made to its local copy to one or more other computing devices in one or more of the transaction systems over the network when the computing device makes changes to its local copy of the transaction ledger.

In the following description, certain specific details are set forth in order to provide a thorough understanding of various inventive embodiments. However, one skilled in the art will understand that other embodiments may be practiced without these details. In other instances, well-known structures have not been shown or described in detail to avoid unnecessarily obscuring descriptions of various inventive embodiments.

Any reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, any appearance of the phrase "in one embodiment" or "in an embodiment" or "in an example embodiment" or "in this illustrated embodiment" or "in this particular embodiment" or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects. In addition, unless otherwise explicitly noted or required by context, the word "subset" is intended to mean a set having the same or fewer elements of those present in the subset's parent or superset.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configure to A' includes a configuration to perform A, as well as the possibility of one or more other additional actions besides A. However, the phrase, 'configured only to A' means a configuration to perform only A.

The word "device", the word "machine", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, or device system resides across different housings. The word "device" may equivalently be referred to as a "device system" in some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to at least the memory device system 130 shown in FIG. 1. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the function. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. For another example, "image information Y" may undergo a noise filtering process, and a reference to "image information Y" is intended to include both the pre-processed form and the noise-filtered form, unless otherwise required or indicated by context. In other words, both the pre-processed form and the noise-filtered form are considered to be "image information Y", unless otherwise required or indicated by context. In order to stress this point, the phrase "or a derivative thereof" or the like may be used herein. Continuing the preceding example, the phrase "image information Y or a derivative thereof" refers to both the pre-processed form and the noise-filtered form of "image information Y", unless otherwise required or indicated by context, with the noise-filtered form potentially being considered a derivative of "image information Y". However, non-usage of the phrase "or a derivative thereof" or the like nonetheless includes derivatives or modifications of information or data just as usage of such a phrase does, as such a phrase, when used, is merely used for emphasis.

FIG. 1 schematically illustrates a computing device system, according to some embodiments of the present invention. In some embodiments, the system 100 may provide respective instances of nodes 102 (e.g., FIGS. 3 and 4, discussed below) of a self-regulating transaction system 101, or the system 100 may represent more than one or all of such nodes 102, according to some embodiments. The system 100 may include a data processing device system 110, an input-output device system 120, and a processor-accessible memory device system 130. The processor-accessible memory device system 130 and the input-output device system 120 are communicatively connected to the data processing device system 110. In some embodiments, the phrase "computing device" may be defined as the entirety of the system 100. In some embodiments, the phrase "computing device" may be defined as all or a portion of the data processing device system 110. In some embodiments, the phrase "computing device system" may be defined as one or more computing devices.

The data processing device system 110 may include one or more data processing devices that implement or execute, in conjunction with other devices, such as one or more of those in the system 100, methods of various embodiments of the present invention, including the example methods of each of FIGS. 7, 8B, and 9-12 described herein. Each of the phrases "data processing device", "data processor", "processor", "computing device", and "computer" is intended to include any data processing device, such as a central processing unit ("CPU"), a desktop computer, a laptop computer, a mainframe computer, a tablet computer, a smartphone, a personal digital assistant, and any other device configured to process data, manage data, or handle data, whether implemented with electrical, magnetic, optical, biological components, or other.

The memory device system 130 may include one or more processor-accessible memory devices configured to store program instructions and other information, including the information, such as that shown in FIGS. 5, 6A, 6B, 8B, and 13-19 and program instructions needed to execute the methods of various embodiments, including the example methods of each of FIGS. 7, 8B, and 9-12 described herein. In this regard, each of the steps illustrated in the example methods of each of FIGS. 7, 8B, and 9-12 may represent program instructions stored in the memory device system 130 and configured to cause execution of the respective step. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device or medium, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the processor-accessible memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system or data storage medium system including or consisting of one or more non-transitory processor-accessible (or computer-readable) storage or data storage mediums.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 may be implemented by a single application-specific integrated circuit (ASIC) in some embodiments.

The input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving a selection, information, instructions, or any other data from other devices or systems described in various ones of the embodiments.

The input-output device system 120 also may include an image generating device system, a display device system, a speaker device system, a computer, a processor-accessible memory device system, a network-interface-card or network-interface circuitry, or any device or combination of devices to which information, instructions, or any other data is output by the data processing device system 110. In this regard, the input-output device system may include various other devices or systems described in various embodiments. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

Figure 2:
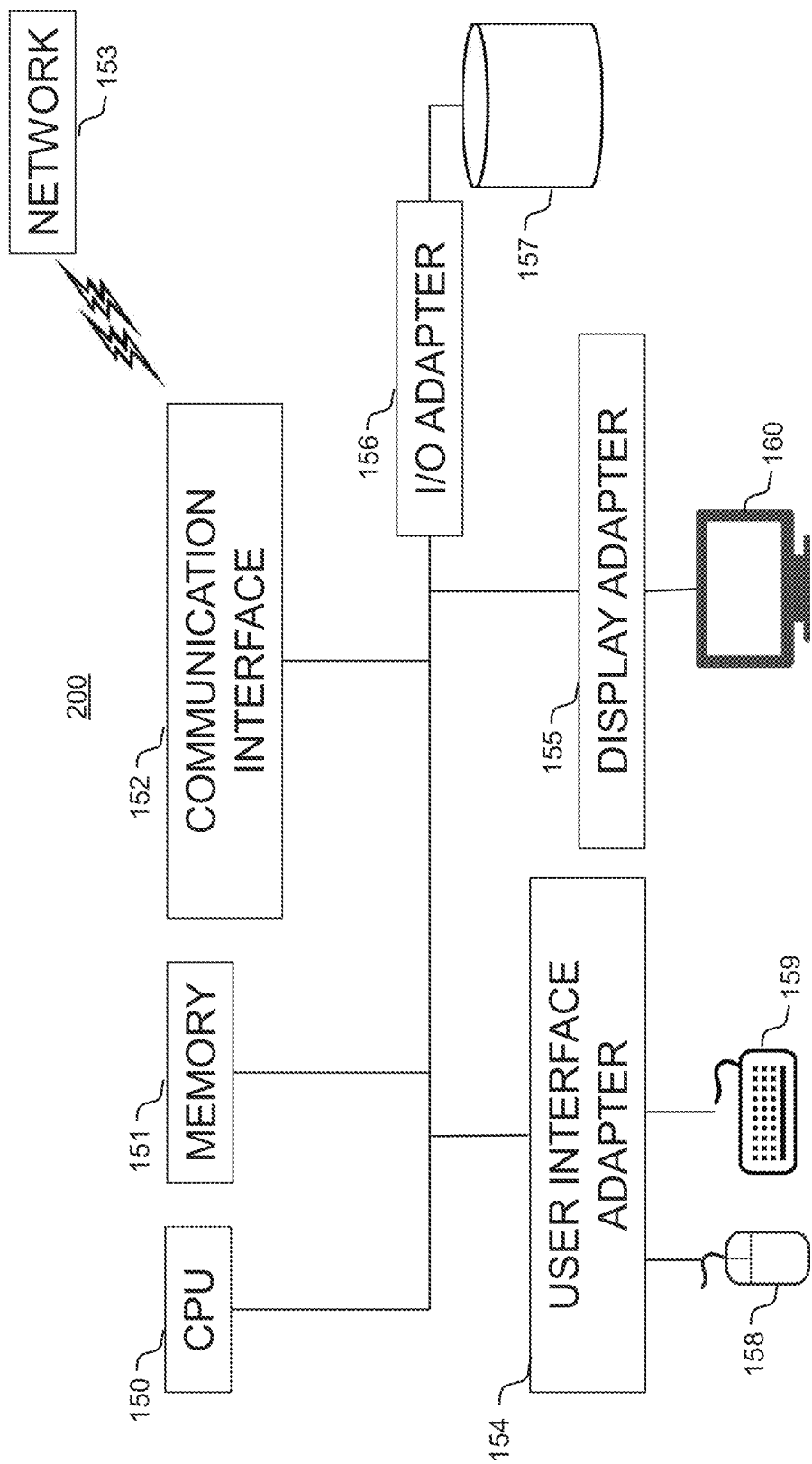
FIG. 2 shows a computing device system, which may be a particular implementation of all or part of the computing device system of FIG. 1, according to some embodiments of the invention.
Figure 3:
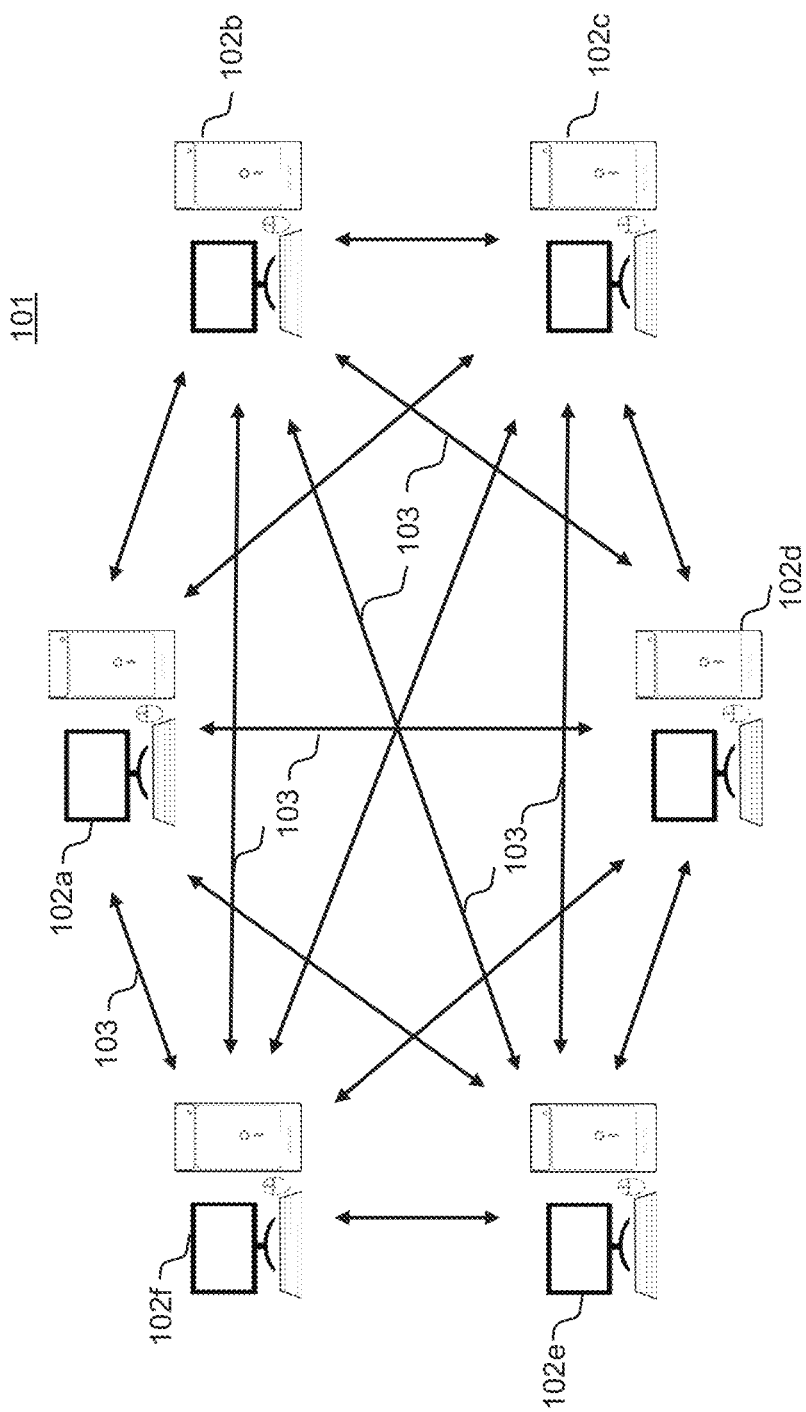
FIG. 3 shows a transaction system including a network of computing devices or device systems, wherein the transaction system may be a particular implementation of all or part of the computing device system of FIG. 1, according to some embodiments of the invention.
Figure 4:
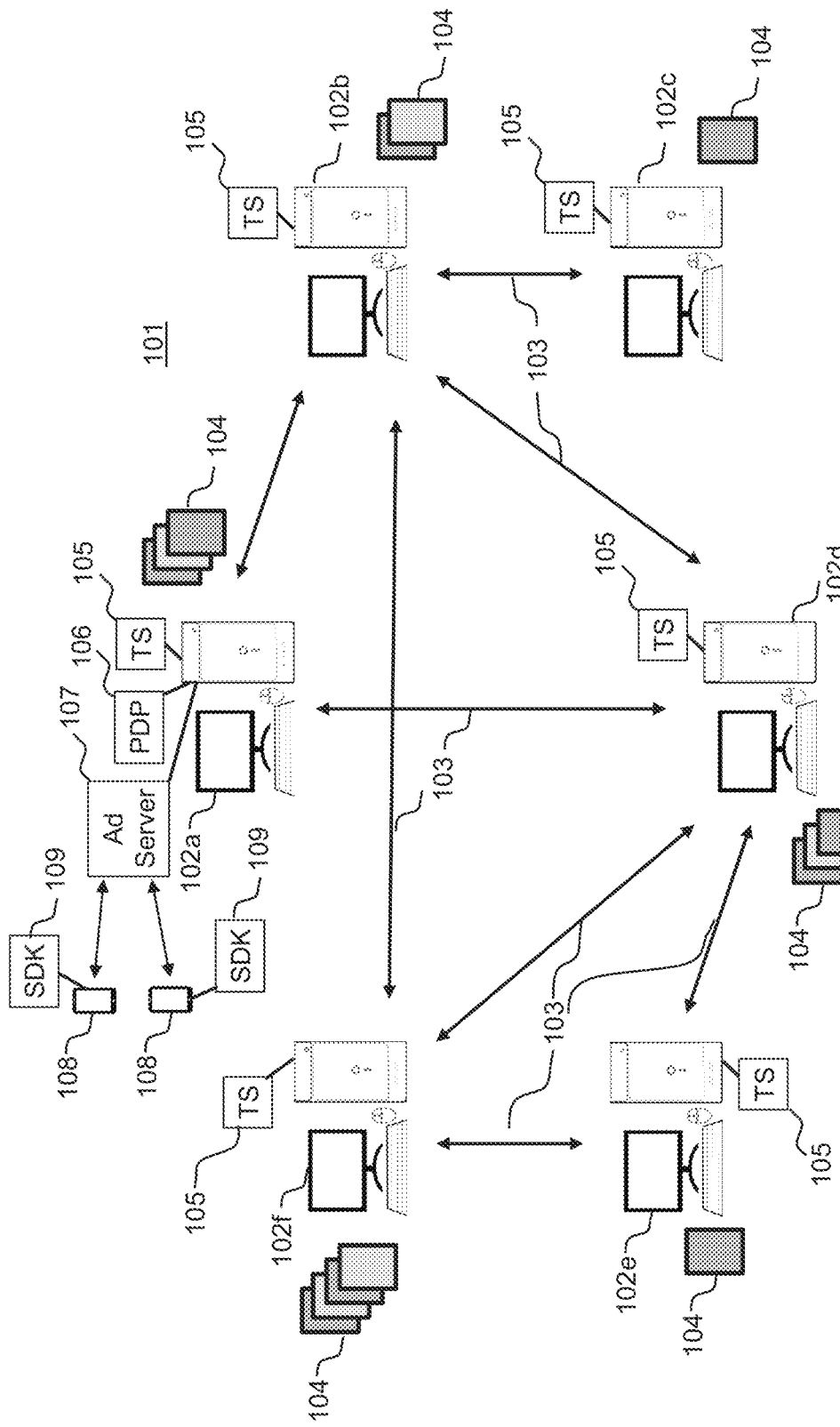
FIG. 4 shows a transaction system including a network of computing devices or device systems, wherein the transaction system may be a particular implementation of all or part of the computing device system of FIG. 1, according to some embodiments of the invention.

According to various embodiments of the present invention, the system 100 includes some or all of the systems shown in each of at least FIGS. 2, 3, and 4.

FIG. 2 shows an example of a computing device system 200, which may be a particular implementation of all or part of the computing device system 100 of FIG. 1, according to some embodiments. In this regard, the system 200 of FIG. 2 may also represent all or a part of a node 102 discussed further below with respect to at least FIGS. 3 and 4. The computing device system 200 may include a processor 150, which may correspond to an embodiment of the data processing device system 110 of FIG. 1, in some embodiments. The non-transitory random-access memory 151, input/output (I/O) adapter 156, and non-transitory storage medium, such as a hard disk drive, 157 may correspond to an embodiment of the processor-accessible memory device system 130 of FIG. 1, according to some embodiments. Although, the I/O adapter 156 may also be considered part of the input-output device system 120 of FIG. 1, according to some embodiments. The user interface adapter 154, mouse 158, keyboard 159, display adapter 155, display 160, and communication interface 152 may correspond to an embodiment of the input-output device system 120 of FIG. 1, according to some embodiments. The communication interface 152 communicatively connects to a communications network 153 for communicating with other computing device systems 200 or 100, or nodes 102, according to some embodiments.

FIG. 3 shows an example of a system 101, according to various example embodiments. The system 101 may be a particular implementation of all, part, or respective instances of the computing device system 100 of FIG. 1 or 200 in FIG. 2. In some embodiments, the system 101 provides a self-regulating transaction system for transaction of goods, services, or both. The transaction system 101 includes a plurality of nodes 102 (six called out as reference parts 102a, 102b, 102c, 102d, 102e, and 102f in the example embodiments shown in FIG. 3). In some embodiments, the computing devices 100 of FIG. 1 and 200 of FIG. 2 may provide each of at least some or all of the nodes 102. In this regard, each node 102 may represent an instance of the computing device 100 or 200, or the computing device 100 may be considered to represent a plurality or all of the nodes 102. The nodes 102 may be communicatively connected to each other using well-known communication systems providing communication channels 103 (for clarity of drawing, not all communication channels are labeled in FIG. 3). Examples of communication systems include, but are not limited to, local area networks (LANs), wide area networks (WANs), cellular networks, or the Internet. In some embodiments, the communications network 153 of FIG. 2 may provide the communication channels 103. In this regard, according to some embodiments, the system 101 may include a plurality of nodes 102, each node 102 including a data processing device system communicatively connected to a communications network (e.g., network 153) providing communication channels 103.

Accordingly, in some embodiments, the system 101 may include a plurality of data processing device systems (e.g., 100 or 200) communicatively connected to a communications network (e.g., network 153). In some embodiments, each respective data processing device system (e.g., 100 or 200) within each node 102 is communicatively connected to a respective processor-accessible memory device system (e.g., 130 or 151, 157, or both 151 and 157) and respective input-output device system (e.g., 120 or 151, 152, 154, 155, 156, 157, 158, 159, 160, or a combination thereof). In some embodiments, each of one or more of the respective processor-accessible memory device systems of the nodes 102 stores a program that configures the respective data processing device system of the node 102 to execute all or a portion of each of one or more of the processes disclosed herein, such as those described with respect to at least FIGS. 7-12, below.

In some embodiments, the system 101 may be a peer-to-peer (P2P) network. Each node 102 may be directly or indirectly communicatively connected to the other nodes 102 via communication channels 103. The communication channels 103 may be open (unencrypted) or encrypted to provide secure communication between the nodes 102. Each node 102 may interact with another node 102, even if the communication path requires the communication to be transmitted via communication channels communicatively connected to an intermediate third node 102. In some embodiments, intermediate nodes in a communication path communicatively connecting two particular nodes 102 serve as message routers to provide a communications link between two particular nodes 102.

For example, as shown in FIG. 4, node 102a is directly communicatively connected to nodes 102b and 102d. Node 102a is indirectly communicatively connected to node 102c via intermediate node 102b. Node 102a is also indirectly communicatively connected to node 102e via intermediate node 102d and to node 102f via either of intermediate nodes 102b or 102d. It should be noted that communications do not have to follow the shortest route. For example, node 102a is also communicatively connected to node 102c via the sequential connection to intermediate nodes 102d and 102b. In some embodiments, the communication path defined by a fewer number of intermediate nodes 102 may not be the preferred path, or provide efficient communication. For example, a physical (geographic) location of each of the nodes 102 may affect the communication efficiency along the communication channels 103 connecting the nodes 102. The communication efficiency may also be affected by the speed or capacity of the particular communication channels 103 connecting the nodes 102.

Each node 102 in the transaction system 101 may include at least a portion of each of one or more distributed transaction ledgers 104. For example, the respective processor-accessible memory device system 130 of each node 102 may store at least a portion of each of one or more distributed transaction ledgers 103. In other words, for example, at least two processor-accessible memory device systems (e.g., 130) of at least two respective data processing device systems (e.g., 110) of two respective nodes 102 may each store a respective local copy of at least a respective portion of each of one or more transaction ledgers 104 that record transactions, each transaction ledger 104 associated with a market channel, according to some embodiments.

Each of one or more nodes 102 may execute a transaction server program ("TS") 105 stored on a respective processor-accessible memory device system 130. The TS may be configured to manage viewing, modification (including generation), and exchange of at least a portion of the transaction ledger(s) 104. In some embodiments, each transaction ledger 104 may be associated with a particular market channel. Each node 102 in the transaction system 101 may be configured to execute various programs or methods associated with one or more market channels. In some embodiments, the programs or methods executed by a particular node 102 may correspond to a role of the particular node 102 in a particular market channel provided by the transaction system 101. In some embodiments, the transaction system 101 may have an advertisement market channel (ad-channel) associated therewith including a respective transaction ledger 104. In some embodiments, the transaction system 101 may have a single ad-channel associated therewith including a respective transaction ledger 104. In some embodiments, the transaction system 101 may have more than one ad-channel, or a plurality of various market channels associated therewith, each including a respective transaction ledger 104.

In some embodiments, the system 101 is an advertisement marketing transaction system also referred to as an ad-system 101. The ad-system 101 is not limited to a single market channel or transaction ledger 104 and may include a plurality of such market channels and respective transaction ledgers. Although various embodiments herein may be described with reference to an ad-system 101, or a transaction system 101 providing an ad-channel, the particular features, structures or characteristics described with reference to an ad-system or ad-channel may be applicable to the other or to a transaction system supporting another market channel.

In some embodiments, the architecture of system 101 configures each transaction ledger 104 to be associated with a respective market channel. With such an architecture, each instance of the improved transaction ledger data structure 104 may be efficiently customized to provide a respective set or sets of transaction terms that are specialized to the particular market channel with which the transaction ledger data structure 104 is associated. In addition, sets of entities, such as trackers (e.g., search providers), arbiters, validators, ratings agencies, etc., that are specialized to the particular market channel may efficiently develop as they continually work from the instance of the transaction ledger data structure 104 specific to that market channel. In the example of FIG. 4, node 102f may be participating in four different market channels, as FIG. 4 illustrates node 102f storing, in its processor-accessible memory device system 130, all or a portion of each of four different instances of transaction ledger data structure 104. On the other hand, in the example of FIG. 4, node 102b is illustrated as participating in two different market channels with the illustration of all or a portion of each of two different instances of transaction ledger data structure 104 being stored by node 102b in its processor-accessible memory device system 130. However, in the example of FIG. 4, node 102c is illustrated as only participating in one market channel with the illustration of all or a portion of each of a single instance of the respective transaction ledger data structure 104 stored in its processor-accessible memory device system 130. In this regard, it can be seen that any node 102 may participate in any number of market channels by storing or accessing all or a respective portion or portions of the respective transaction ledger data structure(s) 104, according to various embodiments of the present invention.

In this regard, each rectangular illustration of a transaction ledger data structure 104 may be interpreted as representing an entire respective transaction ledger or a respective portion of the respective transaction ledger. For instance, node 102c may store the entirety of the transaction ledger 104 for a particular market channel, but node 102e may store a portion of such transaction ledger 104 for the particular market channel, according to some embodiments. In this regard, for example, the transaction ledger 104 illustrated in FIG. 4 next to node 102e may represent a portion of the transaction ledger 104 illustrated in FIG. 4 next to node 102c. Also in this regard, the partial transaction ledger 104 stored by node 102e in this example may include a link, such as a pointer or other reference known in the computer fields to the complete transaction ledger 104 stored by node 102c, so that the system 101 as a whole retains the information necessary to synchronize different copies of the same transaction ledger 104 via transaction servers 105. Similarly, if the transaction ledger 104 stored by node 102e represents a first portion of an entire transaction ledger associated with a particular market channel, if the transaction ledger 104 stored by node 102c represents the remainder of the entire transaction ledger associated with the particular market channel, the transaction ledger 104 stored by node 102e may link to the transaction ledger 104 stored by node 102c, and vice versa, so the system 101 as a whole retains the information necessary to generate, via the transaction server programs 105 the entire transaction ledger if requested by any particular node 102. In the event that a node 102 desires to delete a portion of its copy of a transaction ledger 104, some embodiments, the respective TS 105 may be configured to ensure that the portion to be deleted exists elsewhere in the system 101 via communication with other transaction server programs 105. If such portion does not exist elsewhere in the system 101, deletion of such portion may be prevented, or such portion may be transmitted to another node 102, possibly a pre-designated storage node 102, for storage, so that such portion is retained somewhere within the system 101.

The ad-system 101 (or ad-channel provided by transaction system 101) may provide a transaction system where entities, such as advertisers, DSPs, publishers, and SSPs (also referred to as ad networks) can participate in one or more open market channels. In some embodiments, the ad-system 101 allows advertisers or DSPs to openly publish their advertisement offers in the transaction ledger 104. Similarly, publishers or SSPs may openly publish their impression inventory in the transaction ledger 104. Corresponding participants may search for offers or impressions stored in the transaction ledger data structure 104 utilizing a search-engine-providing tracker entity to find and subsequently accept or consume each offer or impression. For example, a publisher or SSP may accept an advertisement offer published by an advertiser or DSP. An advertiser or DSP may consume an impression made available by a publisher or SSP. In some embodiments, corresponding participants may negotiate and set terms for the offer or the impression. The ad-system 101 may include a settlement system including validators to confirm execution of the agreed to terms, delivery of services or goods, and traceability. In some embodiments, the settlement system may include arbiters or ratings agencies.

In this regard, in various embodiments of the transaction system 101, the nodes 102 may each be configured by respective programs stored in processor-accessible memory device systems 130 to function in particular roles on behalf of entities participating in the marketplace. These roles may include (but are not limited to) buyers (who may be advertisers or DSPs), sellers (who may be publishers or SSPs), arbiters (who facilitate successful transactions by providing mediated dispute resolution services), trackers (who provide insight into the state of the marketplace and offer Application Programmable Interfaces or APIs to facilitate low-latency offer searches and channel discovery), ratings agencies (who monitor marketplace transactions to maintain trustworthiness scores for active participants), and validators (who provide specialized channel-appropriate technology for ensuring that transactions are completed in accordance with terms of associated purchase orders). In this regard, each participant or entity in the transaction system 101 may be manifested as or operate a node 102. For example, in some embodiments, a node 102 may be associated with an arbiter role. The arbiter node may include a computing device system 100 configured to execute various programs associated with the arbiter role. In some example embodiments, an arbiter node may generate a new market channel. The arbiter node may also provide other nodes 102 in the transaction system 101 with access to the new market channel. In some embodiments, nodes 102 may send a registration request to the arbiter node, and receive a seat identification number 310 (discussed in more detail below with respect to FIG. 5) from the arbiter node in response to the request. In some embodiments, the seat identification number 310 may uniquely identify every entity (participant) or node 102 in the transaction system 101. In some embodiments, the arbiter node may be associated with an ad-channel in a transaction system 101, providing an ad-system 101.

FIG. 5 illustrates a data structure storing node information 300, according to some embodiments. In some embodiments, each entity or node 102 participating in system 101 may have node information 300 associated therewith and stored in one or more processor-accessible memory device systems 130 or memories 151, 157, according to some embodiments. By way of illustrative example only, the node information 300 is described below with respect to node 102a of FIG. 3 for clarity, although each of the other nodes (102b, 102c, 102d, 102e, 102f) may also have node information 300 associated therewith. In some embodiments, the node information 300 may include a unique seat identification number 310 assigned to the node 102a. The node information 300 may also include node type 320 describing at least one role associated with the node 102a in ad-system 101. In some embodiments, the node 102a may have more than one role associated therewith. For example, the node 102a may have both an SSP and a DSP role associated therewith, depending on the role played by the corresponding entity in a particular transaction. In this regard, the data structure retaining node information 300 may implement the node type as a linked list, known in the art, allowing for a variable number of different node types, each node type linked to a linked list of one or more transactions in which the node 102a operated as the corresponding node type. In some embodiments, the node information 300 may also include payment information 330, settlement information 340, and node reputation information 350. In some embodiments, payment information 330 and settlement information 340 may be provided as natural language contracts binding between the relevant entities. Each market channel may have one or more sets of terms emerge as preferred for the particular type of transaction being conducted in the particular market channel. In this regard, in some embodiments, the payment information 330 and settlement information may include default values or value ranges for each of the terms in the one or more sets of terms for a particular market channel. For example, if node 102a is participating in a mobile-device-advertisement market channel, and one of the terms for this market channel is the price per advertisement-presentation via a customer's mobile device, the payment information might indicate that the entity associated with node 102a has a default price of X, where X is a particular monetary value. Some embodiments may include arbiter-facilitated escrow, billing gateway services, or payment acceleration options as part of the payment information 330 or settlement information 340.

The node reputation information 350 may provide other nodes 102b, 102c, 102d, 102e, 102f in the ad-system 101 with a measure of the trustworthiness of node 102a. The data in the reputation information 350 may be provided by a third party, such as a ratings agency. Accordingly, the node 102a may not have control over at least some of the information in the node information 350. In this regard, at least some of the node information 300 may be, but need not be stored by a processor-accessible memory device systems 130 or memories 151, 157 controlled by the node 102a, and may be stored at one or more other nodes 102. For example, the reputation information 350 may be stored by a ratings agency's node 102 in association with the seat ID 310 of node 102a and made available to other nodes 102. Accordingly, although FIG. 5 illustrates the node information 300 as a single contiguous block of information, the node information 300 may be fragmented and stored across multiple nodes 102. The same applies to other data described herein, such as the transaction ledger 104.

In some embodiments, node information 300 associated with node 102a may also include preference information 360 for node 102a. The preference information 360 may include information such as preferred arbiter or preferred corresponding participants (for example, particular preferred advertisers for a publisher).

The inventors of the present invention construct the node information 300 as a separate data structure as compared to the transaction ledger data structure 104 for at least the benefit of facilitating entity searching, entity analysis, and direct entity-to-entity interactions that may incentivize the generation of new transactions. For example, a tracker entity (e.g., a search provider) may be configured in the system 101 to review transaction histories in the transaction ledger data structure 104 for a history of transactions involving a particular entity, e.g., node 102a by utilizing the seat ID 310 of the node 102a. Upon reviewing such history, the tracker may determine that the node 102a charges, on average, price X per advertisement-presentation via a customer's mobile device and populate its own record in payment information 330 for node 102a. Accordingly, with populated node information 300, the architecture of system 101 allows a buyer of advertisements to, e.g., search for sellers (e.g., such as node 102a) that sell advertisement-presentations for a price within range A to B, where A and B are particular monetary values. If price X is within price range A to B, the buyer may become aware of node 102a and may directly approach node 102a for a possible transaction. Without node information 310, it would at least be more difficult for entities to perform entity searching, entity analysis, and direct entity-to-entity interactions, as, e.g., entities looking for new transactions may be limited, in some circumstances, to finding existing offers residing in the transaction ledger data structure 104. In this regard, such an architecture of distinct data structures between information like node information 300 and like the transaction ledger data structure 104 have not been found by the inventors in the conventional transaction systems.

As discussed above, each node 102 may also have one or more transaction ledgers 104 associated therewith and stored in one or more processor-accessible memory device systems 130 or memories 151, 157, according to some embodiments. Each transaction ledger 104 is a record of transactions for a particular market channel in the transaction system 101. For example, a transaction ledger 104 for an ad-system 101 may record, among other transactional aspects, offer transactions, buy transactions, and verification transactions. In some embodiments, buyers, such as advertisers or DSPs, may post buy-side offers to the ad-system 101 via recordation in transaction ledger 104. Similarly, sellers, such as publishers or SSPs, may post sell-side offers to the ad-system 101. Often, buy-side offers may be offer transactions that are campaign-like in nature. For example, an advertiser may be interested in placing advertisements across a wide group of publishers to promote a product or service to a broad audience. Sell-side offers may be offer transactions that provide impression inventory for a particular demographic or audience that may be of interest to a broad set of advertisers.

In some embodiments, an offer transaction may include the seat identification number of the node 102 posting the offer transaction and an indicator of whether the offer is a buy-side offer or a sell-side offer. The offer transaction may also include filtering, targeting, and metadata information. For example, targeting information may include desired audience or demographics. Each digital channel in the transaction system 101 may have metadata about a full data-model that defines an offer transaction for that particular digital channel. In some embodiments, the information included in an offer transaction, such as the metadata, may be versioned so that the nodes 102 can support different versions of offer transaction metadata. In an ad-system 101, the offer transaction metadata may include pricing models, targeting details, pacing details, attribution look-back windows and types, fulfillment details, or other criteria that may be binding in the offer. Pricing models for offer transactions are well known in the art and may include passive models such cost per thousand impressions (CPM) or cost per impression (CPI) and active models such as cost per action (CPA) or costs per click (CPC). In a CPM or CPI model, the publisher is paid for the impression when it is displayed to the viewer. In a CPA or CPC model, advertisers pay not for viewership but for viewers performing a certain action in response to the impression. Actions performed by a viewer may include clicking on the advertisement, completing an information form, entering a sweepstake or other contest, or making a purchase. Advertisers often prefer active pricing models to passive pricing models because active models tie the price to measurable viewer actions.

Filtering and targeting criteria in an offer transaction may be used to specify requirements or preferences for the offer transaction. For example, the filtering criteria may be used to specify acceptable pricing models, minimum reputation scores, or preferred partners, and targeting criteria may be used to specify desired demographic coverage, geographic coverage, or pacing (display of the advertisement over a period of time).

Metadata information may be used by other nodes 102 in the ad-system 101 to verify completion of the transaction, assist with arbitration, or update reputation scores. In some embodiments, the metadata information includes both public information (records contained in the transaction ledger) and private or confidential information (variables defined in the configuration of a particular node on behalf of an entity participating in the marketplace). Public information or variables (also referred to herein as transaction elements) may be accessible by all nodes 102 in the ad-system 101, whereas private information or variables may be accessible to nodes associated with a particular role (such as arbiter) on an as-needed basis. Private variables may include information that could be used in combination with the information found in public variables to execute various methods associated with embodiments of the invention. It should be noted that some transactions may include both private and public information while other transactions may include only private or public information.

For example, a private variable may include information corresponding to a maximum bid value for a particular offer. A public transaction element may include information corresponding to the current bid made by the node 102 on a particular offer. An RTB auction system, functioning in the same economic capacity as existing implementations described above, may use the information stored in the private variable of node 102 to automatically counter a bid published by another node 102, representing a competitor, by increasing the current bid up to the maximum bid value stored in the private variable. In some embodiments, a negotiation protocol for establishing the highest bidder for a particular offer may be implemented as a software program executable by the computing device system 100 of ad-system 101. In some embodiments, this negotiation protocol may be executed by a particular node 102 having a seller or an arbiter role associated therewith. The arbiter or seller node 102 would have access to the private variable, associated with the maximum bid value, for each of the other nodes 102 engaged in the bidding process for a particular offer transaction. Each of the other nodes 102 may have access to the public variable, associated with the current bid value, for the other nodes 102 engaged in the bidding process for a particular offer transaction. If the offer transaction is being purchased outright, and is not sold through the negotiation protocol, private variables may not be needed.

In some embodiments, the transaction ledger 104 may record a buy transaction corresponding to a mutually agreeable transaction. In some embodiments, the real-time bidding process may be used to determine the buy transaction for the offer transaction, with the winning entity or node 102 agreeing to provide the services or goods set forth in the offer transaction. In some embodiments, the buy transaction may identify the seat identification number of the winning entity or node 102, the corresponding offer transaction, and terms specified by the winning entity or node 102. The ad-system 101 may include methods to reconcile the terms in the offer transaction with the terms in the buy transaction, and update the stored offer transaction and the stored buy transaction after both the offering entity and the buying entity have agreed to mutual terms.

In some embodiments, the ad-system 101 may include verification transactions that record the completion or current status of order terms agreed to in the offer transaction and the buy transaction. In some embodiments, the recording of a verification transaction in the distributed ledger 104 may trigger a payment transaction. A verification transaction may be generated by a validator node or an arbiter node to verify that a transaction was completed and confirmed via measurement indicators found in the originating offer transaction and buy transaction.

In some embodiments, measurement indicators for a mobile advertising channel may include one or more of the following:

Hosting of advertisement destination click redirects to collect unique identifying properties of mobile devices.

Organization of collected identifiers to facilitate further matching with installed applications on mobile devices.

Software routines embedded inside mobile applications to gather identifiers from devices on which the software is executed.

Matching of identifiers gathered while processing click redirects with identifiers gathered from running mobile software to calculate the effectiveness of particular marketing campaigns (this process being known in the art as Attribution).

Software instructions embedded inside mobile applications to monitor user engagement, purchase activity, and other custom instrumented actions.

Associating collected activity data with calculated Attribution details to determine the Long Term Value (LTV) and other Key Performance Indicators (KPIs) of particular marketing campaigns.

Automated fraud detection, data reporting, and other services complementary to ensuring that an offer transaction has been completed according to signed terms.

As discussed above, a node 102 may have one or more node types 320 associated therewith. Node type 320 describes the role associated with corresponding node 102 in the ad-system 101. Some node types 320 include advertisers, DSPs, publishers, SSPs, arbiters, trackers, ratings agencies, and validators. Advertisers and DSPs are buyer node types that have associated advertisement inventory for placement in ad-slots. In some embodiments, advertisers or DSPs may generate an offer transaction that is campaign-like in nature (buy side). Publishers and SSPs are seller node types that have associated impression inventory for receiving advertisements. In some embodiments, publishers or SSPs may generate an offer transaction that is demographic-centric in nature (sell side).

Arbiters may be trusted entities or nodes 102 that may be mutually authorized by buyer nodes and seller nodes to facilitate fulfillment of the transaction between the buyer node and the seller node, and arbitrate any disputes. In some embodiments, there may be more than one arbiter node 102 and ad-system 101. Each node 102 in the ad-system 101 may include a preferred arbiter in the node information 300.

Ratings agencies may be nodes 102 that provide feedback for each buyer node, seller node, arbiter node, or other node type in the ad-system 101. In some embodiments, ratings agencies may update the reputation score 350 associated with each node 102. The reputation score 350 may be updated in response to a successful or unsuccessful completion of a transaction, or the adjudication of a dispute by an arbiter. In some embodiments, the ad-system 101 may also include tracker nodes that specialize in searching offer transactions, based on criteria specified by a buyer node or a seller node, to find relevant offer transactions for the buyer node or the seller node. In some embodiments, tracker nodes may create new micro-market channels within the transaction system 101, and specify the terms therefor. Although the node types 320 have been discussed above with reference to particular roles, other node types may be associated with the transaction system or ad-system 101.

Figure 6A:
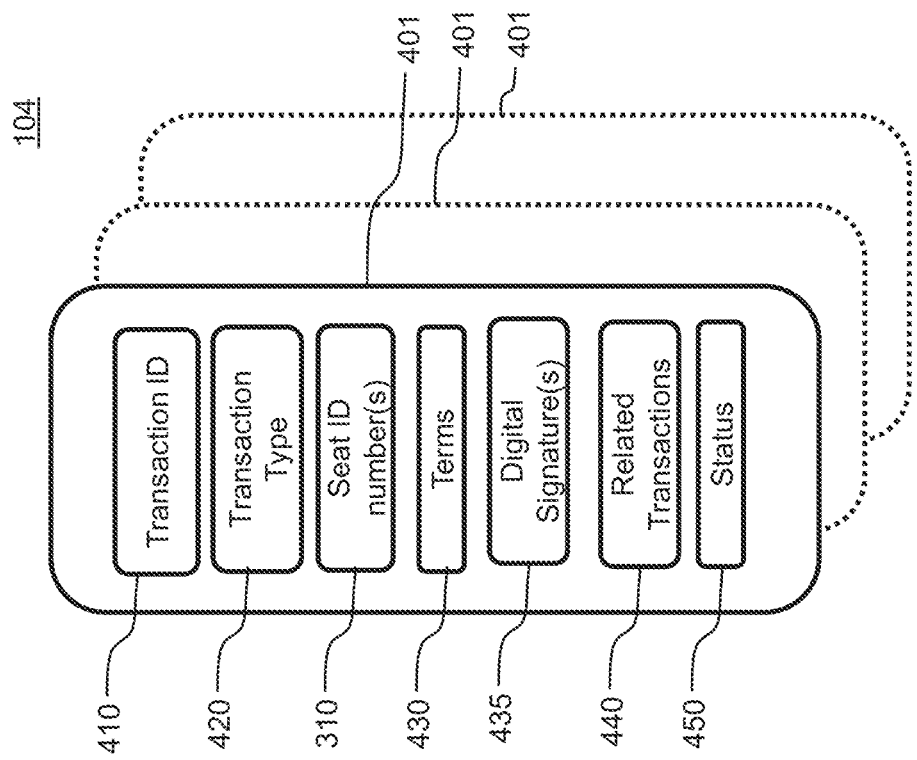
FIG. 6A shows an example of a transaction ledger data structure associated with (e.g., stored by, processed by, or both) one or more computing device systems of FIG. 1, 2, 3, or 4, according to some embodiments of the invention.

FIG. 6A shows an example of a transaction ledger 104, according to some example embodiments of the system 101. New transactions may be added to the distributed ledger 104 by any of the nodes 102 in the ad-system 101. For example, buyer and seller nodes 102 may write offer transactions or buy transactions to the distributed ledger 104. Validator or arbiter nodes 102 may read offer transactions or buy transactions from the distributed ledger 104 and write verification transactions to the distributed ledger 104. Tracker nodes 102 may read offer transactions from the distributed ledger 104, compare the information associated with the offer transactions to search criteria provided by a buyer node or a seller node 102, and provide matching offer transactions to the buyer node or the seller node 102. Ratings agencies may read offer transactions, buy transactions, or verification transactions from the distributed ledger 104 to update the reputation scores 350 associated with various nodes 102. Accordingly, multiple reputation scores 350 provided by, e.g., multiple ratings agency nodes, may exist for a particular node.

In some embodiments, different node types may have complete or partial copies of the distributed ledger 104 associated therewith. In some embodiments, buyer and seller nodes 102 may only have a partial copy of the distributed ledger 104, corresponding to a predetermined time period, stored locally. Validator, tracker, or arbiter nodes 102 may have complete or partial copies of the distributed ledger 104 stored locally. In some embodiments, the validator, tracker, or arbiter nodes 102 may have partial copies of the distributed ledger 104, corresponding to a different predetermined time period than the buyer and seller nodes 102. For example, the distributed ledger 104 stored at buyer and seller nodes 102 may include transactions posted within the last 24 hours. The distributed ledger 104 stored at validator, or arbiter nodes 102 may include transactions posted within the last week. The distributed ledger stored at tracker or ratings agency nodes 102 may include a permanent record of all transactions added since the inception of each marketplace channel.

In some embodiments, as the number of transactions grows, the distributed ledger 104 increases in size correspondingly. Some nodes, such as buyer and seller nodes 102, may not need a complete record of all transactions in order to effectively participate in the ad-system 101. The local copy of the distributed ledger 104 stored in these nodes (buyer and seller nodes) may be implemented as a rolling ledger where transactions that are older than a predetermined time period (for example, 24 hours) are deleted from the local copy of the distributed ledger 104. This limits the size of the distributed ledger 104, while still providing pertinent information required for the buyer or seller node to respond to offer transactions posted in the ad-system 101. In some embodiments, various nodes 102 may have distributed ledger's 104 corresponding to different time periods stored therewith.

As shown in FIG. 6A, each transaction information block 401 stored in the distributed ledger 104 may be identified by a transaction identification number 410 (also referred to as transaction ID). A transaction information block 401 may include a transaction type 420, such as offer transaction, buy transaction, or verification transaction. In this regard, the transaction type 420 may include an indication of an operation set indicating one or more operations to be performed with respect to goods or services being exchanged in the transaction. For example, if the transaction information block 401 represents an offer to sell goods, the operation set may include or be a sale. If the transaction information block 401 represents an offer to buy goods, the operation set may include or be a purchase.

In some embodiments, a transaction information block 401 may include digital signatures 435 from one or more entities (e.g., seller, buyer, validator, or arbiter) to the transaction that approve the transaction. Although the word "digital" is used to describe the signatures 435, the invention is not limited to binary representations of computerized information in this or any context.

In some embodiments, a transaction information block 401 may include related transaction IDs 440. For example, a transaction information block 401 for a verification transaction may include the transaction IDs of the corresponding offer transaction or buy transaction. The transaction information block 401 may also include one or more seat identification numbers 310 identifying the nodes 102 that are entities to the transaction. For example, the buyer, seller, a mutually agreed-upon validator, and a mutually agreed-upon arbiter for the transaction may be identified by the seat ID numbers 310 in transaction information block 401. In some embodiments, some transaction types, such as offer transaction or buy transaction, may also include one or more sets of terms 430. Terms 430 may be determined using filtering or targeting criteria specified in the offer transaction, or negotiated in the buy transaction. At least some of the terms 430 may be customized for the particular market channel associated with the transaction ledger 104. In some embodiments, the buy transaction or mutually agreeable transaction may record the final terms 430 for a particular negotiated transaction for goods or services. The terms 430 recorded in the corresponding offer transaction may provide historical context, especially if the transaction is not completed and proceeds to arbitration.

Figure 6B:
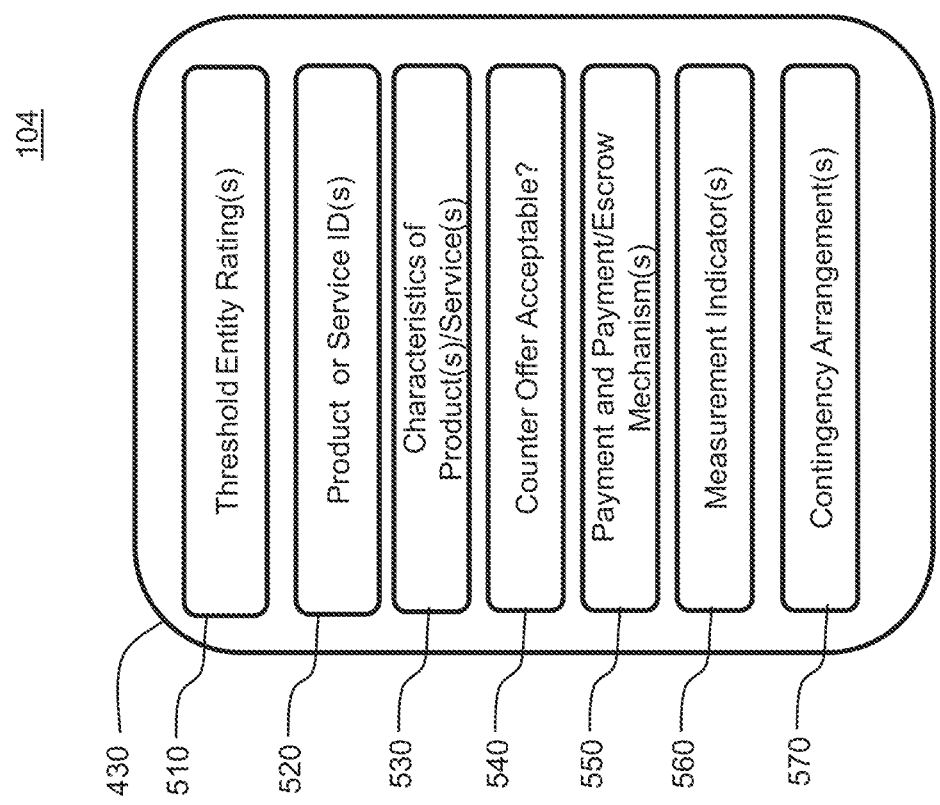
FIG. 6B illustrates a particular portion of the transaction ledger data structure of FIG. 6A, according to some embodiments of the invention.

With respect to FIG. 6B, the terms 430 may include data indicating (1) required threshold entity rating(s) 510 for entity participation in the transaction, (2) product or service identifiers 520 indicating products or services to be involved in the transaction, (3) characteristics 530 of the product(s) or service(s) involved in the transaction suitable for third-party validation of the product(s) or service(s) involved in the transaction, (4) whether or not a counter offer is acceptable 540, (5) payment information and payment or escrow mechanisms 550, (6) one or more measurement indicators 560 suitable for third-party validation of proper fulfillment of the transaction, (7) one or more contingency arrangements 570 should proper fulfillment of the transaction not be achieved, or a combination or subcombination of the terms 510-570.

Threshold entity rating term 510 may indicate, for each of one or more yet-unknown entities to the transaction, a required threshold rating for such entity to participate in the transaction. For example, if a seller node 102 generates a transaction information block 401 to publicize an offer to sell some of the seller's products, the seller node 102 may insert a value into the threshold entity rating term 510 indicating that the offer is only open to buyers meeting the value of the threshold entity rating term 510. According to this configuration, the architecture of the transaction system 101 provides an avenue for the seller node 102 to automatically restrict the quality of the buyers that may enter into the transaction. Similar configurations may be applied to other entities yet-to-be-involved in the transaction, such as validators, arbiters, or both. For example, if the seller node 102 has not yet selected a validator or arbiter for the transaction, that is, the seller node 102 is allowing a prospective buyer to identify or suggest a validator or arbiter for the transaction, the seller node 102 may insert a value of a threshold entity rating into term 510 in order to limit the quality of any validator or arbiter that is suggested by the prospective buyer. Accordingly, although only a single item is shown in FIG. 6B for threshold entity rating 510, such term 510 may include multiple threshold entity ratings respectively associated with multiple entities.

The product or service identifier term 520 may indicate, e.g., (a) the product(s) (e.g., inventory) or service(s) available for transaction, in the context of a sell offer, or (b) the product(s) or service(s) desired for transaction, in the context of a buy offer. In the context of a mobile-device-advertising market channel, the product identifiers identified in term 520 may be device identifiers of the mobile devices that are indicated to present the advertisements to customers.

The characteristics of product(s)/service(s) term 530 may describe qualities of the product(s) or service(s) involved in the transaction and may be utilized by a third-party validator to ensure that the product(s) or service(s) identified in ID term 520 match the characteristics identified in term 530. In this regard, the inventors of the present invention recognized that, in some contexts, actual identifications of the product(s) or service(s) involved in the transaction may be confidential. Accordingly, in some embodiments, the product or service identifier(s) in term 520 are either hash values or encrypted forms of the actual identifier(s) of the product(s) or service(s). Therefore, in some embodiments, some entities, such as a buyer, may not have access to the actual identifications of the product(s) or service(s) involved in the transaction. In at least some of these embodiments, constructing the transaction information block 401 to include the characteristics term 530 provides an avenue for such entities to gain a better understanding of the product(s) or service(s) that are involved in the transaction. In some embodiments, to add an extra layer of reassurance to such entities, a third-party entity, the transaction system 101 is architected to encrypt the product or service identifier(s) in term 520 utilizing a public encryption key associated with a trusted third-party entity, such as a validator or tracker, and the trusted third-party entity may utilize, e.g., its own private decryption key associated with public encryption key to decrypt the product or service identifier(s). In this configuration, only the third-party entity that has the private decryption key is able to decrypt the product or service identifier(s) in term 520 and confirm that such product(s) or service(s) match the characteristics set forth in term 530. Such trusted third-party entity, such as a validator or tracker, may then merely provide the results of its confirmation to a prospective buyer or other interested entity, thereby providing such entity with additional assurance that the product(s) or service(s) identified in term 520 is or are authentic with respect to the characteristics identified in term 530. Accordingly, various embodiments of the improved data structure 104 and improved transaction system architecture 101 strike an efficient balance between maintaining information security and providing open, efficient, public access to the transaction information 104.

According to some embodiments, the counter offer term 540 indicates whether or not an entity that provided one or more of the terms 430 is willing to entertain changes to one or more of the terms 430.

According to some embodiments, the payment and payment mechanism term 550 defines amounts and manners of payments to be made in the transaction. In some embodiments, escrow services may be utilized to enhance seller assurance in the transaction. In this regard, some embodiments facilitate partial releases of assets held in escrow, such as payment fees obliged by the buyer to the seller, according to the meeting of certain fulfillment obligations during performance of the transaction. For instance, in some embodiments, the terms 430 include one or more measurement indicators 560. If, for example, the transaction is for the transfer of 1000 units of a product, the measurement indicators 560 may indicate, e.g., that (a) when 500 units of the product are delivered, 25% of the payment is released from escrow to the seller, (b) when 750 units of the product are delivered, an additional 25% of the payment is released from escrow to the seller, and (c) when 1000 units of the product are delivered, the remaining 50% of the payment is released from escrow to the seller. In some embodiments, a third-party validator monitors the transaction and verifies when the measurement indicators have been met and then instructs another third-party entity, such as an arbiter or escrow agent, to release the appropriate portion of assets to the seller.

In this regard, the inventors of the present invention construct some embodiments of the transaction system 101 to require that the entity that performs such validation of the measurement indicator(s) 560 be different than the entity that manages release of the assets to the seller. Such a configuration may be important in the event that there is a dispute regarding whether or not the performance of the measurement indicator(s) have been properly fulfilled.

According to some embodiments, the contingency arrangement(s) term 570 indicates alternate terms defining the transaction in the event that one or more of the measurement indicators 560 fails to be met. For example, if a measurement indicator 560 indicates that the products identified in term 520 must be delivered by a particular date, the contingency arrangement(s) term 570 may indicate, for example, that a price reduction of 10% occurs if delivery by that particular date does not occur, but does occur within seven days thereafter. The contingency arrangement(s) term 570 may also indicate, for example, that a 25% correction occurs if delivery within seven days after the particular date does not occur, but does occur within an additional seven days thereafter, and so on. Such contingency arrangement(s) term 570 aims to minimize the need for arbiter involvement in the event of disputes.

Depending on the type of initial offer being made in a newly-generated transaction information block 401, the terms 430 may include the product or service ID(s) 520, the characteristics of the product(s) or service(s) 530, or both the IDs 520 and characteristics 530. For example, if a seller generates a transaction information block 401 to sell particular inventory belonging to the seller, the terms 430 may include the ID(s) 520 and the characteristics 530, for example, in the case where the ID(s) 520 are in hashed or encrypted form. For another example, if a buyer is looking for a particular type of inventory, but does not see an existing offer from a seller that meets the buyer's requirements in the transaction ledger 104, the buyer may generate a transaction information block 401 to seek such particular type of inventory. In at least some of these situations, the transaction system 101, e.g., via transaction server programs 105, is configured to allow the buyer to generate a transaction information block 401 to include the characteristics 530, but not the IDs 520. In such cases, the characteristics 530 may indicate the quantities of the products desired by the buyer, and a seller that can provide such products may respond by adding identifiers to the product or service ID(s) term 520. For yet another example, if a broker entity does not itself have inventory of products to sell, but believes it can obtain such inventory from sellers, some embodiments of the transaction system 101 are configured, e.g., via transaction server programs 105, to allow such a broker entity to generate a new transaction information block 401 to include characteristics 530 of the products that the broker believes it can obtain, while omitting the product identifiers in term 520. In such cases, the broker entity may be obligated by one or more of the measurement indicators 560 to provide inventory meeting the characteristics 530 within a certain period of time. Another measurement indicator 560 may require that a mutually-agreed-upon third-party validator verify that the inventory ultimately provided by the broker entity meets the characteristics 530.

Continuing with FIG. 6B, a transaction information block 401 may also include status 450 specifying the current stage of the transaction. For example, an offer transaction may have a status 450 of "published" when it is posted to the ledger. Upon entering an auction phase, the status 450 of the transaction may be updated to "active". Upon conclusion of a sale process, such as an auction and subsequent exchange of payment and goods/services, the status of the transaction may be updated to "completed". The transaction ID 410 of the associated buy transaction may be recorded in the related transactions 440.

Distributed ledgers 104 may be implemented using distributed data store platforms known in the art. For example, a Merkle directed acyclic graph (DAG) based file distribution system, such as Interplanetary File System (IPFS) of Protocol Labs, Inc. of Palo Alto, Calif. may be used in some embodiments. In some embodiments, a Distributed Hash Table or DHT data storage technology may be used to implement the distributed ledger 104. DHT technology underlies the distributed database implementations of protocols popular in the art such as BitTorrent (BitTorrent is a Trademark of BitTorrent, Inc. Corporation California 303 2nd Street, Suite 5600 San Francisco Calif. 94107) peer discovery, such as Kademlia and MadeSafe, known in the art. One example implementation of a distributed datastore which assumes that a majority of nodes can be trusted to not collude to defraud is Ripple (Ripple is a Trademark of Ripple Labs Inc. Corporation California #2724 268 Bush Street, San Francisco, Calif. 94104), known in the art. Another example which uses blockchain technology to maintain a distributed ledger is MultiChain, known in the art. Another which incorporates Smart Contract technology, allowing for logical instructions to be stored and executed inside the distributed storage layer, is eris:db, known in the art.

The transaction ID 410 may be provided by a unique hash value identifying each transaction. Each transaction information block 401 may also include information to identify the current status of the transaction. For example, the transaction information block 401 may record the associated offer transaction, and identify the status of the transaction as a pending offer, when the offer transaction is posted. When a corresponding entity or node 102 accepts the offer transaction, a buy transaction is recorded in the transaction information block 401 and the status of the transaction may be updated to identify that the transaction is pending completion. The transaction information block 401 may be updated by appending the buy transaction to the transaction information block 401. A validator or arbiter node 102 may append a verification transaction to the transaction information block 401 and update the status of the transaction as complete once the delivery of goods or services has been verified according to the terms 430 recorded in the buy transaction. One of the advantages of hash-based data storage technology is that it can be used to provide a global distributed transaction ledger for offer transactions posted and buy transactions accepted over a given period of time. In some embodiments, the information about the buyer and seller entity or nodes 102 may be kept private, but the details of the transaction may be made public providing network-wide transactional visibility.

Each market channel may have its own distributed data ledger 104. This configuration enables various marketplace channels to be hosted by and engaged from common infrastructure nodes. A daily rolling chain, stored in the form of a partial copy of the distributed data ledger 104, for each market channel, permits efficient storage of transactional data while reducing file size on transaction-oriented nodes 102. In some embodiments, the arbiter node 102 may store a complete copy of a particular distributed ledger 104 associated with a particular market channel.

In some embodiments, the distributed transaction ledger 104 is synchronized across all nodes 102 of the ad-system 101 to ensure that all nodes have the most current transaction information. Various protocols well known in the art, such as the DHT and blockchain technology referenced above, may be used to transmit changes to a local copy of the transaction ledger 104 to other nodes 102 in the ad-system.

Various entities, represented by or operating nodes 102, may interact with each other in the ad-system 101. For example, the ad-system 101 of FIGS. 3 and 4 may include a seller node 102a (also referred to as a publisher node 102a), a buyer node 102b (also referred to as an advertiser node), a tracker node 102c, a validator node 102d, an arbiter node 102e, and a ratings agency node 102f. In some embodiments operating within an advertising market channel, to facilitate transactions, seller node 102a may execute a seller or publisher data pipe program ("PDP") 106 and an ad server 107, discussed in more detail below, where the ad server 107 interacts with a software development kit program ("SDK") 109 executed on each of a plurality of customer devices 108 (which may be respective instances of system 100 and may be mobile devices in some embodiments) to present advertisements in fulfillment of advertisement transactions.

Figure 7:
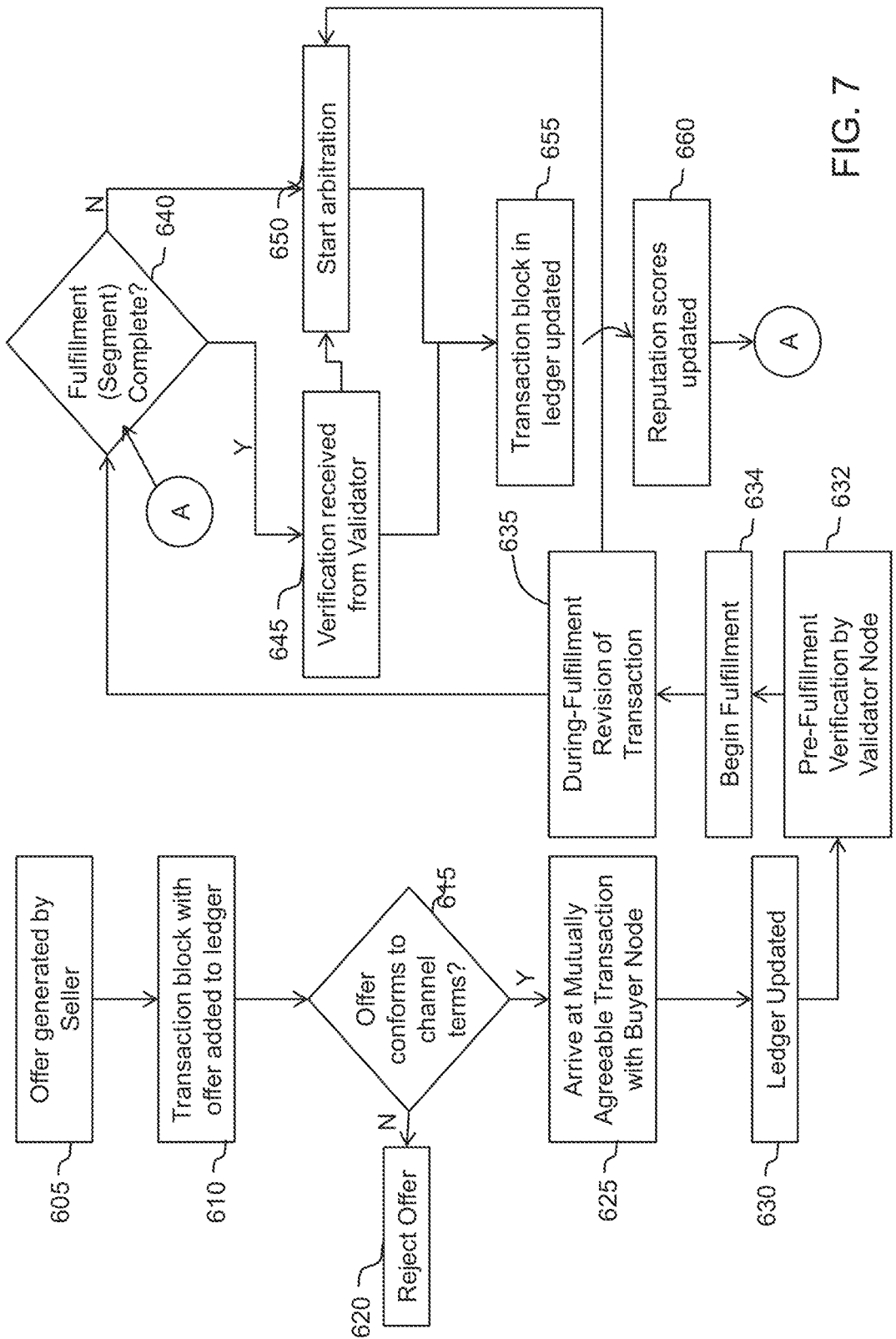
FIG. 7 is a flowchart showing methods for performing and verifying a transaction, the methods executable or executed by a computing device system of FIG. 1, 2, 3, or 4, according to some embodiments of the invention.

FIG. 7 shows a flowchart for methods of performing and verifying a transaction in a market channel, according to some example embodiments. As with the methods of FIGS. 8A and 9-12, discussed below, the methods of FIG. 7 may be executed by all or part of the various systems described herein, such as those described with respect to FIGS. 1-4.

In this regard, seller node 102a may have impression inventory, such as display regions within an app or a website, that is available for advertisement presentations. In this example, assume that seller node 102a has established credibility in the form of a reputation score 350 provided by ratings agency node 102f. Reputation score 350 of seller node 102a establishes the website or mobile app of the seller node 102a as a valuable property with impression inventory that may be of interest to advertisers (e.g., buyer nodes 102b), according to some embodiments. Seller node 102a may also provide demographic user details of its users or audience as part of node information 300.

In order to monetize its impression inventory, seller node 102a may be configured at least by the TS program 105 to generate, at step 605 in FIG. 7, a new transaction information block 401 of transaction ledger data structure 104, the new transaction information block configured to seek buyer nodes 102b that may be interested in presenting advertisements via the impression inventory of seller node 102a. In this regard, the TS program 105 may be configured to present a template form specific to the particular market channel via a display device of input-output device system 120 associated with seller node 102a that prompts inputting of at least some of the information discussed above with respect to transaction information block 401, such as the transaction type 420 and the terms 430 (e.g., FIGS. 6A, 6B). The TS program 105 may be configured to populate the transaction ID field 410 by determining, with reference to the existing transaction ledger 104, a new, unique transaction ID, that is not present in the existing transaction ledger 104. The TS program 105 may be configured to populate the seat ID field 310 in the new transaction information block 401 by importing the seat ID 310 present in the node information 300 associated with the seller node 102a. The related transactions field 440 may default to 'null' for the generation of a new transaction information block 401, and the status 450 for a new transaction information block may default to a 'null' or some other preliminary value until the new transaction information block 401 is published to the ledger 104 at step 610. At such time, the status 450 may change to something akin to 'published,' 'pending', 'new sell offer', etc.

In some embodiments, the transaction type 420 may be an inventory offer, where, as discussed above, the seller node 102a desires to make available impression inventory for advertisements. Such an inventory offer is an example of a sell offer. Accordingly, in some embodiments, such an inventory offer transaction type requires the identification of product or service identifiers (e.g., device IDs 520 of devices that retain the impression inventory (e.g., the devices that execute the app or view the website of the seller node 102a that has or have display region(s) available to present advertisements)). However, due to the publicly-distributed nature of the transaction information block 401 when it is published to the transaction ledger 104, the inventors of the present invention recognized that the seller node 102a may desire to keep such device IDs 520 private or confidential. However, the inventors of the present invention recognized that the buyer nodes 102b need some way to evaluate, e.g., the quality or characteristics of the impression inventory. Accordingly, some embodiments of the present invention address this potential issue by including characteristics field 530, having such device IDs 520 hashed and, consequently, recorded in hashed form in device ID field 520 in the newly generated transaction information block 401, or both including characteristics field 530 and including hashed device IDs in field 520. For example, the PDP program 106 may be configured to store a database of impression inventory of the seller node 102a and hash the corresponding device IDs of such inventory for placement in the device ID field 520. In addition or in the alternative, general characteristics, such as demographics, associated with the devices in such inventory may be input into characteristics field 530. In this regard, the seller node 102a may be configured to input, via at least the TS program 105, hashed device IDs in field 520, characteristics in field 530, or both hashed device IDs in field 520 and characteristics in field 530 of the offered devices to allow potential buyer nodes 102b, as well as tracker nodes 102c, validator nodes 102d, arbiter nodes 102e, and ratings agencies 102f to evaluate the impression inventory without knowing the actual device IDs.

To elaborate, for example, the use of hash values in the context of product or service IDs (e.g., device IDs), or other confidential data object(s), and the generation of a new transaction information block 401 may be particularly useful in some contexts, because a hash value essentially cannot be decrypted and retains a persistent representation or value over time. Accordingly, potential buyer nodes 102b, tracker nodes 102c, validator nodes 102d, arbiter nodes 102e, and ratings agencies 102f may, e.g., use the hash value or hash ID of a device ID (or other confidential data object) to recognize the same device (or other confidential data object) throughout multiple transaction histories, without such nodes ever knowing the actual device ID (or other confidential data object). In this regard, the respective nodes 102 are provided with the opportunity to analyze such histories and develop or have access to characteristics or other metadata associated with those hash IDs and, consequently, understand qualities of the devices associated with those hash IDs without knowing the actual device IDs of such devices. In addition or in the alternative, characteristics field 530 may directly provide such characteristics or other metadata. If hash IDs in field 520 are used in conjunction with the characteristics field 530, the hash IDs may allow other nodes to verify the accuracy of the characteristics in field 530. Hence, for example, the seller node 102a is able to fully participate in the transaction system 101 and take advantage of third-party entities developing a rich set of analysis and metadata on its inventory of device IDs (or other confidential data object), without surrendering the confidentiality of the impression inventory of device IDs (or other confidential data object). The conventional transaction system does not contemplate these problems or these inventive solutions.

In some embodiments, the transaction type 420 may be a broker offer, where the seller node 102a does not have its own impression inventory, but desires to make available another node's impression inventory for advertisements. Such a broker offer is another type of sell offer, as contrasted with the above-discussed inventory offer. For a broker offer transaction type, some embodiments of the transaction server 105 are configured to allow such a broker entity (a type of seller node 102a) to generate a new transaction information block 401 to include characteristics 530 of the devices (or other product or service) that the broker believes it can obtain for a potential buyer node 102b, while omitting device IDs (or other product or service ID) (hashed or otherwise) in term 520. In other words, for a broker offer, the transaction server 105 may allow the product or service ID term 520 to be omitted or retain a 'null' value at the time of generating a new transaction information block 401 at step 605. It may be particularly beneficial in a broker offer to allow omission of the product or service ID term 520, because the broker node does not yet have the actual contents (e.g., device IDs) of the inventory at the time of making the offer, but merely believes it can later provide appropriate inventory meeting the characteristics 530. However, in some embodiments, actual or hashed product or service IDs (e.g., device IDs) may be required in field 520.

In some embodiments, the transaction type 420 may be an advertiser-initiated buy offer, where a buyer node 102b, not a seller node 102a, performs step 605 and generates a new transaction information block 401 via transaction server 105 at step 605. Accordingly, this transaction type is a buy offer transaction, in contrast to the inventory offer and broker offer sell offer transactions discussed above. For this advertiser-initiated buy offer transaction type, the corresponding buyer node 102b may identify particular product or service IDs (e.g., device IDs) (in the hashed or un-hashed forms) for term 520, the characteristics of the products (e.g., inventory) or services 530 (besides the IDs, which may be considered identification codes), or both the IDs 520 and the characteristics 530, that the buyer node 102b desires for the presentation of advertisements. In this regard, in some embodiments, a transaction information block 401 generated by a buyer node 102b may include a request for purchasing inventory available for transaction from one of a plurality of data processing device systems (e.g., 110 of nodes 102) associated with a seller node (e.g., 102*a*). (Although the phrase "inventory available for transaction" sometimes is used herein in the context of products, such inventory may also be available services in some embodiments.) As discussed in more detail below, a tracker node 102*c* may be configured to search the respective transaction ledger 104 to identify a transaction information block 401 (e.g., an inventory offer from a seller node, such as seller node 102*a*) that matches the request. If the buyer node 102*b* desires that the corresponding seller node have a sufficient quality rating (e.g., from ratings node 102*f*), the tracker node 102*c* may be configured to determine if the rating of the seller node 102*a* meets a corresponding threshold quality rating, the tracker node 102*c* may be configured to notify the buyer node 102*b* of the potential matching inventory offer via the generation of a new transaction information block 401 addressed to the buyer node 102*b* and added to the respective transaction ledger 104, according to some embodiments. In some embodiments, the tracker node 102*c* is configured to determine the rating of the seller node 102*a* via transmission of a query including a request for rating information for seller node 102*a*, via the communications network (e.g., 153, 103), to a data processing device system (e.g., 110) of, e.g., the ratings agency node 102*f*. Such query may occur via newly generated transaction information block 401. The tracker node 102*c* may be configured to receive a response to the query, via the communications network (e.g., in a transaction information block 401 provided by the ratings agency node 102*f*), including the rating information for seller node 102*a*. The tracker node 102*c* may be configured to identify the rating for the seller node 102*a* from the rating information, according to some embodiments.

Figure 13:
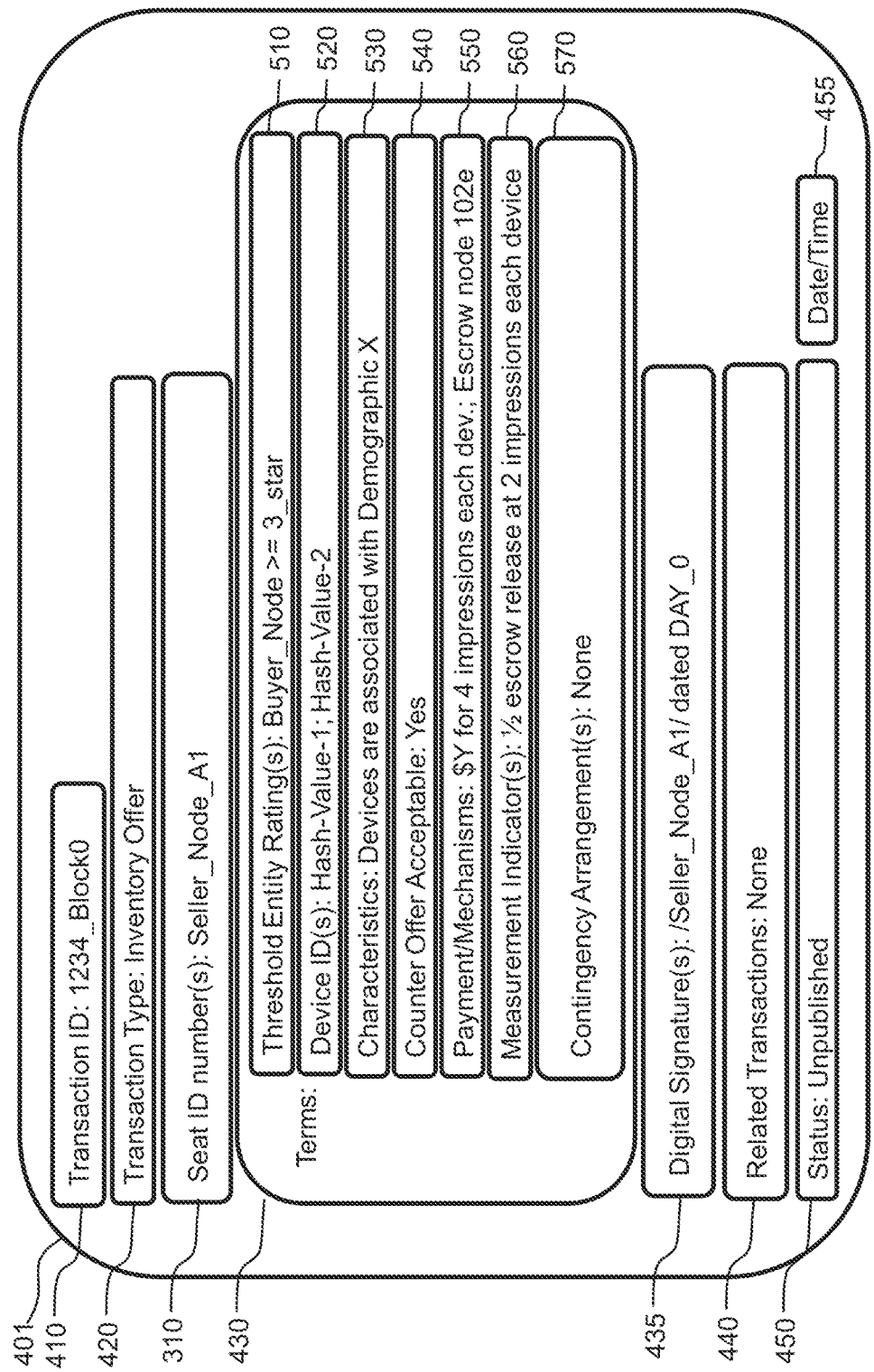
FIG. 13 illustrates an example of a transaction information block in an unpublished state, according to some embodiments of the invention.

Although three examples of offer transaction types 420 were discussed above, an example of an inventory offer transaction type, according to some embodiments, will now be followed through the method of FIG. 7 for illustration purposes. However, other embodiments execute other offer transaction types. In regard to an inventory offer transaction type, FIG. 13 illustrates a new transaction information block 401 generated for an inventory offer at step 605, according to some embodiments of the transaction server 105. Also in this regard, FIG. 8A shows a detailed flowchart of a particular implementation of step 605 of FIG. 7, according to some embodiments of the transaction server 105 and the PDP 106, which may be executed by a data processing device system 110 of the seller node 102*a* to generate the example new transaction information block 401 illustrated in FIG. 13. As with all method figures herein, the actual order of execution of the steps illustrated may occur in different orders than those illustrated in the figures.

Since FIG. 8A illustrates a particular implementation of step 605 in FIG. 7, according to some embodiments, FIG. 8A will now be discussed. At step 606 in FIG. 8A, the transaction server 105 may be configured to find the appropriate market channel for the newly generated transaction information block 401. In this regard, the seat ID 310 in the node information 300 in FIG. 1 for the node generating the new transaction information block 401 (i.e., the seller node 102*a* in this example) may be associated with a particular market channel. If the same node participates in multiple market channels, such node may register multiple seat IDs, and the transaction server 105 may be configured to access the node information 300 of seller node 102*a* to identify which seat ID will be used for the new transaction information block 401. Accordingly, by reference to the selected seat ID 310, the transaction server 105 may be configured to determine the appropriate market channel at step 606.

At step 607, the transaction server 105 may be configured to identify a set or sets of terms that are particular to the market channel identified at step 606. For example, in an advertisement market channel, it may be required that the terms included in the transaction information block 401 identify a number of impressions. Whereas, in another market channel, such a term would be unnecessary.

Figure 8B:
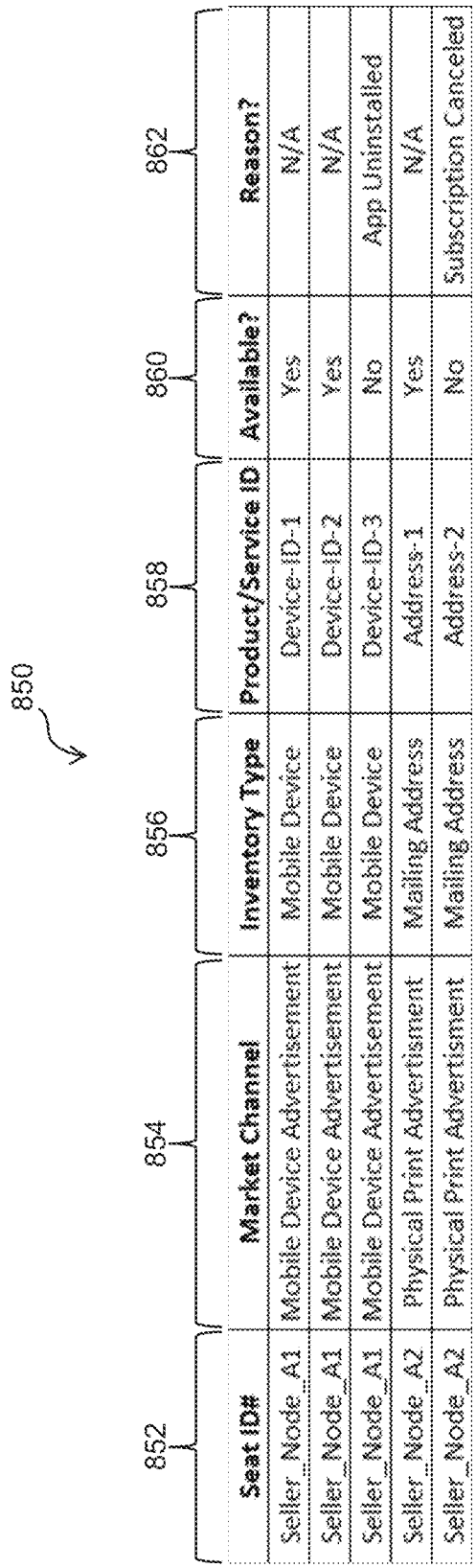
FIG. 8B illustrates an example database, or portion thereof, of inventory, according to some embodiments of the invention.

At step 608, the PDP 106 may be configured (e.g., the data processing device system 110 of seller node 102*a* may be configured by the PDP 106) to determine, by reference to a database of impression inventory associated with the seller node 102*a*, the inventory that the seller node 102*a* has available for transaction. FIG. 8B illustrates an example of at least a portion of such a database as database 850, according to some embodiments. Although only five rows and six columns of information are shown in database 850 for ease of explanation, any number of rows and columns, and other data structures besides a two-dimensional table format may be implemented.

In some embodiments, the database 850 is stored by the processor-accessible memory device system 130 of the seller node 102*a*, although such database 850 may be stored elsewhere and may be distributed instead of stored at one location. In this example, database 850 includes a seat ID # column 852, a market channel column 854, an inventory type column 856, a product or service ID column 858, an availability column 860, and a reason column 862. Seat ID # column 852 illustrates that the seller node may have different seat IDs 310 associated therewith in its node information 300. In this example, the seller node 102*a* has two seat IDs symbolically represented as "Seller_Node_A1" (shown in column 852, rows 1-3 in database 850) and "Seller_Node_A2" (shown in column 852, rows 4 and 5 in database 850). These seat IDs may be linked to the seat IDs 310 of the node information 300 associated with seller node 102*a*. Also in the example of FIG. 8B, the "Seller_Node_A1" seat ID is associated with a particular market channel, namely, the "Mobile Device Advertisement" market channel (shown in column 854, rows 1-3 in database 850), whereas the "Seller_Node_A2" seat ID is associated with a different particular market channel, namely, the "Physical Print Advertisement" market channel (shown in column 854, rows 4 and 5 in database 850). Accordingly, in this example, the seller node 102*a* may have two different seat IDs registered, because it participates in two different market channels. If a user at seller node 102*a* chooses to generate a new inventory offer by selecting the mobile device advertisement market channel, the TS 105 may be configured (e.g., the data processing device system 110 of seller node 102*a* may be configured by the TS 105) to correspondingly identify the mobile device advertisement market channel as the particular market channel determined at step 606 in FIG. 8A. When generating the new transaction information block 401 in FIG. 13, e.g., the TS 105 may be configured to insert corresponding "Seller_Node_A1" seat ID from field 310 in node information 300 into Seat ID number field 310 in FIG. 13.

The inventory type column 856 may identify a type of the inventory identified by each row in database 850. The product or service ID column 858 may represent the actual product or service identifier of the inventory associated with the respective row in database 850. One or more such product or device IDs (or a hashed or encrypted version thereof) may correspond to respective one(s) in product or service ID field 520 (e.g., FIG. 6B). The available column 860 indicates whether or not the corresponding inventory item is available for transaction, according to some embodiments. If not, a reason for the unavailability may be provided in reason column 862, such as the application(s) of the seller node 102a being uninstalled (indicated in column 862, row 3 of database 850) from the corresponding mobile device in the case of at least the mobile device advertisement market channel or a subscription of a magazine or newspaper of the seller node 102a being canceled (indicated in column 862, row 5 of database 850) in the case of at least the physical print advertisement market channel, according to some embodiments.

Continuing with the previous example, as at least part of step 608 in FIG. 8A, the PDP 106 of the seller node 102a may be configured (e.g., the data processing device system of the seller node 102a may be configured by the PDP 106) to determine inventory available for transaction for the selected mobile device advertisement market channel at least by searching for all rows in database 850 that have the mobile device advertisement market channel in column 854 and a value of "yes" in available column 860. In the example of FIG. 13, the result of this analysis may identify two devices 108 (having device IDs "Device-ID-1" and "Device-ID-2" in database 850) that are available for transaction. Of course, however, any number of devices may be available for transaction, according to various embodiments. Two devices are used in this example merely for simplicity of explanation. As discussed above, the PDP 106 may be configured to hash the device IDs of these two devices and import the hashed device IDs into the device ID term 520 shown in FIG. 13. In FIG. 13, these hashed device IDs are symbolically represented as "Hash-Value-1" and "Hash-Value-2". In some contexts, it may be beneficial to have the PDP program 106 determine (e.g., the data processing device system 110 of the seller node 102a executing the PDP program 106 to determine) the inventory available for transaction at step 608 and provide hashed device IDs for the transaction information block 401, and not TS program 105, because the PDP program 106 may operate entirely within the ecosystem of seller node 102a, whereas TS program 105 interfaces with other TS programs 105 of other nodes 102. Accordingly, in some embodiments, having the PDP program 106 determine the inventory available for transaction at step 608 and provide hashed device IDs may be beneficial to provide an extra layer of security between confidential information of the seller node 102a, such as device IDs and other information in the database (e.g., 850), and external nodes 102. Although the use of hashing is described herein to provide an alternative, essentially non-decryptable, persistent representation of a value, such as a device ID or other value in a transaction information block 401, other technologies may be used that provide such an alternative, essentially non-decryptable, persistent representation of a value.

At step 609, remaining information for the new transaction information block 401 may be populated by the transaction server 105 and by input received via, e.g., a form presented by the transaction server 105 via a display device of the seller node 102a. With respect to FIG. 13, the transaction server 105 populates the transaction ID 410 with a new, unique identifier represented in FIG. 13 as "1234_Block0". The reference to "Block0" indicates that, as this transaction evolves, additional blocks may be generated for this transaction, labeled, for example, as "Block1", "Block2", etc. in later portions of this example. All of such blocks may be linked together to form a single transaction involving multiple blocks via the related transactions term 440. However, since this is a new transaction information block 401 in FIG. 13, the related transactions field 440 in FIG. 13 indicates that there are no related transactions.

Also with respect to FIG. 13, the seller node may identify the transaction type 420 as "inventory offer". The transaction server 105 may populate the seat ID number field 310 as including the selected seat ID of the seller node 102a, in this example, symbolically represented as "Seller_Node_A1". In the example of FIG. 13, the terms 430 indicate that the seller node 102a a desires a buyer node 102B having a rating 510 of three or more stars, for example, in a system where five stars is a highest rating and zero stars is a lowest rating. However, any rating system may be used. The terms 430 in FIG. 13 also specify that the devices identified via the hashed values in field 520 are associated with a particular demographic represented as "Demographic X" in the characteristics field 530. Term 540 in FIG. 13 indicates that the seller node 102a is open to accepting counter offers from potential buyer nodes 102b. Payment/mechanisms term 550 in FIG. 13 indicate that the seller node 102a is willing to allow four impressions (e.g., the display of an image, video, or audio advertisement) for each of the devices identified in device ID field 520 at a price of $Y, with the $Y to be held in escrow by a particular arbiter node 102e. Measurement indicator term 560 indicates that the seller node 102a desires that half of the escrow amount be released when two impressions for each device have occurred. And, contingency arrangement term 570 indicates that the seller node 102a has not provided any contingency arrangements. (It should be noted that the particular terms provided in FIG. 13 are merely provided as a simple example for purposes of clarity, and any terms may be used.)

According to some embodiments, when the seller node 102a is content with the inventory offer, for example as shown in FIG. 13, the seller node 102a electronically signs and dates the transaction information block 401 via field 435 in FIG. 13. In some embodiments, at the time of step 605, the status of the transaction, as indicated by term 450, is identified as "unpublished". It should be noted, however, that any set of status identifiers may be used. The status term 455 may also include a date/time field 455 indicating the date/time that the transaction information block was generated or last modified, which may be helpful for nodes 102 that only wish to store transactions or transaction information blocks 401 that were generated or modified within a predetermined period of time, such as the last 24 hours or other period of time.

Upon completion of the generation of the new transaction information block 401 including the digital signature of the originating node via term 435 at step 605, the transaction server 105 is configured to distribute the new transaction information block 401 to one or more other nodes 102 in the system 101 to add such new transaction information block 401 to the transaction ledger 104 at step 610 for publication and synchronization.

In this regard, it may be considered that, at step 610, a first data processing device system (e.g., 110) of a computing device (e.g., 100) of seller node 102a may be configured (e.g., by the TS 105, PDP 106, or other program) to generate a transaction information block (401, e.g., FIG. 13 in the above example) associated with a particular market channel (e.g., mobile device advertisement in the above example), and store the generated transaction information block in a first processor-accessible memory device system (e.g., 130, 151) of the seller node 102a as an update to a respective local copy of at least a portion of the transaction ledger 104 stored in first processor-accessible memory device system (e.g., 130, 151) of the seller node 102a associated with the particular market channel, according to some embodiments. The first data processing device system of the seller node 102a may be configured to transmit the generated transaction information block (e.g., FIG. 13) to a second data processing device system (e.g., 110) of a computing device (e.g., 100) of at least another node 102 (e.g., in FIG. 4) over a communications network (e.g., 153, 103) via a first input-output device system (e.g., 120) of the seller node 102a. Each of the at least the another node 102 that receives the generated transaction information block (e.g., FIG. 13) via its respective input-output device system (e.g., 120) may be configured (e.g., the second data processing device system of the another node 102 may be configured) to receive and store the generated transaction information block as an update to its respective local copy (or portion thereof) of the transaction ledger 104. This process of distributing the generated transaction information block 401 may be at least part of a process of synchronizing one or more distributed copies of the transaction ledger 104 to include the generated transaction information block 401. A corresponding process may occur with all updating of the ledger 104 described herein, for example, at least step 630, step 647, step 652, and step 655, discussed below.

With respect to at least step 605 and, in some embodiments, FIG. 8A, it may be considered that the first data processing device system of the seller node 102a is configured to determine inventory available for transaction (e.g., step 608) and identify the particular market channel (e.g., mobile device advertisement in the above example) as associated with the inventory available for transaction (e.g., via database 850 in the above example). The generated transaction information block (e.g., FIG. 13) may include indications of inventory available for transaction (e.g., via field 520) and one or more transaction terms (e.g., via field(s) 430). In some embodiments, the determined inventory available for transaction includes product identifiers (e.g., in field 520 from or derived from column 858 in database 850 in FIG. 8B), each identifying a product or service available for transaction (e.g., as determined from column 860 in database 850 in the above example).

The generated transaction information block 401 (e.g., FIG. 13) generated at step 605 or step 609 according to various embodiments may be considered a transaction information block set. An transaction comprising a plurality of transaction information blocks 401 (e.g., FIG. 13 and FIGS. 15, 16, 17, 18 discussed below) may also be considered a transaction information block set.

In some embodiments, a first transaction information block set (e.g., including block 401 of FIG. 13) includes hash-identifiers (e.g., symbolically represented as "Hash-Value-1" and "Hash-Value-2" in FIG. 13) of product or service identifiers (e.g., column 858 of database 850) of inventory available for transaction, the hash-identifiers respectively associated with the product identifiers of the inventory. In some embodiments, the first data processing device system (e.g., 110) of the seller node 102a is configured (e.g., via the PDP 106), to generate and provide the hash-identifiers to the first transaction information block set (e.g., to field 520 in FIG. 13) at least by executing a hash process or hash function on the product identifiers (e.g., the respective rows in column 858 in database 850) of the inventory.

In some embodiments, the seller node 102a corresponds to an advertiser or DSP, and the inventory is an advertisement inventory. The advertiser or DSP may include filtering or targeting criteria as part of the terms 430 of the offer transaction indicated by transaction information block 401. The offer transaction may also specify desired demographics for the advertisements. In some embodiments, the seller node 102 corresponds to a publisher or SSP, and the inventory is an impression inventory. The publisher or SSP may include demographic or audience information as part of the terms 430 of the offer transaction. The offer transaction may also specify available pacing, location of ad slots on the website or mobile app, or minimum pricing information. In some embodiments, the ad-system 101 may impose certain requirements for the various transactions such as an offer transaction, a buy transaction, and a verification transaction. In some embodiments, in optional step 615, the terms 430 are compared to terms required of the ad-system 101, e.g., for a particular market channel, to determine whether the offer transaction (e.g., from step 610) conforms to such terms. For example, the ad-system 101 may include validator nodes 102d that scan new offers added to the transaction ledger 104 to ensure that all new offers identify a service or product ID in field 520 or characteristics of product(s) or service(s) in field 530, according to some embodiments. If both fields 520 and 530 are missing in a new offer, the new offer may be rejected at step 620. In this regard, if the new offer transaction (e.g., the new transaction information block 401 with status field 450 indicating that it represents a new offer transaction) is not in compliance with the term requirements set forth by the ad-system 101, it may be removed from the transaction ledger 104 and a rejection notification may be sent to the seller node 102a, per step 620, e.g., by the applicable validator node 102d, e.g., via the generation of an updated transaction information block 401 added to the distributed transaction ledger 104. In some embodiments, one or more arbiter nodes 102e may (collectively) set the terms for the ad-system 101 and publish these as part of the distributed transaction ledger 104. In some embodiments, requirements or terms for the ad-system 101 may be published as a header of the distributed transaction ledger 104. In some embodiments, each of the nodes 102 in the ad-system 101 may read the header information associated with a distributed transaction ledger 104 to determine whether a published offer transaction conforms to the term requirements set forth by the ad-system 101. In some embodiments of step 615, there may be no single entity or node 102 responsible for policing content or serving as a gatekeeper. In some embodiments, the transaction server 105 (e.g., of the seller node 102a or other originating entity) may review the new transaction information block 401 (e.g., FIG. 13) to ensure that it conforms to requirements of the particular market channel before allowing the new transaction information block 401 to be added to the transaction ledger 104 at step 610, even though step 615 is shown as occurring after step 610 in the example of FIG. 7.

With the new transaction information block 401 (e.g., FIG. 13) added to the transaction ledger 104, its contents become viewable by all nodes 102 in the transaction system 101, according to some embodiments. In this regard, the transaction system 101 may be configured to allow any or all of a plurality of tracker nodes (e.g., tracker node 102c) to continually scan the transaction ledger 104 for new or revised transaction information blocks 401. In this regard, each tracker node, including, for example, tracker node 102c, may be configured to develop its own repository or database, stored in its respective memory device system 130, of transactions occurring within the transaction ledger 104.

In some embodiments, each tracker node, such as tracker node 102c, is configured to develop its own respective set of metadata associated with one or more transactions identified in the transaction ledger 104 associated with a particular market channel. In some embodiments, one or more tracker nodes are communicatively connected to one or more databases external to the transaction system 101 to facilitate development of such metadata.

Figure 14:
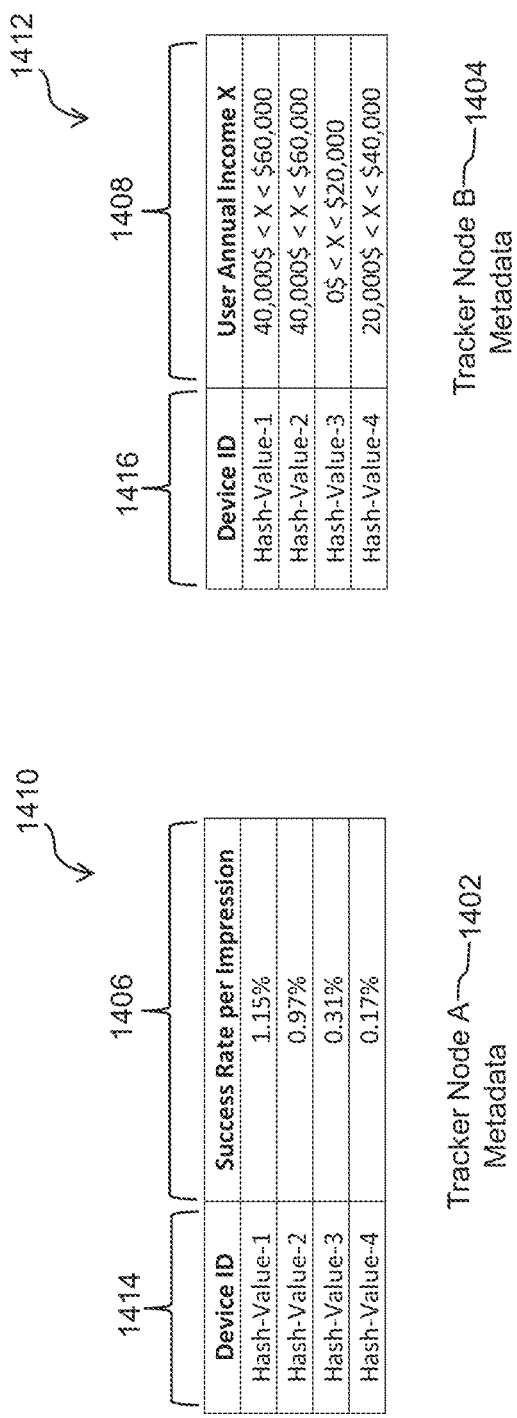
FIG. 14 illustrates examples of metadata stored by different tracker nodes, according to some embodiments of the invention.

For example, with respect to FIG. 14, assume that two tracker nodes 1402, 1404 scan the transaction ledger 104 and extract a plurality of hashed device ID values and store them in respective columns 1414, 1416 of their respective proprietary databases, portions of which are represented with reference numerals 1410, 1412, respectively. In the example of FIG. 14, tracker node A 1402 and tracker node B 1404 may have extracted the device IDs "Hash-Value-1" and "Hash-Value-2" shown in respective columns 1414, 1416 from device ID term 520 in the new transaction information block 401 shown in FIG. 13, or may have extracted such device IDs from one or more pre-existing transaction information blocks 401 in the transaction ledger 104 that involved the same devices associated with device IDs "Hash-Value-1" and "Hash-Value-2". Similarly, tracker node A 1402 and tracker node B 1404 may have extracted the device IDs "Hash-Value-3" and "Hash-Value-4" shown in respective columns 1414, 1416 from one or more pre-existing transaction information blocks 401 in the transaction ledger 104 that involved the same devices associated with device IDs "Hash-Value-3" and "Hash-Value-4".

With at least the benefit of the persistent values provided by hashed device IDs, as discussed above, the transaction system 101 is configured to facilitate the tracker nodes' (e.g., tracker nodes 1402, 1404) identification of trends associated with a particular device across multiple transactions in the transaction ledger 104, as well as the tracker nodes' association of data available outside of the transaction system 101 with the particular devices. In the example FIG. 14, tracker node A 1402, through its own analysis, access to particular data external to the transaction system 101, or both, determines a rate at which a user of each device identified in column 1414 affirmatively responds to an advertisement presented via the respective device, as shown by the rates identified in column 1406. However, tracker node B 1404 has analysis capabilities and has access to different external data than tracker node A 1402 and, therefore, has different metadata illustrated in FIG. 14 with column 1408 than the metadata generated by tracker node A 1402 illustrated in FIG. 14 with column 1406. In this regard, column 1408 associates an annual income with each of the devices identified in column 1416.

Accordingly, due to the distributed, publicly-available configuration of various embodiments of the transaction system 101 that separate the searching an analysis role of the tracker node (e.g., 102*c*) from other nodes, such as buyer nodes (e.g., 102*b*), it is possible to have multiple, competing tracker nodes develop. In this regard, each tracker node is able to develop its own expertise in its particular market channel(s) through its analysis of the transaction ledger(s) 104 and access to its own set of external databases (e.g., external to the transaction ledger(s) 104 in system 101). Such a configuration of the transaction system 101 improves the overall quality of at least the capability of the transaction system 101 to match buyer nodes (e.g., 102*b*) with seller nodes (e.g., 102*a*), as a buyer node will be drawn to the best tracker node or at least the tracker node that has the specific expertise desired by the buyer node in an attempt to find available transactions in the transaction ledger 104 that are best suited for the buyer node.

Accordingly, in some embodiments, a tracker data processing device system (e.g., 110) of a tracker node 102*c* may be configured by a program to generate metadata (e.g., database 1410) associated with at least a particular hash-identifier (e.g., a particular row in database 1410) of the hash-identifiers and external to (e.g., not present in) at least the respective local copy of at least the respective portion of the transaction ledger 104 associated with a particular market channel stored in the processor-accessible memory device system (e.g., 130) of the tracker node 102*c*. In this regard, the tracker data processing device system (e.g., 110) of a tracker node 102*c* may be configured by the program to store the generated metadata in association with the particular hash-identifier (e.g., in database 1410) in the respective processor-accessible memory device system (e.g., 130) associated with the tracker data processing device system of tracker node 102*c*.

Figure 9:
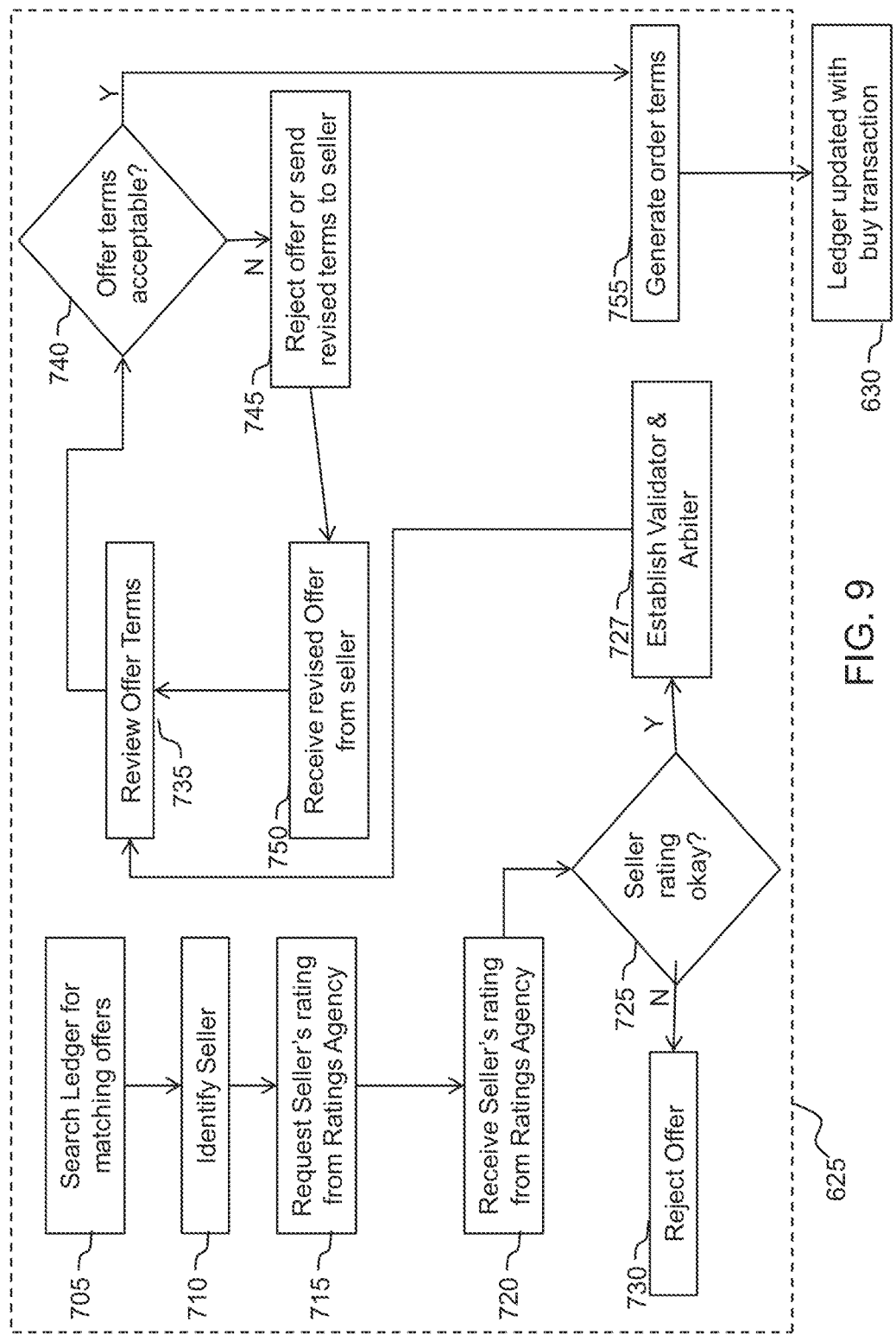
FIG. 9 is a flowchart showing example implementation details of Step 625 of the methods of FIG. 7, according to some embodiments of the invention.

FIG. 9 represents a detailed flowchart of a particular implementation of step 625 of FIG. 7, according to some embodiments. According to some embodiments, step 625 pertains to progressing a transaction information block 401 to a state that is agreeable to both the originating seller node 102*a* and a buyer node 102*b*. In some embodiments, FIG. 9 begins with a searching step 705, where the buyer node 102*b* or the tracker node 102*c* on behalf of and at the request of the buyer node 102*b* searches the distributed ledger 104 for offer transactions matching pre-specified criteria, according to some embodiments. For example, in some embodiments of step 705, the buyer node 102*b* or tracker node 102*c* may search the transaction ledger 104 to identify at least one transaction information block 401 associated with a request for purchasing available inventory.

In this regard, in some embodiments of step 705, the buyer node 102*b* transmits a request to a tracker node 102*c* to search the transaction ledger 104 for a particular transaction desired by the buyer node 102*b*. Such request may include, in some embodiments, pricing and product details, desired inventory volumes, minimum seller credibility thresholds, and acceptable payment terms. This architecture of a distinct tracker node 104 searching the transaction ledger 140 on behalf of the buyer node 102*b* may be advantageous at least in contexts where the distributed ledger 104 is relatively large in size and would be too cumbersome for the buyer node 102*b* to effectively search. However, in some embodiments, the buyer node 102 may directly search the distributed ledger 104 at step 705. This architecture may be useful when the distributed ledger 104 is relatively small in size and relatively easy to search.

With respect to the example of FIG. 13, the buyer node 102*b* may transmit a request (e.g., via the input-output device system (e.g., 120, 152) of the buyer node 102*b*) to the tracker node 102*c* to search the transaction ledger 104 for an offer that allows presentation of advertisements to devices having demographic X for a price between $A and $B with an average expected success rate per impression of greater than 0.60%, where "X" is symbolic of a demographic desirable to the buyer node 102*b*, "A" is a price less than Y, and "B" is a price greater than Y, where "Y" is the price indicated in term 550 in FIG. 13.

In this example, such a request would be unsuitable for tracker node B 1404 in FIG. 14, because such tracker node B 1404 does not have the metadata indicating success rate per impression necessary to process such request. Accordingly, buyer node 102*b* would be incentivized to submit such request to tracker node A 1402, since such tracker node A 1402 does have the desired metadata, as shown in column 1406 in FIG. 14. Accordingly, for purposes of this example, it will be considered that tracker node 102*c* is tracker node A 1402. In this regard, it can be seen that various embodiments of the configuration of the transaction system 101 makes possible the provision of different sets of search terms provided by different tracker nodes, depending on each tracker node's particular set of available metadata.

Upon receipt of the search request, tracker node 102c may search the transaction ledger 104 using the specified set of filters and provide the buyer node 102b with offer transactions, such as that indicated by the transaction information block 401 illustrated, e.g., in FIG. 13, that meet the requirements of the buyer node 102b. Upon receipt of the search results, the buyer node 102b may evaluate all of the offer transactions provided by the tracker node 102c and select a subset of them deemed suitable for potential transaction. As part of this evaluation process, the buyer node 102b may identify, at step 710, the seller node 102a (e.g., via the respective seat ID in field(s) 310) associated with one or more of the offer transactions, and request, at step 715, a rating of the seller node 102a from ratings agency node 102f Alternatively, the tracker node 102c may verify that seller node 102a has an acceptable level of credibility with ratings agency node 102f With such rating(s) being received by the buyer node 102b at step 720, the buyer node 102b may determine, at step 725, whether or not such rating(s) meet a predetermined rating threshold and, consequently, whether or not to reject or exclude its participation in the respective offer(s). If the buyer node 102b determines that the rating of a seller node 102a is insufficient, the buyer node 102b may reject the offer at step 730. It should be noted that, in addition to or in lieu of utilizing seller ratings, the buyer node 102b may evaluate the suitability of an offer provided by the tracker node 102c by reference to the information within the corresponding transaction information block 401 (e.g., FIG. 13), by reference to the metadata provided by the tracker node 102c (e.g., FIG. 14, column 1406), or by reference to both the information within the corresponding transaction information block 401 (e.g., FIG. 13) and the metadata provided by the tracker node 102c (e.g., FIG. 14, column 1406).

In some embodiments, steps 715 and 720 may be performed in parallel with steps 705 and 710. For example, the reputation scores 350 of a respective seller node 102 associated with an offer transaction in the distributed ledger 104 may be verified with the ratings agency node 102f at about the same time as the distributed ledger 104 is being searched for matching offer transactions.

Figure 15:
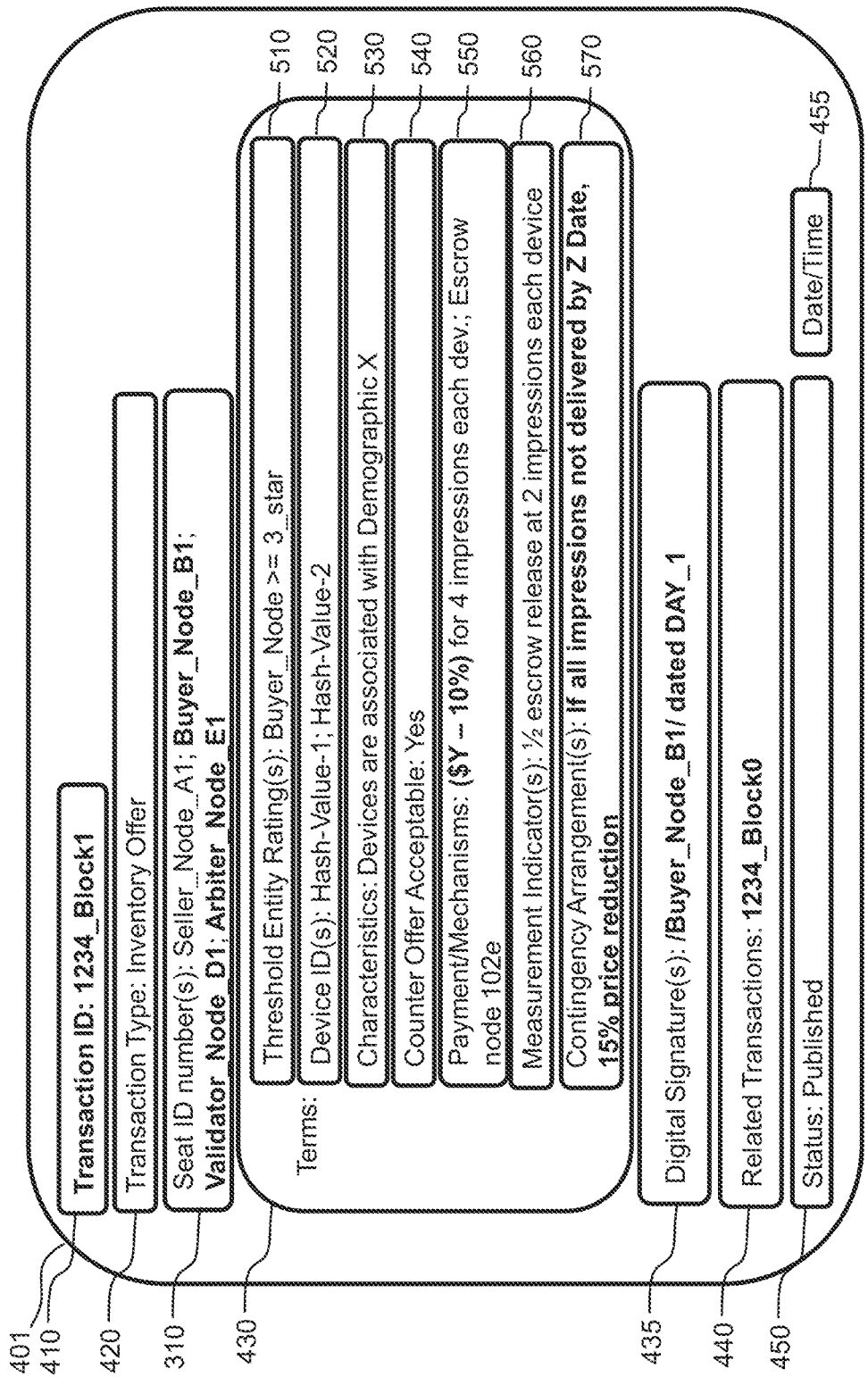
FIG. 15 illustrates an example of a transaction information block in a published state, according to some embodiments of the invention.

According to some embodiments, upon selecting a suitable offer to participate in, seller node 102a and buyer node 102b may use a programmatic auction protocol, such as the real time bidding auction process described previously, to establish a mutually agreeable transaction. In some embodiments, upon selecting a suitable offer to participate in, the buyer node 102b may seek revision of the offer if the offer indicates that counteroffers are acceptable pursuant to, for example, term 540 in FIG. 13, according to some embodiments. Such changes may be to any terms 430 or other aspect of the seller's original transaction information block 401 (e.g., FIG. 13). In this regard, the buyer node 102b may, for example, identify a preferred validator node 102d to perform independent third-party verification of the transaction, and a preferred arbiter node 102e for resolution of any disputes at step 727 if such entities have not already been identified, e.g., in seat ID field 310 in transaction information block 401 in FIG. 13. Or the buyer node 102b may change one or both of such entities identified in the corresponding transaction information block 401, if such entities were identified in the transaction information block 401. FIG. 15 illustrates a new transaction information block 401 that represents a proposed revision by the buyer node 102b of the transaction information block 401 in FIG. 13. In this regard, FIG. 15 indicates that the seat ID term 310 has been modified to include the seat IDs of the buyer node 102b (represented as "Buyer_Node_B1"), as well as the validator node 102d (represented as "Validator_Node_D1") and the arbiter node 102e (represented as "Arbiter_Node_E1") preferred by the buyer node 102b, pursuant to step 727.

It should be noted that with any of the process figures herein, the steps shown may be performed in different orderings that those shown and not every step need be performed according to various embodiments. For example, with respect to FIG. 9, step 727 may be performed before step 735, in parallel with any of steps 735-750, or any time before step 755, according to various example embodiments.

In addition to verifying the validator node 102d and the arbiter node 102e, the buyer node 102b may be configured to verify or change other aspects of the corresponding transaction information block 401, such as the terms 430, pursuant to steps 735, 740 and 745. In this regard, at step 735, the buyer node 102b may be configured to perform the process of reviewing the terms 430 and other aspects of the corresponding transaction information block 401, and if any terms 430 or aspects of the corresponding transaction information block 401 are deemed not acceptable to the buyer node 102b, at step 740, the buyer node 102b may modify the corresponding terms 430 or other aspects at step 745.

In the example FIG. 15, the payment term 550 is revised by the buyer node 102b at step 745 in an attempt to reduce the price of the impressions by 10%. Also in the example of FIG. 15, the buyer node 102b adds a contingency arrangement in term 570 that reduces the price in term 550 by an additional 15% if the impressions are not delivered by a particular date "Z".

According to some embodiments, the transaction server 105 is configured to invalidate all prior signatures in terms 435 when a corresponding transaction information block 401 is modified by a buyer node or a seller node, such as according to step 745. In the example of FIG. 15, the previous digital signature shown in FIG. 13 from the seller node 102a is eliminated, and, since the changes shown in FIG. 15 are made by the buyer node 102b, the buyer node 102b must, according to some embodiments of the transaction server 105, digitally sign the modified transaction information block 401 as shown in term 435 in FIG. 15. In FIG. 15, the signature of the buyer node 102d on a date "DAY_1" is illustrated by the characters, "Buyer_Node_B1/". In some embodiments, the date/time field 455 may store the latest date of all signatures in field 435 (e.g., "DAY_1" in the example of FIG. 15.)

The process of modifying a transaction information block 401 may result in the transaction server 105 associated with the buyer node 102b generating a new transaction information block 401, according to some embodiments, as shown in FIG. 15 with the new transaction ID 410 ending in "Block1", as compared to the transaction ID 410 shown in FIG. 13, which ends in "Block0". Because the new transaction information block 401 shown in FIG. 15 is a modification of the transaction information block 401 shown in FIG. 13, the transaction server 105 may be configured to automatically add the transaction ID 410 of the transaction information block 401 shown in FIG. 13 to the related transactions field 440 of the new transaction information block 401 shown in FIG. 15.

Upon completion of the new transaction information block 401 (e.g., FIG. 15) that modifies the original transaction information block 401 (e.g., FIG. 13), the new transaction information block 401 (e.g., FIG. 15) may be posted or added to the transaction ledger 104 by the transaction server 105 associated with the buyer node 102b at step 745.

In this regard, it may be considered in some embodiments, that a data processing device system (e.g., 110) of the buyer node 102b is configured by a program stored in a processor-accessible memory device system (e.g., 130) of the buyer node 102b to generate an updated transaction information block 401 (e.g., FIG. 15) based on the offer transaction information block 401 (e.g., FIG. 13) with a modification of at least a particular term (e.g., 550 or 570) of the one or more transaction terms 430 of the offer transaction information block 401 (e.g., FIG. 13). In some embodiments, the data processing device system (e.g., 110) of the buyer node 102b is configured by the program to distribute, over a communications network (e.g., 153, 103) via an input-output device system (e.g., 120) of the buyer node 102b, the generated updated transaction information block 401 (e.g., FIG. 15) including the modification of at least the particular term. As shown in FIG. 15, field 435, the generated updated transaction information block 401 that is distributed may be a digitally signed transaction information block.

As part of step 750, the seller node 102a may discover the new transaction information block 401 (e.g., FIG. 15) with the revised terms or other aspects due to monitoring of the transaction ledger 104 by the transaction server 105 of the seller node 102a, a tracker 102c operating on behalf of the seller node 102a, or some other program or node 102 associated with the seller node 102a. Upon discovery of the new transaction information block 401 (e.g., FIG. 15), the seller node 102a may accept the revisions, may provide an additional counter offer, or may simply reject the revisions altogether, thereby terminating the transaction.

If the seller provides an additional counter offer at step 750 in FIG. 9, a new transaction information block 401 may be generated and added to the transaction ledger 104 as discussed. Such additional counter offer may be discovered by the buyer node 102d at step 750 as discussed, and the buyer node 102b may review the additional counter offer at step 735. Additional revisions to the terms or other aspects of the transaction may occur via the loop of steps 740, 745, 750, and 735 and FIG. 9.

Figure 16:
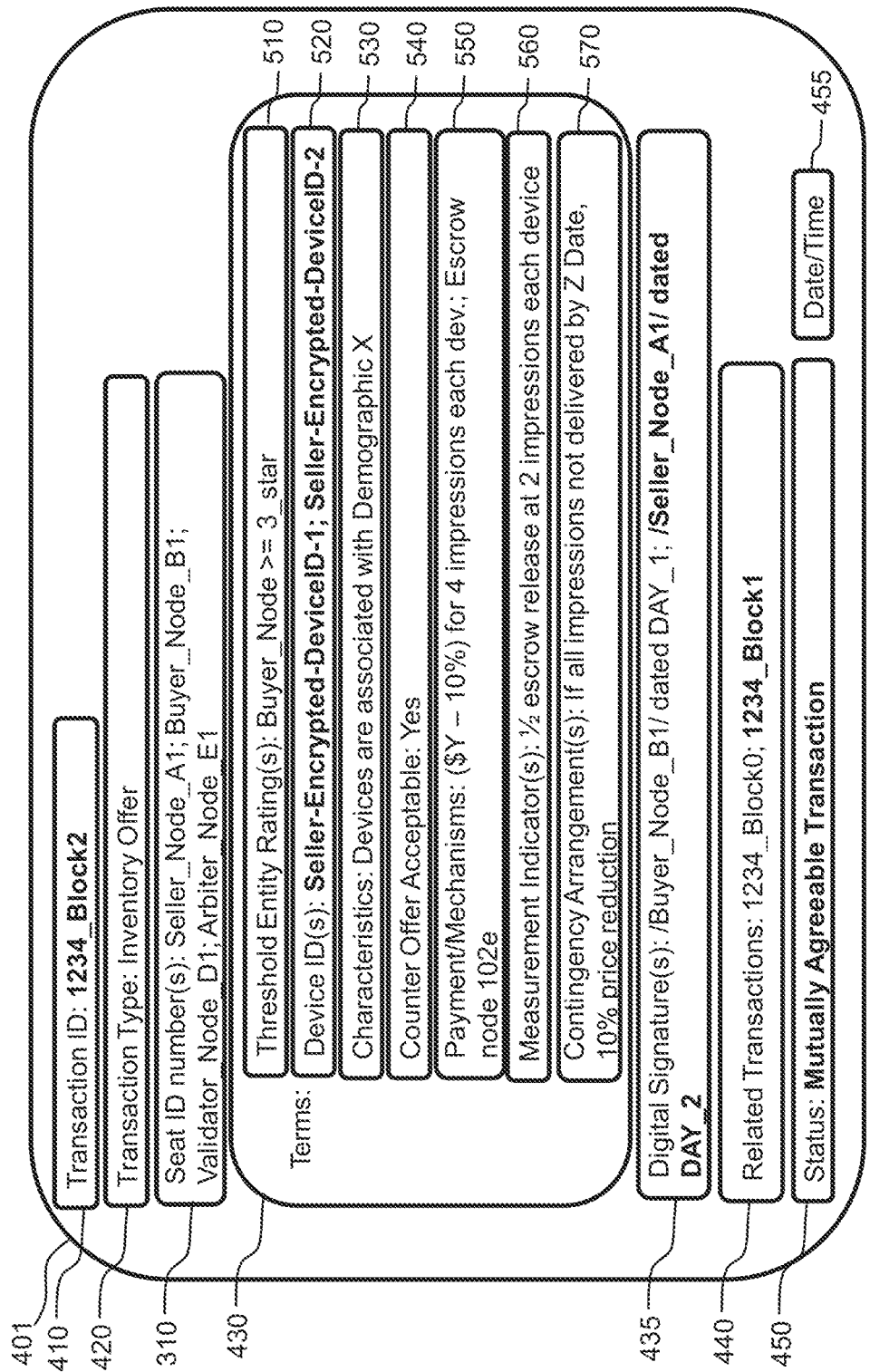
FIG. 16 illustrates an example of a transaction information block in a mutually agreeable transaction state, according to some embodiments of the invention.

FIG. 16 illustrates an example where the seller node 102a accepts the revised terms illustrated, for example, in FIG. 15. In the example of FIG. 16, a new transaction information block 401 (with new transaction ID "1234_Block2" in field 410) is generated by the transaction server 105 of the seller node 102a. The new transaction information block 401 is linked to the prior transaction information blocks 401 via related transactions field 440 in FIG. 16 having transaction IDs "1234_Block0" (from FIG. 13) and "1234_Block1" (from FIG. 15). Since the seller node 102a merely accepted the modified terms from the buyer node 102b, the status in the field 450 is changed to "mutually agreeable transaction", according to some embodiments, by the seller node 102a adding its digital signature (represented in FIG. 16 as "/Seller_Node_A1/" on day "DAY_2") to digital signatures field 435. Because the new transaction information block 401 in FIG. 16 is digitally signed by the seller node 102a, it may be considered a second digitally signed transaction information block 401, in a case where the digitally signed transaction information block 401 from FIG. 15 is considered a first digitally signed transaction information block 401. In some embodiments, the second digitally signed transaction information block 401 in FIG. 16 is considered to be formed by the seller node 102a digitally signing the first transaction information block 401 in FIG. 15.

In some embodiments, in a state where a transaction information block 401 is agreed upon, such as the "mutually agreeable transaction" state represented in FIG. 16 including digital signatures of both the seller node 102a and the buyer node 102b, the terms 430 represented in such agreed-upon transaction information block 401 may be considered agreed-upon order terms at step 755 in FIG. 9. In some embodiments, in the state where the transaction information block 401 is agreed upon, such as the "mutually agreeable transaction" state represented in FIG. 16 including digital signatures of both the seller node 102a and the buyer node 102b, the transaction server 105 (either at the seller node 102a or the buyer node 102b, depending upon which node was last to digitally sign the transaction information block 401) is configured to add the agreed-upon transaction information block 401 to the transaction ledger 104 for the respective market channel via public distribution and synchronization at step 630 shown in each of FIGS. 7 and 9. Accordingly, in some contexts, it may be stated that the data processing device system (e.g., 110) of the seller node 102a is configured by a program stored in its respective processor-accessible memory device system (e.g., 130) to distribute, over a communications network (e.g., 153, 103) via its respective input-output device system (e.g., 120), the second digitally signed transaction information block 401 (e.g., of FIG. 16).

In some embodiments, in a state when a transaction is agreed upon, such as the "mutually agreeable transaction" state represented in FIG. 16, the data processing device system (e.g., 110) of the seller node 102a is configured (e.g., via the PDP 106 or the ad server 107, in some embodiments) to replace the hashed device IDs in term 520 with encrypted device IDs according to a public encryption key, e.g., associated with the validator node 102d. In other words, the actual device IDs of the devices identified in the device ID term 520 are encrypted according to a public encryption key in order to keep the actual device IDs confidential, while allowing downstream verification of, e.g., at least the characteristics of such devices identified in characteristics term 530 by the trusted node 102 that has the private decryption key associated with the public encryption key, according to some embodiments. In this regard, such trusted node(s) may privately decrypt the encrypted device IDs to reveal the actual device IDs and perform the requested verification process.

Such a verification process may be executed at least at step 632 in FIG. 7 and may be required in some embodiments to provide the buyer node 102b with additional assurance that the device characteristics in characteristics term 530 are accurate. Continuing with the example of FIG. 16, at step 632, assuming that the seller node 102a encrypted the device IDs in field 520 using the public encryption key of the selected validator node 102d, the validator node 102d may then decrypt the device IDs in the device ID term 520 of the transaction information block 401 shown in FIG. 16 using its own private decryption key corresponding to the public encryption key. With such private decryption key, the validator node 102d may be configured to decrypt such encrypted device IDs and, with the actual device IDs privately in hand, the validator node 102d may be configured to access metadata associated with the actual device IDs to verify that the corresponding devices exhibit the characteristics identified in term 530. Such metadata may be confidential and may be retained by the validator node 102d, or the validator node 102d may have secure access to such metadata via a device system distinct from the validator node 102d.

Although the above example discusses the seller node 102a using a public encryption key of a trusted validating node (e.g., 102d) to encrypt device IDs, and the trusted validating node using its own private decryption key to decrypt the encrypted device IDs, other embodiments configure the seller node 102a to use its own public encryption key to encrypt the device IDs, and the seller node 102a may then provide its own private decryption key to one or more trusted nodes, such as a trusted validating node (e.g., 102d) for such node(s) to use to decrypt the encrypted device IDs.

In some embodiments, the data processing device system (e.g., 110) of the seller node 102a may be configured to (e.g., via the PDP 106 or the ad server 107, in some embodiments) encrypt the product or service identifiers (e.g., from column 858 in database 850 in FIG. 8B) to generate encrypted product identifiers (e.g., in field 520 in FIG. 16), the encrypted product identifiers included in the inventory available for transaction in the generated transaction information block 401 (e.g., in FIG. 16). The product identifiers may be device identifiers as shown, for example, FIG. 8B. In some embodiments, each of the device identifiers identifies a device (e.g., such as a mobile electronic device 108 in FIG. 4 per, e.g., column 856, rows 1 and 2 of database 850 in FIG. 8B) to which an advertisement is authorized to be delivered. As discussed in more detail below, the advertisements may be presented via an application (e.g., software development kits 109 discussed in more detail below) associated with the seller node 102a and executed on the respective devices.

In some embodiments, the data processing device system (e.g., 110) of the seller node 102a may be configured to (e.g., via the PDP 106 or the ad server 107, in some embodiments) encrypt the product or service identifiers (e.g., from column 858 in database 850 in FIG. 8B) according to a public encryption key associated with a provider (e.g., seller node 102a) of the inventory available for transaction (e.g., identified in field 520 in FIG. 16). In some embodiments, a processor-accessible memory device system (e.g., 130) communicatively connected to a data processing device system (e.g., 110) of a validator node 102d stores at least a respective portion of the transaction ledger 104 associated with the respective market channel including a first transaction information block set (e.g., block 401 in FIG. 16 and possibly also blocks 401 in FIGS. 15 and 13) associated with an operation set (e.g., a sale and purchase of inventory) with respect to at least a subset of the inventory available for transaction (e.g., the inventory identified in term 520 in FIG. 16). As shown, e.g., in FIG. 16, the first transaction information block set may include product identifiers (e.g., in field 520) encrypted (e.g., by seller node 102a) according to a public encryption key (e.g., associated with seller node 102a in some embodiments, or associated with the validator node 102d in some embodiments). In some embodiments, the data processing device system (e.g., 110) of the validator node 102d may be configured by a program to decrypt the encrypted product identifiers according to a private decryption key (e.g., its own private decryption key in embodiments where its own public encryption key was used for encryption, or a private decryption key provided by seller node 102a where the public encryption key of the seller node 102a was used for encryption) corresponding to the public encryption key. In some embodiments, the first transaction information block set indicates characteristics (e.g., in term 530 of FIG. 16) of products associated with the encrypted product identifiers, and the data processing device system (e.g., 110) of the validator node 102d may be configured by a program to verify that the decrypted product identifiers are associated with products that agree with the characteristics.

Although the above examples pertain to encryption of product or service identifiers (e.g., per field 520), the same or similar encryption processes may be implemented for information in one or more other data fields of a transaction information block 401. For example, if it is desired that payment information or mechanisms in field 550 remain confidential, such information may be encrypted according to the public/private key processes discussed herein, so that only approved and trusted nodes 102 can have access to such information. Accordingly, in some embodiments, a transaction information block set (e.g., including a block 401 like that shown in FIG. 16) may include at least one encrypted transaction term. Each trusted node 102 may store a decryption key (e.g., in its respective processor-accessible memory device system 130) to decrypt such term(s).

Figure 17:
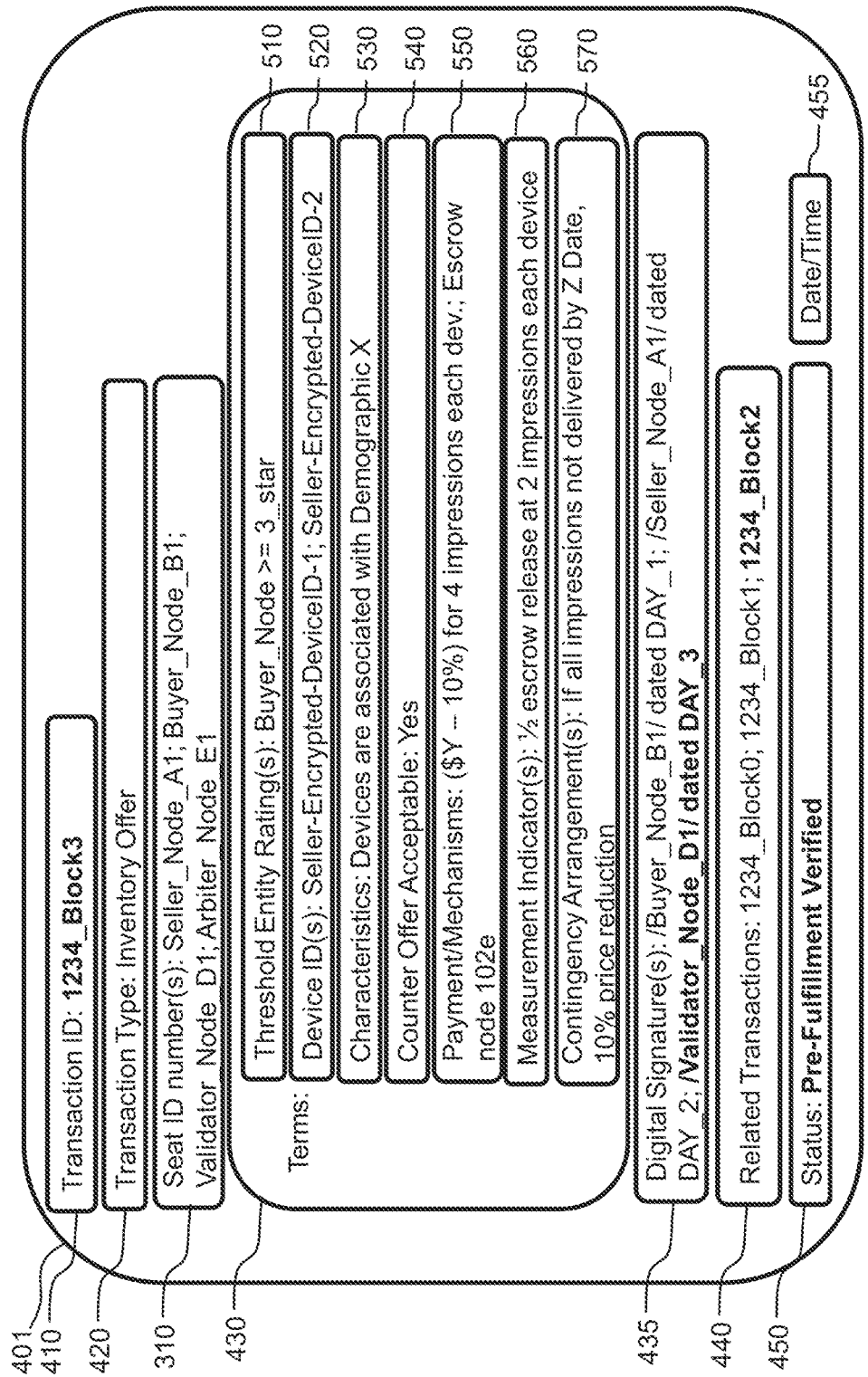
FIG. 17 illustrates an example of a transaction information block in a pre-fulfillment verified state, according to some embodiments of the invention.

At step 632 in FIG. 7, if the validator node 102d is able to confirm the characteristics 530, the validator node may add its digital signature to the digital signature field 435 in a newly-updated transaction information block 401, according to some embodiments. FIG. 17 represents an example of a new transaction information block 401 including the digital signature of the validator node 102d (represented as "/Validator_Node_D1/" dated DAY_3 in FIG. 17), which indicates that the validator node 102d has successfully performed the validation at step 632. Since the addition of the digital signature of the validator node 102d represents an update to the transaction information block 401 illustrated in FIG. 16, FIG. 17 represents a new transaction information block 401 with a new transaction ID "1234_Block3" in field 410 that is linked to each of the prior transaction information blocks in this transaction in field 440 in FIG. 17. In particular, the transaction information block 401, field 440 in FIG. 17 links to transaction IDs "1234_Block2" (FIG. 16), "1234_Block1" (FIG. 15), and "1234_Block0" (FIG. 13). The example transaction information block 401 of FIG. 17 also indicates that the addition of the signature of the validator node 102d is associated with a change in the status 450 to "pre-fulfillment verified", which further indicates that the validator node 102d has successfully validated the transaction. In some embodiments, the status 450 may automatically change via the transaction server 105 associated with the validator node 102d.

Accordingly, in some embodiments, the data processing device system (e.g., 110) of the validator node 102d may be configured by a program to add a digital signature to the respective local copy of at least a respective portion of the transaction ledger 104 (e.g., via the signature added to field 435 in block 401 in FIG. 17) associated with the respective market channel stored in the processor-accessible memory device system of the validator node 102d, in response to verifying that the decrypted product identifiers are associated with products that agree with the characteristics (e.g., identified in field 530).

If the validator node 102d is unable to confirm the characteristics 530, the transaction may be aborted, according to some embodiments. Otherwise, a revision process may occur, similar to that discussed above, in order to revise the transaction as needed.

In some embodiments, one or more tracker nodes 102c performs the pre-fulfillment validation at step 632 instead of or in addition to one or more validator nodes 102d. In some embodiments, it may be preferable to have a tracker node 102c perform the pre-fulfillment validation at step 632 at least because it may have a repository of specialized metadata (e.g., FIG. 14) that may be utilized to verify that the decrypted product or service identifiers (e.g., decrypted from field 520 in FIG. 16) meet the identified characteristics (e.g., identified in field 530 in FIG. 16). Like the above discussion regarding the validator node 102*d*, if the tracker node 102*c* verifies the decrypted product or service identifiers, it may add its digital signature to the transaction via the respective transaction information block 401 (e.g., like FIG. 16).

Accordingly, in some embodiments, the data processing device system (e.g., 110) of the seller node 102*a* is configured via a program (e.g., via the PDP 106 or the ad server 107, in some embodiments) stored in the processor-accessible memory device system (e.g., 130) of the seller node 102*a* to generate and provide the encrypted product identifiers (e.g., in field 520 of FIG. 16) of the inventory to the first transaction information block set (e.g., block 401 in FIG. 16 and possibly also blocks 401 in FIGS. 15 and 13) according to a public encryption key associated with a tracker data processing device system (e.g., 110), the tracker data processing device system associated with a tracker node 102*c* that tracks transaction information in the transaction ledger 104 associated with the respective market channel. In some embodiments, the tracker data processing device system is configured, via a program stored in the respective processor-accessible memory device system (e.g., 130), to decrypt the encrypted product identifiers (e.g., in field 520 in FIG. 16) according to a private encryption key associated with the tracker data processing device system of tracker node 102*c* and corresponding to the public encryption key associated with the tracker data processing device system of tracker node 102*c*. In some embodiments, the tracker data processing device system is configured, via a program, to verify that the decrypted product identifiers are associated with products that agree with the characteristics (e.g., identified in field 530 in FIG. 16), and add a digital signature to the respective local copy of the at least a respective portion of the transaction ledger 104 associated with the respective market channel stored in the processor-accessible memory device system of the tracker node 102*c*, in response to verifying that the decrypted product identifiers are associated with products that agree with the characteristics. The digital signature of the tracker node 102*c* may be added to, e.g., field 435 in FIG. 17 in addition to or in lieu of the digital signature of the validator node 102*d* in some embodiments.

Continuing with the preceding example of the case where the validator node 102*d* successfully completes the pre-fulfillment verification at step 632 in FIG. 7 and digitally signs field 435 in FIG. 17, the arbiter node 102*e* may be configured to monitor the transaction ledger 104 for transactions including its seat ID in field 310. In this regard, the arbiter node 102*e* may discover the transaction information block 401 in FIG. 17, as it includes its seat ID symbolically represented as "Arbiter_Node_E1" in FIG. 17. In this example, the arbiter node 102*e* may be configured to recognize that pre-fulfillment verification at step 632 in FIG. 7 has completed successfully due to the presence of the digital signature of the validator node 102*d* in field 435 in FIG. 17. Upon determining that the pre-fulfillment verification at step 632 in FIG. 7 has completed successfully, the arbiter node 102*e* may be configured (e.g., the data processing device system (e.g., 110) of the arbiter node 102*e* may be configured via a program stored in its processor-accessible memory device system (e.g., 130)) to add its digital signature to field 435 at step 634 in FIG. 7, and as shown in FIG. 18, recognizing that the associated transaction has been validated and is ready for fulfillment, according to some embodiments.

Figure 18:
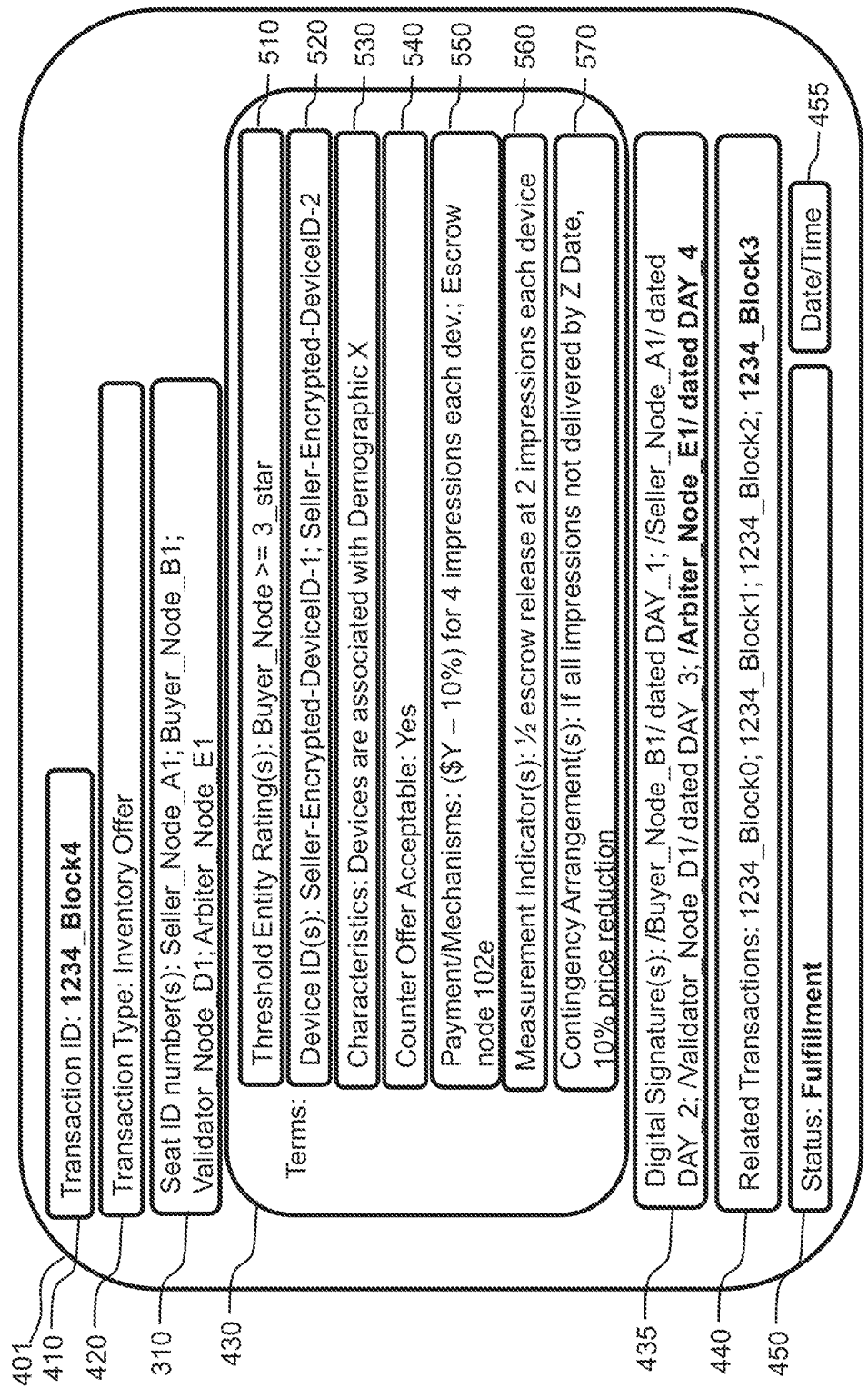
FIG. 18 illustrates an example of a transaction information block in a fulfillment state, according to some embodiments of the invention.

FIG. 18 represents an example of a new transaction information block 401 including the digital signature of the arbiter node 102*e* (represented as "/Arbiter_Node_E1/" dated DAY_4 in FIG. 18). Since the addition of the digital signature of the validator node 102*d* represents an update to the transaction information block 401 illustrated in FIG. 17, FIG. 18 represents a new transaction information block 401 with a new transaction ID "1234_Block4" in field 410 that is linked to each of the prior transaction information blocks in this transaction in field 440 in FIG. 18. In particular, the transaction information block 401, field 440 in FIG. 18 links to transaction IDs "1234_Block3" (FIG. 17), "1234_Block2" (FIG. 16), "1234_Block1" (FIG. 15), and "1234_Block0" (FIG. 13). The example transaction information block 401 of FIG. 18 also indicates that the addition of the signature of the arbiter node 102*e* is associated with a change in the status 450 to "fulfillment", which may indicate that all parties to the transaction have approved of such transaction and, consequently that the transaction is ready for fulfillment, e.g., to be executed, according to some embodiments. In some embodiments, the status 450 may automatically change via the transaction server 105 associated with the arbiter node 102*e*.

In this regard, it may be considered that the transaction information block 401 in FIG. 18 represents at least a portion of a transaction information block set (which may or may not also include transaction information blocks represented, for example, in FIG. 17, 16, 15, 13, or a subcombination thereof). The transaction information block set may be associated with an operation set (e.g., purchase or sale) with respect to inventory (e.g., per term 520 or term 530) and may be a local copy of at least a portion of the transaction ledger 104 associated with a respective market channel stored by a processor-accessible memory device system (e.g., 130) in system 101.

As shown, for example, in field 435 in FIG. 18, the transaction information block set may include a first digital signature associated with a first data processing device system (e.g., 110 associated with a provider of the inventory, e.g., in field 520, such as seller node 102*a*), a second digital signature associated with a third data processing device system (e.g., 110 associated with a recipient of the inventory, such as that associated with buyer node 102*a*), a third digital signature associated with a fourth data processing device system (e.g., 110 associated with a validator of at least a subset of the one or more transaction terms (e.g., 430), such as validator node 102*d*), and a fourth digital signature associated with a fifth data processing device system (e.g., 110 associated with an arbiter of a failure of at least a subset of one or more of the transaction terms (e.g., 430), such as arbiter node 102*e*), assuming that a second data processing device system (e.g., 110) is associated with some other node 102 in system 101 that stores at least a portion of the transaction ledger 104 associated with the respective market channel, according to some embodiments. As each of these nodes 102*a*, 102*b*, 102*d*, and 102*e* serve important functions in certain contexts as described herein, it may be correspondingly important in some contexts for the transaction information block 401 to include digital signatures from all of these nodes 102*a*, 102*b*, 102*d*, and 102*e*, according to some embodiments. In at least some embodiments where the tracker node 102*c* performs pre-fulfillment verification at step 632 in FIG. 7, the third digital signature may be associate with the tracker node 102*c* instead of the validator node 102*d*, or the digital signature of the tracker node 102*c* may be added to field 435 in FIG. 18 as a fifth digital signature associated with a sixth data processing device system (e.g., 110 associated with a tracker of transaction information in the transaction ledger 104 associated with a respective market channel, such as tracker node 102*c*) in addition to the signature of the validator node 102d. As each of these nodes 102a-103e serve important functions in certain contexts as described herein, it may be correspondingly important in some contexts for the transaction information block 401 to include digital signatures from all of these nodes 102a-102e, according to some embodiments. However, in some contexts, digital signatures from all of these nodes are not required, according to some embodiments.

During fulfillment, which is initiated at step 634 in FIG. 7, the ad server 107 of the seller node 102a is configured to monitor or search the transaction ledger 104 in, e.g., the mobile device advertisement market channel for transactions including the seat ID (e.g., "Seller_Node_A1") of the seller node 102a in field 310 and a status of "Fulfillment" in field 450 to identify transactions that the ad server 107 is obligated to fulfill, according to some embodiments. The transaction information block 401 in the example of FIG. 18 meets these requirements, because it identifies the seat ID of the seller node 102a and has the status of "Fulfillment". Accordingly, in some embodiments, the ad server 107 of the seller node 102a is configured to search the transaction ledger 104 in the mobile device advertisement market channel to identify the particular transaction including transaction information block 401 of FIG. 18.

In some embodiments, the particular transaction including transaction information block 401 of FIG. 18 identifies at least an inventory item associated with a particular user account and identifies a transaction term set defining at least disposition of the inventory item. For example, FIG. 19 illustrates at least a portion of a database 1900, in some embodiments, which associates each of at least some inventory items identified in column 1902 with a respective user account identified in column 1904. In some embodiments, the database 1900 is part of database 850 in FIG. 8B. For example, database 850 may include column 1904. With reference to the example of FIG. 19, the inventory items identified in field 520 in transaction information block 401 in FIG. 18, which correspond to "Device-ID-1" and "Device-ID-2" in column 1902, rows one and two, respectively, in database 1900, are respectively associated with user accounts "User Account A" and "User Account B". In addition, the particular transaction including transaction information block 401 of FIG. 18 is associated with a transaction term set (e.g., identified by one or more of the terms 430) that defines at least disposition of the inventory items. For example, in term 550 in FIG. 18, the inventory items identified in term 520 are to present four impressions each, which may be considered a form of disposition of such inventory items. However, the present invention is not limited to any particular form of disposition of a product or service.

In some embodiments, the ad server 107 is configured to interact with software development kits (SDKs) 109 provided by the seller node 102a to operate on the devices 108 identified in the device ID field 520 (e.g., FIG. 18) in order to cause such devices 108 to present advertisements provided by the buyer node 102b in accordance with the terms 430 (e.g., FIG. 18), according to some embodiments. Each device 108 may be an instance of a system 100 in FIG. 1. In this regard, each SDK 109 may be configured to receive an instruction from the ad server 107 instructing the respective SDK 109 to dispose of an inventory item, such as an instruction instructing display of an advertisement or other image, text, audio, or video via an input-output device system (e.g., 120) of the respective device 108. In the case of an image or video, the instruction may be to present such image or video within one or more regions of a display of the input-output device system (e.g., 120) of the respective device 108 (or to play audio from one or more speakers in the case of audio) while a user of the respective device 108 is executing an app or viewing a website operated by the seller node 102a, according to some embodiments. In response to receiving such an instruction, the SDK 109 is configured to present the advertisement or other image, text, audio, or video accordingly.

In this regard, in some embodiments, a first data processing device system (e.g., 110 of seller node 102a) is configured, via a first program (e.g., ad server 107) stored in a first processor-accessible memory device system (e.g., 130 of seller node 102a), to identify a particular transaction (e.g., including transaction information block 401 of FIG. 18) of a plurality of transactions in transaction ledger 104 associated with a respective market channel at least by causing searching of the transaction ledger 104. The particular transaction may identify at least an inventory item (e.g., a device ID in field 520 in FIG. 18 or, e.g., in column 1902 in FIG. 19) associated with a particular user account (e.g., as shown in FIG. 19) and may identify a transaction term set (e.g., one or more terms 430 in FIG. 18) defining at least disposition of the inventory item. In some embodiments, the first data processing device system (e.g., 110 of seller node 102a) is configured, via the first program (e.g., ad server 107) to transmit an instruction set (e.g., one or more instructions to present an advertisement or other content), via a communication network (e.g., in some embodiments, distinct from network 153, 103 as the devices 108 may be on a different network than that of nodes 102), to a second data processing device system (e.g., 110 of a device 108), the instruction set instructing the disposition of the inventory item. In some embodiments, the inventory item includes an identifier (e.g., a device ID in field 520 in FIG. 18 or, e.g., in column 1902 in FIG. 19) identifying the second data processing device system (e.g., the respective device 108). In some embodiments where an identifier is encrypted (e.g., as illustrated in field 520 in FIG. 18), the ad server 107 may be configured to decrypt the encrypted identifier using a respective private decryption key as a prerequisite to transmitting the instruction set to the second data processing device system (e.g., 110 of a device 108), since the identifier may be needed as an address of the respective device 108. The second data processing device system may be associated with the particular user account (e.g., as shown in FIG. 19). The user account may identify a user of the second data processing device system (e.g., the respective device 108). In some embodiments, the instruction set instructing the disposition of the inventory item includes one or more instructions instructing, e.g., the respective SDK 109 executing on respective device 108, to display an image, text, audio, or video via a second input output device system (e.g., 120 of the respective device 108) communicatively connected to the second data processing device system (e.g., 110 of the respective device 108). Although the above examples often are in the context of mobile device advertisement, the invention is not limited to any particular market channel. For instance, in the case of a physical print advertisement market channel, the instruction set instructing the disposition of the inventory item may include one or more instructions instructing transportation of the inventory item to a destination identified in the transaction term set (e.g., physical address "Address-1" in column 858, row four of database 850). The same configuration may apply to non-advertisement market channels, such as the provision of other products or of services. Upon completion of all or respective portions of the dispositions, the ad server 107 may be configured to generate an updated transaction information block 401 that indicates which portions (or the entirety) of the dispositions (e.g., fulfillment) have been completed, which may be received and utilized, e.g., by validator node 102d to monitor and validate fulfillment. A result of the validation of fulfillment may be entered into a second updated transaction information block 401 generated by the validator node 102d (e.g., via execution of the respective transaction server 105) for addition to the respective transaction ledger and, consequent, distribution to one or more other nodes 102.

In this regard, during fulfillment, which begins at step 634 in FIG. 7, according to some embodiments, the validator node 102d may be configured to monitor such fulfillment to ensure that the terms of 430 are being completed properly. Such monitoring may occur via the validator node 102d searching transaction ledger 104 of the respective market channel for the seat ID 310 of the validator node 102d in transactions exhibiting a "Fulfillment" state, e.g., as shown in field 450 of FIG. 18.

In the event that the seller node 102a or buyer node 102b is or are unable to meet one or more of the terms 430 identified in the transaction information block 401 (e.g., FIG. 18), some embodiments of the transaction system 101 are configured to execute one or more applicable contingency arrangements identified in field 570 or to allow the seller node 102a and the buyer node 102b to revise the transaction information block 401 to make alternate arrangements at step 635. The publication of a revised transaction in the distributed ledger 104 notifies validator node 102d that terms 430 or other aspects of the corresponding transaction information block 401 have changed, and provides ratings agency node 102f an opportunity to factor the changes into a future credibility score of seller node 102a or buyer node 102b.

Figure 10:
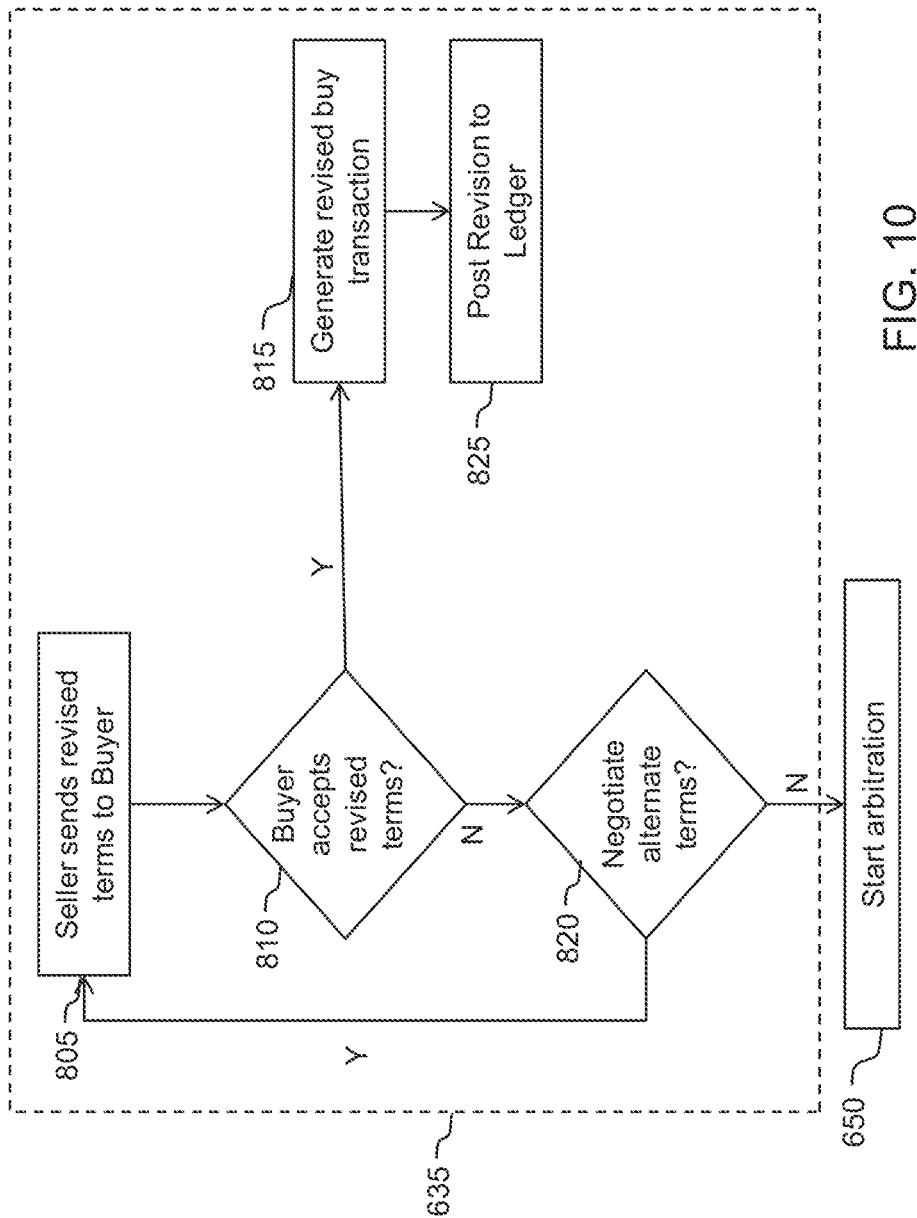
FIG. 10 is a flowchart showing methods for revising terms in a transaction, the methods executable or executed by a computing device system of FIG. 1, 2, 3, or 4, according to some embodiments of the invention.

FIG. 10 illustrates an exploded view of step 635 in a case where no contingency arrangement from field 570 applies and the seller node 102a proposes a revised set of terms 430 at step 805 during the fulfillment process. Of course, however, the buyer node 102b may, instead, propose a revised set of terms 430 at step 805.

Following the example of FIG. 10, the seller node 102a may generate revised terms 430 for review by the buyer node 102b, akin the process discussed above with respect to FIG. 15. At step 810, if the revised terms 430 are acceptable to the buyer node 102b, the process flow continues to step 815, according to some embodiments. At step 810, if the revised terms 430 are not acceptable to the buyer node 102d, the process flow continues to step 820, according to some embodiments. At step 815, either the seller node 102a or the buyer node 102b may generate a revised buy transaction, e.g., akin to the process discussed above with respect to FIG. 16. In some embodiments, either the seller node 102a or the buyer node 102b, or both the seller node 102a and the buyer node 102b, may digitally sign the revised transaction information block 401 to acknowledge agreement of mutually acceptable revised terms 430, as discussed above with respect to FIGS. 15 and 16. At step 825, the revised transaction information block 401 is published to the distributed ledger 104, according to some embodiments. The validator node 102d and the arbiter node 102e may be required to also digitally sign the revised transaction information block 401, akin to the above discussions with respect to FIGS. 17 and 18, in order to return the transaction to the "Fulfillment" status, shown, e.g., in field 450 in FIG. 18.

At step 820, the buyer node 102b and the seller node 102a determine whether alternate approaches may be pursued to reach mutually acceptable revised terms 430. For example, in some embodiments, the buyer node 102b may propose alternate revised terms for review by seller node 102a. If an agreement on mutually acceptable revised terms 430 cannot be reached at step 820, the arbiter node 102e may start the arbitration process at step 650.

In the event that the seller node 102a or buyer node 102b is or are unable to meet one or more of the terms 430 identified in the transaction information block 401 (e.g., FIG. 18), and a contingency arrangement in field 570 (e.g., FIG. 18) applies, the modified term(s) dictated by such contingency arrangement may automatically apply without the need for further negotiation between the seller node 102a and the buyer node 102b.

In some embodiments, the validator node 102d (or arbiter node 102e in some embodiments) may be notified (e.g., by the seller node 102a, the buyer node 102b, or both generating an updated transaction information block 401) or be configured to determine that all or a portion of the terms 430 (e.g., FIG. 18) have been successfully completed at step 640 in FIG. 7. In this case, processing proceeds to step 645. On the other hand, if a portion or segment (or completion) of the fulfillment process does not occur within a period of time defined in the terms 430 or if a dispute arises between the buyer node 102b and the seller node 102a as to whether a portion or segment (or completion) of the fulfillment process should have already been completed within a period of time, arbitration with the arbiter node 102e may occur at step 650 in FIG. 7 via the "N" path from step 640. In some embodiments, in arbitration process 650, arbiter node 102e engages with seller node 102a and buyer node 102b to reach a satisfactory conclusion, creates a verification transaction, digitally signs it, and publishes it to the distributed ledger 104. If arbiter node 102e is unable to reach a satisfactory conclusion at step 650, seller node 102a and buyer node 102b may pursue other actions outside of transaction system 101 to resolve a dispute.

In some embodiments, at step 645, the validator node 102d may be configured to verify that all or the portion of the order terms 430 stipulated in the transaction information block 401 have been met. Verification may be executed at any increment of time (hourly, daily, or monthly) or according to a non-regular timeline that corresponds to standard billing and reporting cycles—thereby enabling micro-transactions that have occurred to be verified via the distributed ledger 104. If the order terms 430 have been fulfilled in whole or in part, the validator node 102d may update the distributed transaction ledger 104 with a verification transaction at step 655, according to some embodiments. In some embodiments, verification step 645 may also include the validator node 102d confirming that payment has been sent from the buyer node 102b to the seller node 102a after all or a portion of the order terms 430 have been fulfilled. If all or a particular portion of the order terms 430 have been fulfilled, but payment has not been sent from the buyer node 102b (or released from escrow) to the seller node 102a in a timely manner, arbitration may be started at step 650. The verification transaction may be appended to the transaction information block 401 associated with, e.g., the corresponding offer transaction (e.g., FIG. 13), mutually agreeable transaction (e.g., FIG. 16), pre-fulfillment-verified transaction (e.g., FIG. 17), fulfillment transaction (e.g., FIG. 18), or one or a subcombination or combination thereof. In some other embodiments, the verification transaction may be recorded in the distributed ledger 104 as a new transaction as described above. In this case, the related transactions 440 of the verification transaction may also be updated to include the transaction IDs 410 of the other corresponding transactions.

Figure 11:
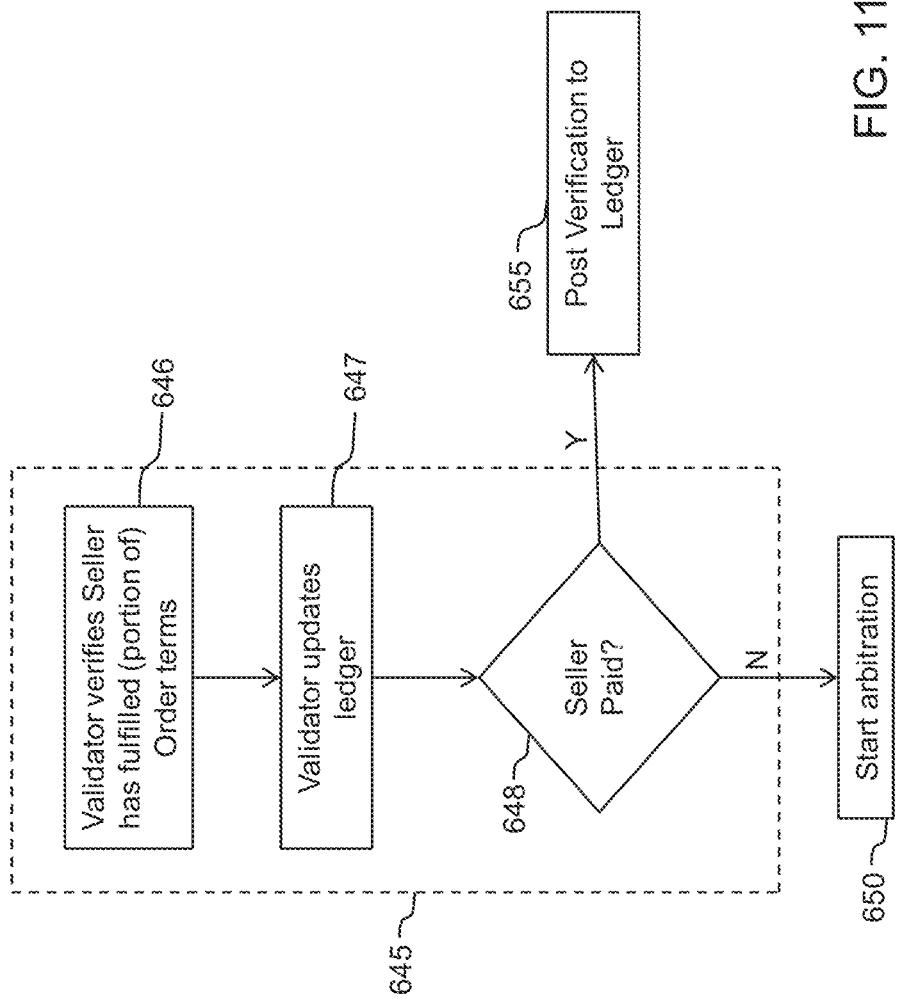
FIG. 11 is a flowchart showing example implementation details of Step 645 of the methods of FIG. 7, according to some embodiments of the invention.

FIG. 11 shows a detailed flowchart of a particular implementation of step 645 of FIG. 7, according to some embodiments of the present invention. In some embodiments, at step 645, the validator node 102*d* may be configured to verify that all or a particular portion of terms 430 stipulated in the corresponding transaction information block 401 (e.g., FIG. 18) have been met. For example, in some embodiments, the validator node 102*d* may identify at step 646 at least one measurement indicator identified in terms 560 in the corresponding transaction information block 401 (e.g., FIG. 18). At step 646, the validator node 102*d* may verify that the applicable measurement indicator(s) 560 in the terms 430 have been fulfilled by the seller node 102*a*. In some embodiments, the validator node 102*d* is configured to generate a verification transaction indicating that all or a portion of the order terms 430 have been fulfilled and full or partial payment may be released by the buyer node 102*b* (or from escrow) to the seller node 102*a*. At step 648, the validator node 102*d* may be configured to verify that the seller node 102*a* has received such payment. If so, the validator node 102*d* may generate a transaction information block 401 including an updated status of the transaction, and may update the distributed ledger 104 to reflect that the terms 430 specified in the corresponding transaction information block 401 have been fulfilled by the seller node 102*a* and buyer node 102*b*, according to some embodiments. In some embodiments, the verification transaction may be published at step 655 to the distributed ledger 104 to notify entities or nodes 102 in the transaction system 101 that the terms 430 have been fulfilled. In some embodiments, the transaction information block 401 associated with the buy transaction may be updated or revised to reflect that the seller node 102 has completed the terms 430 specified in the buy transaction.

If payment has not been received by the seller node 102*a* in a timely manner, the arbitration process of step 650 may be started with arbiter node 102*e*. In some embodiments, the ratings agency node 102*f* reads the verification transaction published to the distributed ledger 104 at step 655 and updates at step 660 the reputation scores 350 of the seller node 102*a* and the buyer node 102*b* accordingly. It should be noted that step 660 does not have to be performed in sequence after step 655 as the ratings agency node 102*f* has full access to the transaction ledger 104 and may update the repetition scores 350 for the seller node 102*a* and the buyer node 102*b* at any point in the process based on the information recorded in the transaction ledger 104 at that point in the process.

A particular example of steps 640, 645, 650, and 655 will now be provided with respect to the example of FIG. 18. In this regard, at step 640, the seller node 102*a* may transmit a notification to the validator node 102*d* indicating that the two impressions have occurred at each device 108 (FIG. 4) in accordance with the measurement indicator term 560 in FIG. 18. In some embodiments, such notification may occur by the seller node 102*a* revising, e.g., term 560 or some other data field of transaction information block 401 FIG. 18 to indicate completion of the "2 impressions each device" task via a newly generated transaction information block 401 posted to transaction ledger 104 as previously described.

Receipt of such a notification by the validator node 102*d* may be deemed the completion of a portion or segment of the fulfillment process at step 640 (i.e., "Y" at step 640) in FIG. 7. In some of the embodiments where the notification is provided via the seller node 102*a* generating a new transaction information block 401 that, e.g., updates the block 401 of FIG. 18, the validator node 102*d* may become aware of such new block 401 by monitoring or regularly searching the ledger 104 (e.g., via its TS 105) for transactions in "Fulfillment" status in field 450 with the seat ID of the validator node 102*d* in field 310 showing a change to a verification or completion status of a measurement indicator in field 560.

At step 646 in FIG. 11, according to some embodiments, the validator node 102*d* is configured to independently verify that the measurement indicator term 560 has actually been met or completed, i.e., that the two impressions have occurred at each device 108 in the example of FIG. 18. In some embodiments, the validator node 102*d* may be configured to perform such a validation via independent and confidential access to data associated with the ad server 107 of the seller node 102*a*. For example, if the ad server 107 keeps a log of impression actions, the validator node 102*d* may be configured to access such log and review it for consistency. In some embodiments, the validation of step 646 (or step 645) may include the validator node 102*d* utilizing its private decryption key to decrypt encrypted product or service identifiers (e.g., in field 520 in FIG. 18), or other encrypted information, as discussed above, in the respective transaction information block 401. Accordingly, in some embodiments, a transaction information block set (e.g., including block 401 in FIG. 18) may include digital signatures (e.g., in field 435 in FIG. 18) associated with a data processing device system (e.g., 110) of a validator node (e.g., 102*d*) and a data processing device system (e.g., 110) of an arbiter node (e.g., 102*e*). In this regard, in some embodiments, the data processing device system of the validator node (e.g., 102*d*) may be configured by a program to decrypt encrypted product identifiers (e.g., in field 520 in FIG. 18) according to a private encryption key corresponding to a public encryption key associated with the validator node that was used to encrypt such product identifiers. In some embodiments, the data processing device system of the validator node (e.g., 102*d*) may be configured by the program to verify, utilizing the decrypted product identifiers, that at least a subset of the one or more transaction terms (e.g., in field 430 in FIG. 18) have been fulfilled.

Assuming that the validator node 102*d* is able to verify the satisfaction of the measurement indicator term 560, i.e., that the two impressions have occurred at each device 108 in the example of FIG. 18, the validator node 102*d* may be configured to transmit a success indication or notification at step 646, e.g., by the validator node 102*d* revising, e.g., term 560 or some other data field of transaction information block 401 FIG. 18 to indicate that it has validated completion of the "2 impressions each device" task via a newly generated transaction information block 401 posted to transaction ledger 104 to notify one or more other nodes 102 as previously described. An escrow agent node 102, which, in some embodiments, is the arbiter node 102*e*, may detect this newly generated transaction information block 401 and may instruct or cause a corresponding release of escrow-held assets, such as one half of the payment to the seller node 102*a* in accordance with term 560 in the example of FIG. 18. In this regard, at step 647 in FIG. 11, the validator node 102*d* may generate a new transaction information block 401 with an updated status 450 indicating the verification of the partial completion of the order terms 430. If the validator node 102*d* confirms with the seller node 102*a* at step 648 that the seller node 102*a* has received the partial release of escrow payment, the validator node 102*d* may generate and post at step 655 another new transaction information block 401 with an updated status 450 indicating the verification of the partial completion of the order terms 430 as well as the successful receipt of payment by the seller node 102*a*.

In view of the above discussion of FIG. 11, it can be seen that in some embodiments, a first data processing device system (e.g., 110 of validator node 102*d*) may be configured, via a program (e.g., at least its TS 105) stored in a first processor-accessible memory device system (e.g., 130 of validator node 102*d*), to cause a search of at least part of the transaction ledger 104 associated with a respective market channel for a particular transaction information block (e.g., 401 in "Fulfillment" status in field 450 with the seat ID of the validator node 102*d* in field 310 showing a change to a verification or completion status of a measurement indicator in field 560) associated with an inventory transaction. In some embodiments, the first data processing device system (e.g., 110 of validator node 102*d*) may be configured, via the program, to identify at least one measurement indicator (e.g., in field 560) based on one or more transaction terms (e.g., in field 430) in the particular transaction information block, and determine a status of the inventory transaction at least by measuring, reviewing, analyzing, or validating the at least one measurement indicator. The first data processing device system (e.g., 110 of validator node 102*d*) may be configured, via the program, to include the determined status of the inventory transaction in a generated updated transaction information block 401 (e.g., by updating status field 450).

In some embodiments, the first data processing device system (e.g., 110 of validator node 102*d*) is configured, via the program, to determine the status of the inventory transaction as at least partially successfully completed in a case where the one or more transaction terms have been fulfilled in accordance with the at least one measurement indicator. In the above example, the validator node 102*d* may be configured to determine the status as partially, but not completely, successfully completed in response to verifying completion of the "2 impressions each device" task identified in term 560 in FIG. 18, for example. If the validator node 102*d* determines, for example, that all four impressions have occurred at each device per term 550 in FIG. 18, the validator node 102*d* may be configured to determine the status as fully successfully completed, according to some embodiments. In some embodiments, the first data processing device system (e.g., 110 of validator node 102*d*) is configured, via the program, to generate an updated transaction information block 401 based on the particular transaction information block 401 with a digital signature associated with the first data processing device system in response to determining that the status of the inventory transaction is at least partially successfully completed. For example, the validator node 102*d* may generate an updated transaction information block 401 that revises term 450 (e.g., FIG. 18) to indicate the at least partially completed status and adds a more recent digital signature to field 435 (e.g., FIG. 18) of the validator node 102*d*. In some embodiments, the first data processing device system (e.g., 110 of validator node 102*d*) is configured, via the program, to transmit the generated updated transaction information block to one or more other data processing device systems (e.g., 110) of one or more other nodes in system 101 over the communications network (e.g., 153, 103) via a first input-output device system (e.g., 120 of the validator node 102*d*) to update the corresponding transaction ledger 104.

In some embodiments, another data processing device system (e.g., 110 of arbiter node 102*e*) is configured, via a program stored in a respective processor-accessible memory device system (e.g., 130 of arbiter node 102*e*), to identify, from a local copy of the at least a respective portion of the transaction ledger 104 associated with a respective market channel, a digitally signed particular transaction information block (e.g., a transaction information block 401 including the seat ID in field 310 of the arbiter node 102*e* and indicating that the validator node 102*d* has validated partial or full successful completion of terms in accordance with the applicable measurement indicators (e.g., in field 560). In this regard, such other data processing device system (e.g., 110 of arbiter node 102*e*) may be configured, via the program, to determine that the status of the inventory transaction as at least partially successfully completed based on an analysis of the identified digitally signed particular transaction information block. In some embodiments, such other data processing device system (e.g., 110 of arbiter node 102*e*) may be configured, via the program, to transmit, in response to determining that the inventory transaction is at least partially successfully completed, an instruction set (e.g., a notification or an instruction to, e.g., an escrow agent, which may be a node 102 distinct from arbiter node 102*e* or may, in some embodiments, be the arbiter node 102*e* itself), the instruction set instructing release of assets (e.g., a release of some, but not all, escrow-held assets, such as payment, in the case of partial successful completion, or a full release of all escrow-held assets in the case of full successful completion) associated with the inventory transaction, according to some embodiments.

In some embodiments, the first data processing device system (e.g., 110 of validator node 102*d*) is configured, via the program, to transmit a failure indication or notification if failure occurs with the verification performed by the validator node 102*d* as at least part of step 645. For example, in some embodiments, the first data processing device system (e.g., 110 of validator node 102*d*) is configured, via the program, to determine the status of the inventory transaction as being in a failure state in a case where the one or more transaction terms have not been met in accordance with at least one measurement indicator. Continuing with the example of FIG. 18, if the validator node 102*d* is unable to verify, contrary to an indication from the seller node 102*a* in the transaction ledger 104, that the "2 impressions each device" task has successfully completed, the validator node 102*d* may generate an updated transaction information block 401 that revises term 450 (e.g., FIG. 18) to indicate a failure state, e.g., with relation to a corresponding measurement indicator (e.g., term 560) or other term (e.g., 430) and adds a more recent digital signature to field 435 (e.g., FIG. 18) of the validator node 102*d*. The seller node 102*a* may detect this updated transaction information block 401 in the transaction ledger 104 and take corrective action or proceed to arbitration at step 650 in FIG. 7, as needed. The arbiter node 102*e* may detect this updated transaction information block 401, e.g., in the event of arbitration. If contingency arrangements are specified in the transaction (e.g., via field 570), the arbiter node 102*e* may detect this updated transaction information block 401 in the transaction ledger 104 and identify from the arbiter node's local copy of the at least the respective portion of the transaction ledger 104 associated with the respective market channel and in response to identifying the failure state status, such contingency arrangements associated with the inventory transaction. In this regard, in some embodiments, the arbiter node 102*e* may be configured to transmit an instruction set instructing processing of assets associated with the inventory transaction in accordance with the contingency arrangements. In the example of FIG. 18, field 570, in a case where all impressions were not delivered by "Z" date, the arbiter node 102e may be configured to transmit a notification or instruction to itself or another applicable node 102 (e.g., an escrow agent), that price should be reduced by 10% for this respective transaction.

The inventors of the present invention recognized that it may be beneficial in some contexts to have the configurations of the validator node 102d and the arbiter node 102e distinct, with the validator node 102d validating successful or unsuccessful performance of a transaction, and the arbiter node 102e resolving disputes and controlling release of assets. Such a division of configurations provides the validator node 102d with independence from asset control, which may allow the validator node 102d to more independently verify successful or unsuccessful performance of a transaction in some circumstances.

Figure 12:
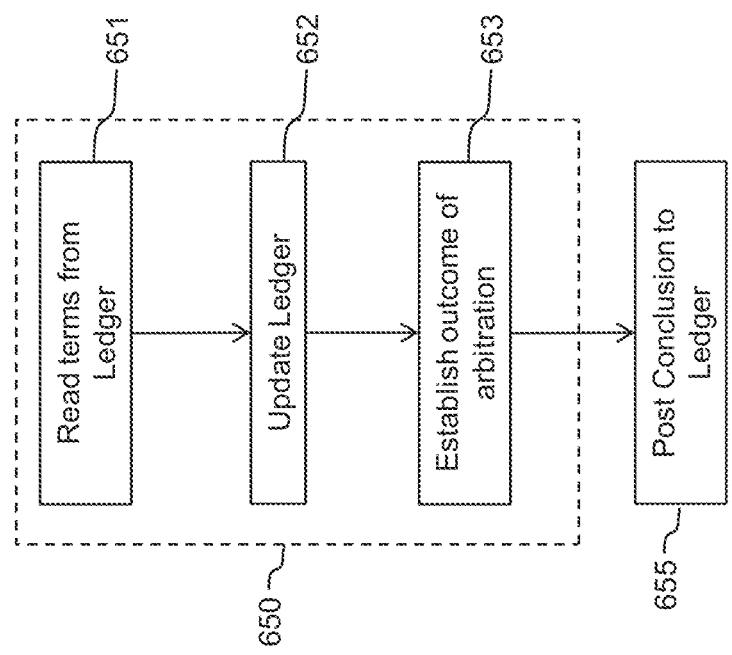
FIG. 12 is a flowchart showing example implementation details of Step 650 of the methods of FIG. 7, according to some embodiments of the invention.

FIG. 12 shows a detailed flowchart of a particular implementation of step 650 in FIG. 7, according to some embodiments. At step 651 in FIG. 12, the arbiter node 102e reads terms 430 or other aspects of a transaction information block 401 (e.g., FIG. 18) having the seat ID in field 310 of the arbiter node 102e stored in the distributed ledger 104, according to some embodiments. In some embodiments, the arbiter node 102e updates the status 450 of the transaction (e.g., via the respective transaction information block set) in the distributed ledger 104 to reflect that the transaction is in arbitration. At step 653, the arbiter node 102e interacts with the seller node 102a and the buyer node 102b to negotiate a conclusion of the arbitration process, according to some embodiments. Upon completion of the arbitration process, the arbiter node 102e updates the transaction, e.g., by generating a new transaction information block 401 linked to the earlier transaction information blocks 401 in the respective transaction information block set in the distributed ledger 104 with the conclusion, according to some embodiments. In some embodiments, the ratings agency node 102f reads the conclusion posted to the distributed ledger 104 and updates reputation scores 350 of the seller node 102a and the buyer node 102b accordingly. In some embodiments, the arbiter node 102 revises the verification transaction to record the conclusion.

Subsets or combinations of various embodiments described above provide further embodiments. These and other changes can be made to various embodiments in light of the above-detailed description. In general, the terms used should not be construed to limit the invention to the specific embodiments disclosed in the specification and the claims, but should be construed to include other systems including all types of transaction systems in accordance with any claims. Further, it should be noted that, although several of the above-discussed embodiments are described within the context of an ad-system, other embodiments apply to other transaction systems, such as a trading exchange or other market where one or more of the above-described advantages or features will prove beneficial. Accordingly, the invention is not limited by this disclosure, but instead its scope is to be determined entirely by the claims.

What is claimed is:

1. A system comprising:
a first data processing device system communicatively connected to a communications network;
a first processor-accessible memory device system communicatively connected to the first data processing device system; and
a first input-output device system communicatively connected to the first data processing device system and the communications network,
wherein the first processor-accessible memory device system stores (a) a first portion of an entire transaction ledger, and (b) a link to a second portion of the entire transaction ledger, the link indicating storage of the second portion of the entire transaction ledger by a second data processing device system communicatively connected to the communications network, and the first processor-accessible memory device system stores (a) and (b) in a state in which the second portion of the entire transaction ledger includes a part of the entire transaction ledger omitted from storage by the first processor-accessible memory device system and in which the second portion of the entire transaction ledger is less than all of the entire transaction ledger, and
wherein the first data processing device system is configured, via a first program stored in the first processor-accessible memory device system, to:
generate a transaction information block,
store the generated transaction information block in the first processor-accessible memory device system as an update to the first portion of the entire transaction ledger, and
transmit the generated transaction information block to another data processing device system over the communications network via the first input-output device system.

2. The system of claim 1, wherein the entire transaction ledger comprises a plurality of portions of the entire transaction ledger stored respectively by a plurality of processor-accessible memory device systems respectively communicatively connected to a plurality of different processor-accessible memory device systems communicatively connected to the communications network, the plurality of portions of the entire transaction ledger comprising the first portion of the entire transaction ledger stored in the first processor-accessible memory device system and the second portion of the entire transaction ledger stored by the second data processing device system.

3. The system of claim 1, wherein, in a state in which it is requested that at least a part of the first portion of the entire transaction ledger be deleted, the first data processing device system is configured, via the first program stored in the first processor-accessible memory device system, to ensure that the at least the part of the first portion of the entire transaction ledger stored in the first processor-accessible memory device system exists elsewhere in the communications network prior to deleting the at least the part of the first portion of the entire transaction ledger stored in the first processor-accessible memory device system.

4. The system of claim 1, wherein the first data processing device system is configured, via the first program stored in the first processor-accessible memory device system, to determine whether or not at least a part of the first portion of the entire transaction ledger stored in the first processor-accessible memory device system that is desired to be deleted exists elsewhere in the communications network.

5. The system of claim 4, wherein the first data processing device system is configured, in a state in which it is determined that the at least the part of the first portion of the entire transaction ledger that is desired to be deleted does not exist elsewhere in the communications network, to prevent deletion of the at least the part of the first portion of the entire transaction ledger.

6. The system of claim 4, wherein the first data processing device system is configured, in a state in which it is determined that the at least the part of the first portion of the entire transaction ledger that is desired to be deleted does not exist elsewhere in the communications network, to transmit the at least the part of the first portion of the entire transaction ledger to a particular data processing device system over the communications network via the first input-output device system for retention in the communications network.

7. The system of claim 6, wherein the particular data processing device system is a pre-designated storage node in the communications network.

8. The system of claim 7, wherein the pre-designated storage node in the communications network stores the entire transaction ledger.

9. The system of claim 1, wherein the first data processing device system is configured, via the first program stored in the first processor-accessible memory device system, to:
- transmit one or more requests over the communications network via the first input-output device system, the one or more requests configured to generate the entire transaction ledger;
- receive, from the communications network via the first input-output device system, a remainder of the entire transaction ledger; and
- generate the entire transaction ledger from the first portion of the entire transaction ledger and the remainder of the entire transaction ledger.

10. The system of claim 1, wherein the entire transaction ledger is associated with a respective market channel.

11. The system of claim 10, wherein the entire transaction ledger is a first transaction ledger associated with a first market channel, and wherein the first processor-accessible memory device system stores a first portion of a second transaction ledger associated with a second market channel, the second market channel different than the first market channel.

12. The system of claim 11,
wherein the link to at least the second portion of the entire transaction ledger is a first link to at least the second portion of the first transaction ledger, and
wherein the first processor-accessible memory device system stores (c) the first portion of the second transaction ledger associated with the second market channel, and (d) a second link to at least a second portion of the second transaction ledger, the second link indicating storage of the at least the second portion of the second transaction ledger by a third data processing device system communicatively connected to the communications network.

13. The system of claim 12,
wherein the transaction information block is a first transaction information block,
wherein the first data processing device system is configured, via a program stored in the first processor-accessible memory device system, to:
generate a second transaction information block,
store the generated second transaction information block in the first processor-accessible memory device system as an update to the first portion of the second transaction ledger associated with the second market channel, and
transmit the generated second transaction information block to yet another data processing device system over the communications network via the first input-output device system as an update to the second transaction ledger associated with the second market channel.

14. The system of claim 1, wherein the first portion of the entire transaction ledger and the second portion of the entire transaction ledger are mutually exclusive portions of the entire transaction ledger.

15. A method executed by a first data processing device system communicatively connected to a communications network, the first data processing device system communicatively connected to a first processor-accessible memory device system and a first input-output device system, the first input-output device system communicatively connected to the communications network, and the method comprising:
storing, executed by the first data processing device system and via the first processor-accessible memory device system, (a) a first portion of an entire transaction ledger, and (b) a link to a second portion of the entire transaction ledger, the link indicating storage of the second portion of the entire transaction ledger by a second data processing device system communicatively connected to the communications network, wherein (a) and (b) are stored in a state in which the second portion of the entire transaction ledger includes a part of the entire transaction ledger omitted from storage via the first processor-accessible memory device system and in which the second portion of the entire transaction ledger is less than all of the entire transaction ledger;
generating, executed by the first data processing device system, a transaction information block;
storing, executed by the first data processing device system and via the first processor-accessible memory device system, the generated transaction information block as an update to the first portion of the entire transaction ledger; and
transmitting, executed by the first data processing device system and via the first input-output device system, the generated transaction information block to another data processing device system over the communications network.

16. One or more non-transitory computer-readable storage mediums storing a program executable by one or more data processing devices of a first data processing device system communicatively connected to a first input-output device system and a communications network, the program comprising:
first storage instructions configured to cause the first data processing device system to store, via one or more computer-readable storage mediums, (a) a first portion of an entire transaction ledger, and (b) a link to a second portion of the entire transaction ledger, the link indicating storage of the second portion of the entire transaction ledger by a second data processing device system communicatively connected to the communications network, wherein the first storage instructions are configured to cause the first data processing device system to store (a) and (b) in a state in which the second portion of the entire transaction ledger includes a part of the entire transaction ledger omitted from storage by the first data processing device system, and in which the second portion of the entire transaction ledger is less than all of the entire transaction ledger;
generation instructions configured to cause the first data processing device system to generate a transaction information block;
second storage instructions configured to cause the first data processing device system to store, via one or more computer-readable storage mediums, the generated transaction information block as an update to the first portion of the entire transaction ledger; and transmission instructions configured to cause the first data processing device system to transmit, via the first input-output device system, the generated transaction information block to another data processing device system over the communications network.

\* \* \* \* \*